(12) United States Patent
Tanaka

(10) Patent No.: US 7,376,470 B2
(45) Date of Patent: May 20, 2008

(54) CONTROL METHOD AND APPARATUS

(75) Inventor: Masato Tanaka, Tokyo (JP)

(73) Assignee: Yamatake Corporation, Tokyo (JP)

( * ) Notice: Subject to any disclaimer, the term of this patent is extended or adjusted under 35 U.S.C. 154(b) by 592 days.

(21) Appl. No.: 11/113,442

(22) Filed: Apr. 22, 2005

(65) Prior Publication Data
US 2005/0240288 A1 Oct. 27, 2005

(30) Foreign Application Priority Data

Apr. 23, 2004 (JP) ............................. 2004-128227
Apr. 23, 2004 (JP) ............................. 2004-128236
Apr. 23, 2004 (JP) ............................. 2004-128240

(51) Int. Cl.
  *G05B 11/01* (2006.01)
  *G05B 13/02* (2006.01)
  *G06F 7/60* (2006.01)

(52) U.S. Cl. ............................ 700/20; 700/12; 700/39; 700/40; 700/42; 703/2

(58) Field of Classification Search .................. 700/20, 700/42, 39, 40, 12; 703/2
See application file for complete search history.

(56) References Cited

U.S. PATENT DOCUMENTS

| | | | | |
|---|---|---|---|---|
| 6,430,452 | B1 * | 8/2002 | Feustel ........................ | 700/37 |
| 6,684,113 | B2 * | 1/2004 | Tanaka ........................ | 700/40 |
| 6,754,542 | B1 * | 6/2004 | Tanaka ........................ | 700/42 |
| 2005/0033455 | A1 * | 2/2005 | Kasdan et al. ................ | 700/12 |

FOREIGN PATENT DOCUMENTS

KR    10-0198056    2/1999

* cited by examiner

*Primary Examiner*—David Vincent
*Assistant Examiner*—Thomas Stevens
(74) *Attorney, Agent, or Firm*—Blakely, Sokoloff, Taylor & Zafman LLP

(57) ABSTRACT

In a control method, when a state quantity serving as a specific reference is defined as a reference state quantity, and a state quantity which is controlled to maintain a relative quantity with respect to the reference state quantity at a specified value is defined as a follow-up state quantity, one of a plurality of control computation input values input to a controller of at least two controllers respectively forming control loops, which controls the follow-up state quantity is transformed, into an internal input value, and the internal input value is input to the controller which controls the follow-up state quantity. At least the two controllers calculate manipulated variables, respectively, and the calculated manipulated variables are output to controlled systems of corresponding control loops. The internal input value is calculated by setting the internal input value as the sum of a first element for the reference state quantity and a second element for the relative quantity, an element of the control computation input value which corresponds to the reference state quantity as the first element, and a value obtained by multiplying an element of the control computation input value which corresponds to the relative quantity as the second element. A control apparatus is also disclosed.

67 Claims, 55 Drawing Sheets

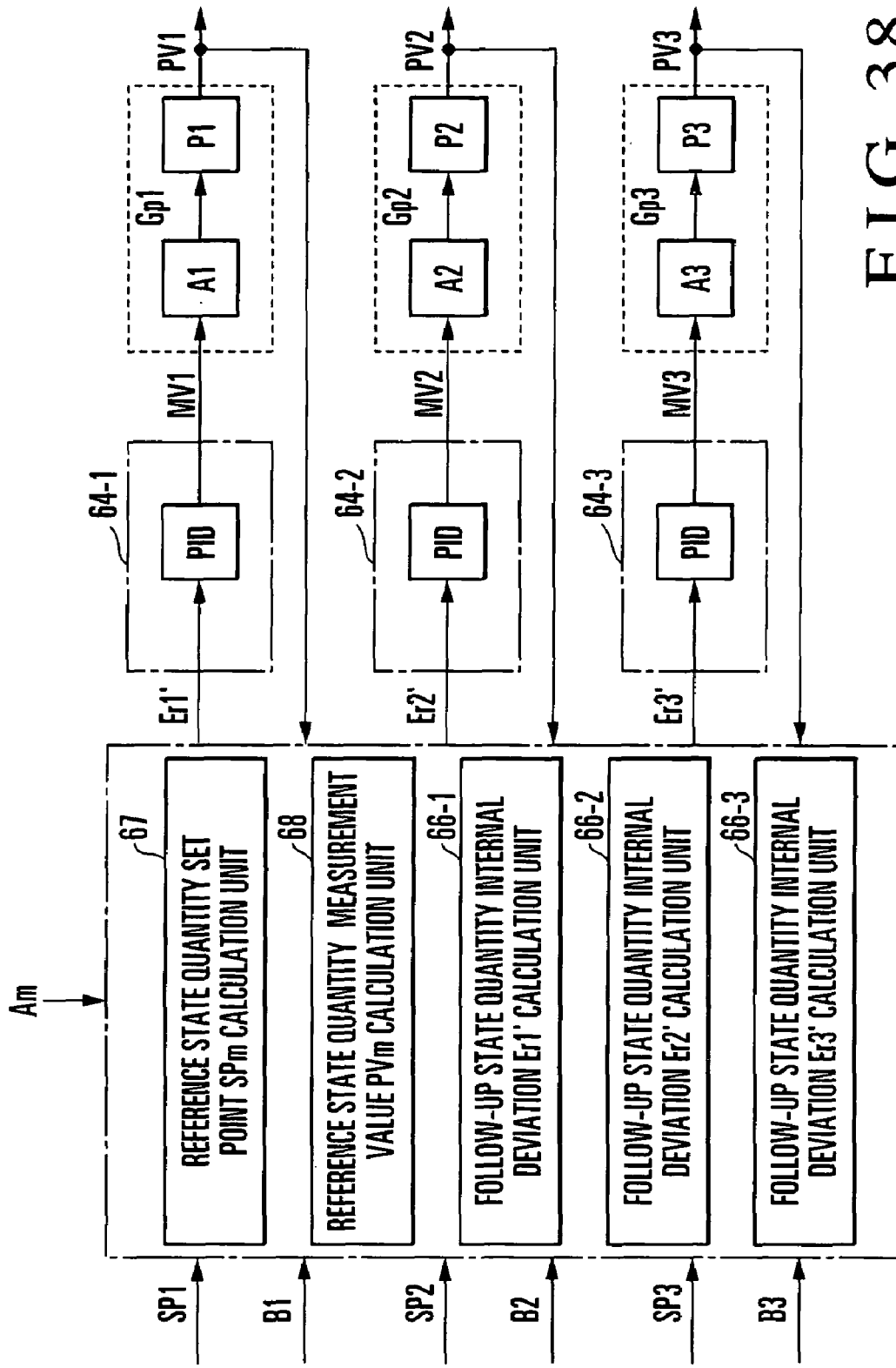
F I G. 38

CONTROL METHOD AND APPARATUS

BACKGROUND OF THE INVENTION

The present invention relates to a process control technique and, more particularly, to a control method and apparatus which handle, as a controlled system, a relative quantity such as a state quantity difference in a control system having at least two control loops.

FIG. 53A shows the arrangement of a temperature controller as a conventional control apparatus. This temperature controller is disclosed in, for example, Japanese Patent Laid-Open No. 8-095647. Heat treatment work 1016 is loaded into a furnace 1001. A heater 1011, a detection means 1012 for detecting a control temperature TC1, a detection means 1013 for detecting a surface temperature TC2 of the work 1016, and a detection means 1014 for detecting a deepest temperature TC3 of the work 1016 are arranged in the furnace 1001. Reference numeral 1002 denotes a power regulator. A control unit 1003 includes a comparator 1031 which compares the control temperature TC1 with an execution program pattern set point 1033, a control computation unit 1032 such as a PID to be controlled by an output from the comparator 1031, a temperature difference detector 1034 which detects the difference between the surface temperature TC2 and deepest temperature TC3 of the work 1016, a temperature difference setting device 1035 which sets a predetermined temperature difference, a comparator 1036 which compares an output from the temperature difference detector 1034 with an output from the temperature difference setting device 1035, a rate-of-change detector 1038 which detects the temperature rate of change of the deepest temperature TC3, a comparator 1040 which compares an output from the rate-of-change detector 1038 with an output from a rate-of-change setting device 1039 which sets a predetermined temperature rate of change, and a gradient computing device 1037 which controls the execution program pattern set point 1033 by performing gradient computation on the basis of outputs from the comparator 1036 and comparator 1040.

A maximum allowable temperature difference is set in the temperature difference setting device 1035. A maximum allowable temperature rate of change is set in the rate-of-change setting device 1039. With the arrangement in FIG. 53A, the gradient in the execution program pattern set point 1033 is always corrected such that one or both of the temperature difference and the temperature rate of change in the heat treatment work 1016 fall within designated temperature allowable values.

Consider the portion enclosed by the broken line in FIG. 53A. It can be understood that state quantity transformation is performed to calculate a temperature difference (TC2-TC3) and temperature change of rate dTC3/dt on the basis of the plurality of measured temperatures TC1, TC2, and TC3. That is, the temperature controller in FIG. 53A includes a state quantity transformation unit 1041 which calculates the temperature difference (TC2-TC3) and temperature change of rate dTC3/dt (FIG. 53B).

FIG. 54A shows the arrangement of a temperature controller which is another conventional control apparatus. This temperature controller is disclosed in, for example, Japanese Patent Laid-Open No. 9-199491. Referring to FIG. 54A, reference numeral 2002 denotes a reaction tube of a vertical heat treatment apparatus 2020. The reaction tube 2002 incorporates a temperature sensor A which detects a temperature near a semiconductor wafer mounted on a wafer boat 2021, and is provided with a temperature sensor B which detects the temperature of the outer surface of the reaction tube 2002. A deviation circuit unit 2031 outputs the deviation obtained by subtracting a correction value (to be described later) from the desired value of the temperature sensor A, i.e., the desired value of the temperature sensor B. A deviation circuit unit 2032 outputs the deviation obtained by subtracting the detected value of the temperature sensor B from the desired value of the temperature sensor B to a PID adjustment unit 2004. The PID adjustment unit 2004 performs PID computation on the basis of the input deviation, and outputs the computation result to a power control unit 2005. The power control unit 2005 controls the amount of power supplied to a heater 2006 as a heat source for the vertical heat treatment apparatus 2020 on the basis of the output value from the PID adjustment unit 2004. When the detected value of the temperature sensor B converges to the desired value, a correction value output unit 2007 corrects the desired value of the temperature sensor B by a difference (A-B) between the detected value of the temperature sensor A at the point of time of this convergence and the detected value of the temperature sensor B as a correction value. With the arrangement in FIG. 54A, the detected value of the temperature sensor A converges to the desired value.

Consider the portion enclosed by the broken line in FIG. 54A. It can be understood that state quantity transformation is performed to calculate the temperature difference (A-B) on the basis of a plurality of measured temperatures A and B. That is, the temperature controller in FIG. 54A includes a state quantity transformation unit 2008 which calculates the temperature difference (A-B) (FIG. 54B).

As described above, attempts have been made to input not only an actual state quantity itself but also a state quantity difference to a control system. When a control system is designed to handle a state quantity difference as a controlled system, in particularly, the above state quantity transformation unit is provided for the control system.

Consider here that in two control loops, a state quantity mean value PV1' and state quantity difference PV2' are controlled systems instead of state quantities PV1 and PV2 themselves. FIG. 55 shows a control apparatus in this case. The control apparatus in FIG. 55 includes a subtractor 3001 which outputs the difference between the state quantity mean value PV1' and a set point SP1' with respect to the state quantity mean value PV1', a subtractor 3002 which outputs the difference between the state quantity difference PV2' and a set point SP2' with respect to the state quantity difference PV2', controllers C1 and C2 which respectively calculate manipulated variables MV1 and MV2 on the basis of outputs from the subtractors 3001 and 3002, actuators A1 and A2 which respectively perform operations corresponding to the manipulated variables MV1 and MV2 with respect to controlled system processes P1 and P2, and a state quantity transformation unit 3003.

The state quantity transformation unit 3003 comprises multipliers 3004 and 3005 which respectively multiply the state quantities PV1 and PV2 of the controlled system processes P1 and P2 by 0.5, multipliers 3006 and 3007 which respectively multiply the state quantities PV1 and PV2 by -1 and 1, an adder 3008 which adds outputs from the multipliers 3004 and 3005, and an adder 3009 which adds outputs from the multipliers 3006 and 3007. With the state quantity transformation unit 3003, the state quantity mean values PV1' and PV2' are obtained by $$PV1' = 0.5PV1 + 0.5PV2 \qquad (1)$$

$$PV2' = PV2 - PV1 \qquad (2)$$

In addition, the input/output relationship of the state quantity transformation unit 3003 can be expressed by a matrix as follows:

$$\begin{bmatrix} PV1' \\ PV2' \end{bmatrix} = \begin{bmatrix} 0.5 & 0.5 \\ -1.0 & 1.0 \end{bmatrix} \begin{bmatrix} PV1 \\ PV2 \end{bmatrix} \quad (3)$$

Assume that the controller C1 is targeted at the state quantity mean value PV1', and the controller C2 is targeted at the state quantity difference PV2'. The controller C1 calculates the manipulated variable MV1 on the basis of the deviation between the set point SP1' and the state quantity mean value PV1'. The controller C2 calculates the manipulated variable MV2 on the basis of the deviation between the set point SP2' and the state quantity difference PV2'. At this time, in order to make the state quantity mean values PV1' and PV2' controllable, the manipulated variable MV1 calculated by the controller C1 is sent to the actuator A1, and the manipulated variable MV2 calculated by the controller C2 is sent to the actuator A2. This arrangement allows the actuator A1 to operate to control the state quantity mean value PV1', and allows the actuator A2 to operate to control the state quantity difference PV2'. Applying only the state quantity transformation unit 3003 similar to that shown in FIG. 53B or 54B to the above arrangement makes it possible to form a multi-loop control system including the controller C1 which directly controls the state quantity mean value PV1' and the controller C2 which directly controls the state quantity difference PV2', thereby controlling the state quantity mean value PV1' and state quantity difference PV2' to desired values.

When, however, a change occurs in the state quantity PV1 due to the operation of the actuator A1, the change also influences the state quantity difference PV2' owing to the function of the state quantity transformation unit 3003. Likewise, when a change occurs in the state quantity PV2 due to the operation of the actuator A2, the change also influences the state quantity mean value PV1' owing to the function of the state quantity transformation unit 3003. That is, the control apparatus shown in FIG. 55 is configured such that inter-loop interference is artificially caused by the state quantity transformation unit 3003.

Both the coefficients by which the state quantities PV1 and PV2 are multiplied to calculate the state quantity mean value PV1' are 0.5. Assuming, therefore, that a process gain Kp1 of the controlled system process P1 is almost equal to a process gain Kp2 of the controlled system process P2, the degree of influence of the operation of the actuator A1 on the state quantity mean value PV1' is almost equal to the degree of influence of the operation of the actuator A2 on the state quantity mean value PV1' (the degree of influence corresponding to the disturbance of the state quantity mean value PV1' due to the actuator A2). Likewise, both the coefficients by which the state quantities PV1 and PV2 are multiplied to calculate the state quantity difference PV2' are 1. The degree of influence of the operation of the actuator A2 on the state quantity difference PV2' is almost equal to the degree of influence of the operation of the actuator A1 on the state quantity difference PV2' (the degree of influence corresponding to the disturbance of the state quantity difference PV2' due to the actuator A1). If, therefore, the state quantity transformation unit is simply applied to the control apparatus, the artificial inter-loop interference essentially tends to increase. This tends to cause a deterioration in controllability.

In order to realize the elimination of inter-loop interference, it is easily conceivable to apply the cross controller disclosed in Kazuo Hiroi, "Basis and Application of Digital Implementation Control System", Kogyo Gijutusha, October 1987, pp. 152-156, ISBN4-905957-00-1 to the control apparatus. FIG. 56 shows the control apparatus disclosed in this reference. The control apparatus in FIG. 56 includes a subtractor 4001 which outputs the difference between a set point SP1 and a state quantity PV1, a subtractor 4002 which outputs the difference between a set point SP2 and a state quantity PV2, controllers 4003 and 4004 which respectively calculate manipulated variables MV1 and MV2 on the basis of outputs from the subtractors 4001 and 4002, and a cross controller 4005 which outputs manipulated variables MV1' and MV2' obtained by transforming the manipulated variables MV1 and MV2.

The cross controller 4005 performs the processing of canceling out the influences of inter-loop interference with respect to the manipulated variables MV1 and MV2 in advance, and comprises a multiplier 4007 which multiplies the manipulated variable MV1 by a coefficient M12, a multiplier 4008 which multiplies the manipulated variable MV2 by a coefficient M21, a subtractor 4009 which outputs the difference between the manipulated variable MV1 and an output from the multiplier 4008 as the manipulated variable MV1', and a subtractor 4010 which outputs the difference between the manipulated variable MV2 and an output from the multiplier 4007 as the manipulated variable MV2'. For the sake of simple explanation, assume that dynamic characteristics such as a process time constant and process dead time are neglected. Assume that the process gains of a controlled system process 4006 which are respectively set for the manipulated variables MV1' and MV2' are represented by Kp1 and Kp2. In this case, according to Kazuo Hiroi, "Basis and Application of Digital Implementation Control System", Kogyo Gijutusha, October 1987, pp. 152-156, ISBN4-905957-00-1, the cross controller 4005 for non-interference can be designed as follows:

$$MV1'=MV1+(-0.5\ Kp2/0.5\ Kp1)MV2 \quad (4)$$

$$MV2'=(Kp1/Kp2)MV1+MV2 \quad (5)$$

In addition, the input/output relationship of the cross controller 4005 can be expressed by a matrix as follows:

$$\begin{bmatrix} MV1' \\ MV2' \end{bmatrix} = \begin{bmatrix} 1.0 & -\dfrac{0.5Kp2}{0.5Kp1} \\ \dfrac{Kp1}{Kp2} & 1.0 \end{bmatrix} \begin{bmatrix} MV1 \\ MV2 \end{bmatrix} \quad (6)$$

That is, the above coefficient M12 becomes −Kp1/Kp2, and the coefficient M21 becomes 0.5Kp2/0.5Kp1. The manipulated variable MV1 calculated by the controller 4003 is transformed into the manipulated variable MV1' by the cross controller 4005 and is then sent to the controlled system process 4006 through an actuator (not shown). The manipulated variable MV2 calculated by the controller 4004 is transformed into the manipulated variable MV2' by the cross controller 4005 and is then sent to the controlled system process 4006 through the actuator.

FIG. 57 shows an arrangement in which the cross controller 4005 shown in FIG. 56 is applied to the control apparatus in FIG. 55. Using the state quantity transformation unit 3003 and cross controller 4005 makes it possible to realize a multi-loop control system having the first control loop mainly based on the controller C1 which exclusively controls only the state quantity mean value PV1' and the second control loop mainly based on the controller C2 which exclusively controls only the state quantity difference PV2'. If the response characteristic of the controller C1 which exclusively controls on only the state quantity mean value PV1' is adjusted in the direction to give importance to stability (low sensitivity) and the response characteristic of the controller C2 which exclusively controls only the state quantity difference PV2' is adjusted in the direction to give importance to quick response (high sensitivity), the state quantity difference PV2' follows up the set point SP2' before the state quantity mean value PV1' follows up the set point SP1'. This makes it possible to perform control to change the state quantity mean value PV1' to a desired value while maintaining the state quantity difference PV2' at a desired value.

First Problem

The output of an actual actuator has its upper and lower limits. A controller must perform manipulated variable calculation in consideration of the upper and lower limits of this output. That is, when the output of the actuator has reached its upper or lower limit and a change in state quantity has reached its limit, the controller must not increase or decrease the manipulated variable calculation result more than necessary. If a controller such as a PID controller gives no consideration to the physical upper and lower limits of an actuator, the integration windup problem arises.

This integration windup will be described below. Assume that a state quantity is a temperature and an actuator is a heater. In general, the constrains of a lower limit value of 0% and an upper limit value of 100% are provided for the heater output. When a manipulated variable MV calculated by the controller increases to reach 100%, the heater output reaches 100%. Assume that at this time, a measured temperature value PV is lower than a temperature set point SP. In this case, if the controller neglects the upper limit value "100%" of the heater output, the controller calculates a manipulated variable MV larger than 100%. However, since the heater output saturates at 100%, an increase in the measured temperature value PV with an increase in heater output reaches its limit. As a result, the controller further increases the manipulated variable MV.

Assume that when the calculated value of the manipulated variable MV keeps increasing and reaches 500%, the temperature set point SP is changed to a value lower than the measured temperature value PV. In this case, as the temperature set point SP is changed, the controller decreases the manipulated variable MV from 500%, it takes a long period of time until a manipulated variable MV lower than the upper limit value "100%" of the heater output is output from the controller. Although the temperature set point SP is changed to a value lower than the measured temperature value PV, the manipulated variable "100%" is kept output from the controller for a long period of time. This causes a long delay in the start of temperature drop. The phenomenon in which when the calculation result of the manipulated variable MV increases more than necessary and the temperature set point SP is changed to a smaller value, a decrease in the manipulated variable MV is delayed is called integration windup. This phenomenon is caused when the controller calculates a manipulated variable without any consideration to the physical upper and lower limits of the actuator.

In the control apparatus shown in FIG. 57, the manipulated variables MV1 and MV2 calculated by the controllers C1 and C2 are transformed into the manipulated variables MV1' and MV2' by the cross controller 4005. In other words, the manipulated variables MV1 and MV2 calculated by the controllers C1 and C2 are calculated as a composite manipulated variable for the plurality of actuators A1 and A2, and hence the manipulated variables MV1 an MV2 from the controllers C1 and C2 do not correspond to outputs from the actuators A1 and A2 on a one-to-one basis. Even if, therefore, the controllers C1 and C2 calculate the manipulated variables MV1 and MV2 in consideration of the upper and lower limits of outputs from the actuators A1 and A2, since the values actually output to the actuators A1 and A2 are the manipulated variables MV1' and MV2' obtained by combining the manipulated variables MV1 and MV2, manipulated variables obtained without any consideration to the upper and lower limits of outputs from the actuators A1 and A2 may be output, in effect, to the actuators A1 and A2. For this reason, in the control apparatus shown in FIG. 57, integration windup problem similar to that in the above PID controller may arise.

Second Problem

A general controller needs to adjust parameters in accordance with the characteristics of a controlled system. As an example of parameter adjustment, PID parameter adjustment is performed in a PID controller. Adjustment methods, automatic adjustment functions, and the like have been proposed to realize such parameter adjustment. A necessary condition for such adjustment methods and automatic adjustment functions is that a controller, actuator, controlled system, and measurement means basically physically correspond to each other.

Conventional parameter adjustment will be specifically described below. Consider, for example, a case wherein a state quantity is a temperature, an actuator is a heater, a controlled system is a furnace, and a measurement means is a temperature sensor such as a thermocouple. Assume that there are two control loops, which respectively comprise controllers 5003 and 5004, heaters 5005 and 5006 as actuators, furnaces 5007 and 5008 as controlled systems, and temperature sensors 5009 and 5010 as measurement means, as shown in FIG. 58. Referring to FIG. 58, reference numeral 5001 denotes a subtractor which outputs the difference between a temperature set point SP1 and a measured temperature value PV1; and 5002, a subtractor which outputs the difference between a temperature set point SP2 and a measured temperature value PV2.

In the arrangement shown in FIG. 58, although some inter-loop interference is allowed, the controller 5003 must execute control computation such that the controller 5003 outputs a manipulated variable MV1 to the heater 5005, the heater 5005 heats the furnace 5007, the temperature sensor 5009 measures a temperature near the furnace 5007, and the controller 5003 controls a measured temperature value PV1. Likewise, the controller 5004 must execute control computation such that the controller 5004 outputs a manipulated variable MV2 to the heater 5006, the heater 5006 heats the furnace 5008, the temperature sensor 5010 measures a temperature near the furnace 5008, and the controller 5004 controls a measured temperature value PV2. Making the controllers 5003 and 5004, the heaters 5005 and 5006, the furnaces 5007 and 5008, and the temperature sensors 5009 and 5010 physically correspond to each other in this manner is a necessary condition to apply a conventionally proposed adjustment method or automatic adjustment function to a control apparatus. Conversely, if the controller 5003 calculates, as one composite manipulated variable, the manipulated variables MV1 and MV2 which are distributed to the heaters 5005 and 5006 at an equal level, and the controller 5004 calculates, as one composite manipulated variable, the manipulated variables MV1 and MV2 which are distributed to the heaters 5005 and 5006 at an equal level, it is impossible to apply any conventionally proposed adjustment method or automatic adjustment function to a control apparatus.

In the control apparatus shown in FIG. 57, the manipulated variables MV1 and MV2 calculated by the controllers C1 and C2 are transformed into the manipulated variables MV1' and MV2' by the cross controller 4005. In other words, the manipulated variables MV1 and MV2 calculated by the controllers C1 and C2 are calculated as a composite manipulated variable to the plurality of actuators A1 and A2, and the manipulated variables MV1 and MV2 calculated by the controllers C1 and C2 do not correspond to outputs from the actuators A1 and A2 on a one-to-one basis. That is, this does not meet the basic condition that a controller, actuator, controlled system, and measurement means should physically correspond to each other. Therefore, any conventionally proposed adjustment method or automatic adjustment function cannot be applied to the control apparatus shown in FIG. 57, and it is very difficult to realize parameter adjustment for a controller such as PID parameter adjustment.

SUMMARY OF THE INVENTION

The present invention has been made in consideration of the above problems and, has as its object to provide a control method and apparatus which can prevent integration windup in a control system designed to change an absolute quantity such as the mean value of a plurality of state quantities to a desired value while maintaining the relative quantity between a plurality of state quantities at a desired value, and allow a conventional parameter adjustment method, automatic adjustment function, and the like to be applied to the control system.

In order to achieve the above object, according to the present invention, there is provided a control method comprising the calculation step of, when a state quantity serving as a specific reference is defined as a reference state quantity, and a state quantity which is controlled to maintain a relative quantity with respect to the reference state quantity at a specified value is defined as a follow-up state quantity, transforming one of a plurality of control computation input values input to a controller of at least two controllers respectively forming control loops, which controls the follow-up state quantity, into an internal input value, and then inputting the internal input value to the controller which controls the follow-up state quantity, and the step of causing at least the two controllers to calculate manipulated variables, respectively, and outputting the calculated manipulated variables to controlled systems of corresponding control loops, wherein in the calculation step, the internal input value is calculated by setting the internal input value as the sum of a first element for the reference state quantity and a second element for the relative quantity, an element of the control computation input value which corresponds to the reference state quantity as the first element, and a value obtained by multiplying by a predetermined first coefficient an element of the control computation input value which corresponds to the relative quantity as the second element.

BRIEF DESCRIPTION OF THE DRAWINGS

FIG. 38 is a block diagram of control systems in the fifth embodiment of the present invention;

DESCRIPTION OF THE PREFERRED EMBODIMENTS

Figure 1:
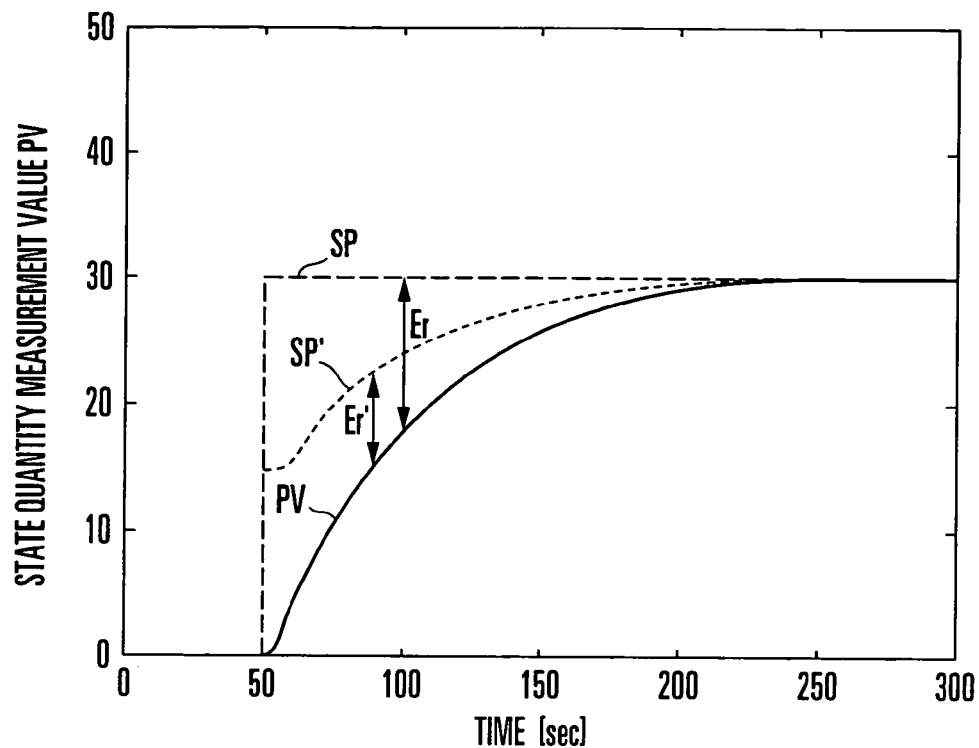
FIG. 1 is a graph for explaining changes in the response characteristic of a controller with changes in state quantity internal set point according to the present invention.

The present invention will be described in detail below with reference to the accompanying drawings.

Principles of First and Second Embodiments

In the first and second embodiments described below, an absolute state quantity serving as a reference such as a state quantity mean value will be referred to as a reference state quantity, and a state quantity controlled to maintain a relative quantity (e.g., a state quantity difference) with respect to the reference state quantity at a specified value will be referred to as a follow-up state quantity. In addition, a set point for the reference state quantity will be referred to as a reference state quantity set point; the measurement value of the reference state quantity, a reference state quantity measurement value; a set point for a follow-up state quantity, a follow-up state quantity set point; the measurement value of a follow-up state quantity, a follow-up state quantity measurement value; a set point for the relative quantity between the reference state quantity and a follow-up state quantity, a follow-up state quantity relative set point; the measurement value of the relative quantity between the reference state quantity and a follow-up state quantity, a follow-up state quantity relative measurement value; an internal set point set in the controller with respect to the reference state quantity, a reference state quantity internal set point; and an internal set point set in the controller with respect to a follow-up state quantity, a follow-up state quantity internal set point. A state quantity includes, for example, a temperature, pressure, or flow rate.

In the first and second embodiments, a manipulated variable MV is calculated by using a state quantity internal set point SP' set in the controller independently of an externally provided state quantity set point SP. At this time, the state quantity internal set point SP' is separated into an element SPm for a reference state quantity and an element ΔSP for the relative quantity between the reference state quantity and a follow-up state quantity (SP'=SPm+ΔSP). In the first and second embodiments, the set point SPm or ΔSP which is actually provided by interpolation/extrapolation computation (SP'=ASP+(1−A)PV) with respect to a state quantity measurement value is transformed into the state quantity internal set point SP' which can independently shift the sensitivity for the reference state quantity and the sensitivity for the relative quantity between the reference state quantity and a follow-up state quantity in consideration of the fact that the transformed set point can shift the characteristics of the controller to the low-sensitivity side or high-sensitivity side more effectively than when the set point is directly applied.

As described above, in the first and second embodiments, the state quantity internal set point SP' is separated into the element SPm for the reference state quantity and the element ΔSP for the relative quantity between a reference state quantity and a follow-up state quantity, and the state quantity internal set point SP' is obtained by interpolation/extrapolation computation between the state quantity set point SP and the state quantity measurement value PV and is used to calculate the manipulated variable MV. With this arrangement, in the first and second embodiments, the response characteristic is shifted to the low-sensitivity side with respect to a reference state quantity such as a state quantity mean value, and is shifted to a high-sensitivity side with respect to the relative quantity between a reference state quantity and a follow-up state quantity such as a state quantity difference, thereby allowing a follow-up state quantity relative measurement value ΔPV to follow up the follow-up state quantity relative set point ΔSP before a reference state quantity measurement value PVm follows up the reference state quantity set point SPm. This makes it possible to perform control to change the reference state quantity to a desired value while maintaining the relative quantity between the reference state quantity and the follow-up state quantity at a desired value.

According to the arrangements of the first and second embodiments, the control system in each embodiment differs from a general control system only in that the state quantity set point SP is transformed into the state quantity internal set point SP'. That is, there can be provided a control method which preferentially controls the relative quantity between a reference state quantity and a follow-up state quantity while controlling the reference state quantity in the form in which a manipulated variable from the controller corresponds to an output from an actual actuator on a one-to-one basis.

Of the above two points to be considered, the calculation of the state quantity internal set point SP' by interpolation/extrapolation computation between the state quantity set point SP and the state quantity measurement value PV (to be referred to as the first point to be considered hereinafter) will be described. Consider a case wherein the state quantity set point SP is transformed into the state quantity internal set point SP' to be set in the controller by referring to the state quantity set point SP and state quantity measurement value PV using a specific coefficient A according to the following equation:

$$SP'=ASP+(1-A)PV \qquad (7)$$

Assume that the coefficient A is a real number larger than 0. In this case, if A=1, then SP'=SP. This indicates that the state quantity set point SP is not transformed at all.

If the value of the coefficient A is set to 0<A<1 in equation (7), the transformed state quantity internal set point SP' becomes a numerical value between the original state quantity set point SP and the state quantity measurement value PV (interpolation relationship). When, therefore, a deviation is calculated by, for example, a PID controller, as shown in FIG. 1, a deviation Er'=SP'−PV between the state quantity internal set point SP' and the state quantity measurement value PV is smaller in absolute value than a deviation Er=SP−PV between the state quantity set point SP and the state quantity measurement value PV. As a consequence, when the controller calculates a manipulated variable MV' on the basis of the deviation Er', a change in manipulated variable becomes more moderate than when the controller calculates the manipulated variable MV on the basis of the deviation Er. That is, setting the coefficient A to 0<A<1 makes the response characteristic of the controller shift to the direction to give importance to stability (low sensitivity).

Figure 2:
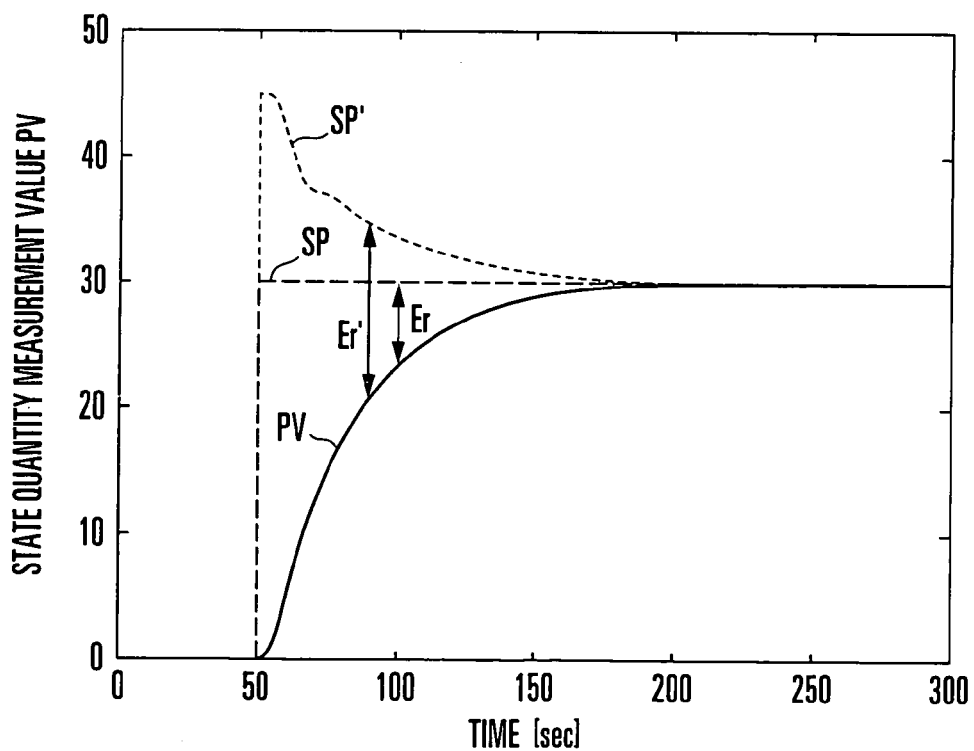
FIG. 2 is a graph for explaining changes in the response characteristic of the controller with changes in state quantity internal set point according to the present invention.

If the value of the coefficient A is set to A>1, the transformed state quantity internal set point SP' becomes a numeral value separated from the state quantity measurement value PV than the original state quantity set point SP (extrapolation relationship). When, therefore, a deviation is to be calculated by, for example, a PID controller, as shown in FIG. 2, deviation Er'=SP'−PV between the state quantity internal set point SP' and the state quantity measurement value PV becomes larger in absolute value than deviation Er=SP−PV between the state quantity set point SP and the state quantity measurement value PV. As a consequence, when the controller calculates the manipulated variable MV' on the basis of the deviation Er', a change in manipulated variable becomes steeper than when the controller calculates the manipulated variable MV on the basis of the deviation Er. That is, setting the value of the coefficient A to A>1 makes the response characteristic of the controller shift to the direction to give importance to quick response (high sensitivity).

Of the above two points to be considered, the separation of the state quantity internal set point SP' into an element for a reference state quantity and an element for the relative quantity between the reference state quantity and a follow-up state quantity (to be referred to as the second point to be considered hereinafter) will be described. When a reference state quantity and the relative quantity between the reference state quantity and a follow-up state quantity are to be simultaneously controlled, the state quantity set point SP can be separated into the element SPm for the reference state quantity and the ΔSPm for the relative quantity between the reference state quantity and the follow-up state quantity as follows:

$$SP = SPm + \Delta SPm \quad (8)$$

In accordance with the state quantity set point SP, the state quantity measurement value PV can also be separated into the reference state quantity measurement value PVm and the follow-up state quantity measurement value ΔPVm as follows:

$$PV = PVm + \Delta PVm \quad (9)$$

The first and second points to be considered can be summarized as follows according to equations (7) to (9):

$$SP' = A(SPm + \Delta SPm) + (1 - A)(PVm + \Delta PVm) \quad (10)$$
$$= ASPm + (1 - A)PVm + A\Delta SPm + (1 - A)\Delta PVm$$

In this case, ASPm+(1−A)PVm in equation (10) is an element associated with the reference state quantity, and AΔSPm+(1−A)ΔPVm is an element associated with the relative quantity between the reference state quantity and the follow-up state quantity. That is, the two elements are separated as linear binding expressions for providing an interpolation relationship and extrapolation relationship, respectively, and hence an interpolation relationship and extrapolation relationship can be provided by separate coefficients A and B as follows:

$$SP' = ASPm + (1-A)PVm + B\Delta SPm + (1-B)\Delta PVm \quad (11)$$

where A is a coefficient associated with a reference state quantity, and B is a coefficient associated with the relative quantity between the reference state quantity and a follow-up state quantity. When there are a plurality of control loops, the coefficient B associated with the relative quantity between the reference state quantity and the follow-up state quantity is preferably provided for each control loop, in particular. In this case, with respect to the ith (i is 1, 2, 3, . . . ) follow-up state quantity in a plurality of control loops, a state quantity set point SPi may be transformed as follows:

$$SPi' = AmSPm + (1 - Am)PVm + Bi\Delta SPim + (1 - Bi)\Delta PVim \quad (12)$$

where SPi' is an internal set point for the ith follow-up state quantity, ΔSPim is a follow-up state quantity relative set point which is a set point for the relative quantity between the reference state quantity and the ith follow-up state quantity, ΔPVim is a follow-up state quantity relative measurement value which is the measurement value of the relative quantity between the reference state quantity and the ith follow-up state quantity, and Bi is a coefficient associated with the relative quantity between the reference state quantity and the ith follow-up state quantity. Note that the coefficient Am associated with the reference state quantity may be provided commonly for the respective control loops or may be provided for each control loop.

Obviously, in equation (12), ΔSPim=SPi−SPm and ΔPVim=PVi−PVm, and the following equivalent substitutions can be made:

$$SPi' = AmSPm + (1 - Am)PVm + Bi\Delta SPim + (1 - Bi)(PVi - PVm) \quad (13)$$

$$SPi' = AmSPm + (1 - Am)PVm + Bi(Spi - SPm) + (1 - Bi)(PVi - PVm) \quad (14)$$

Note that the case wherein the follow-up state quantity relative measurement value ΔPVim is used differs from the case wherein a difference PVi−PVm between a follow-up state quantity measurement value PVi and the reference state quantity measurement value PVm is used only in processing in the control apparatus. In contrast to this, when the follow-up state quantity relative set point ΔSPim is used, an operator sets the reference state quantity set point SPm and follow-up state quantity relative set point ΔSPim through an interface. When a difference SPi−SPm between the follow-up state quantity set point SPi and the reference state quantity set point SPm is to be used, the operator sets the reference state quantity set point SPm and follow-up state quantity set point SPi through the interface. Owing to this difference between the two cases, they are handled as different arrangements.

In addition, equations (13) and (14) can be consolidated to the following equivalent equations:

$$SPi' = PVi + Am(SPm - PVm) + Bi\{\Delta SPim - (PVi - PVm)\} \quad (15)$$

$$SPi' = PVi + Am(SPm - PVm) + Bi\{(SPi - SPm) - (PVi - PVm)\} \quad (16)$$

In addition, regarding SPi=SPi"+ΔSPi" and PVi=PVi"+ΔPVi" makes it easy to perform equivalent transformation of equation (14) as follows:

$$SPi' = AmSPm + (1 - Am)PVm + Bi(SPi - SPm) + (1 - Bi)(PVi - PVm) \quad (17)$$
$$= AmSPm + (1 - Am)PVm + Bi(SPi'' + \Delta SPi'' - SPm) + (1 - Bi)(PVi'' + \Delta PVi'' - PVm)$$
$$= AmSPm + (1 - Am)PVm + Bi(SPi'' - SPm'') + (1 - Bi)(PVi'' - PVm'')$$

where SPi" and ΔSPi" are elements SPi" and ΔSPi" respectively corresponding to absolute and relative quantities when the follow-up state quantity set point SPi is separated into another absolute quantity and another relative quantity, and PVi" and ΔPVi" are elements PVi" and ΔPVi" respectively corresponding to absolute and relative quantities when a follow-up state quantity measurement value PVi is separated into another absolute quantity and another relative quantity. In this case, SPm"=SPm−ΔSPi" and PVm"=PVm−ΔPVi". That is, with regard to an element associated with the relative quantity between a reference state quantity and a follow-up state quantity, substituting SPm" or PVm" for SPm or PVm is equivalent to a linear binding expression as long as the relationship between the two elements is clear, and does not fall outside the ranges of the basic technical ideas of the first and second embodiments.

According to the above principle, the state quantity internal set point SP' can be obtained, which can separately shift the sensitivity for a reference state quantity and the sensitivity for the relative quantity between the reference state quantity and a follow-up state quantity.

The principle of preferentially controlling the relative quantity between a reference state quantity and a follow-up state quantity will be described next. If the relationship between a coefficient Am associated with a reference state quantity and a coefficient Bi associated with the relative quantity between the reference state quantity and the follow-up state quantity is defined by Am=Bi=1 in equation (14), then SPi'=SPi. The state quantity internal set point SPi' at this point of time has not changed at all from the state quantity set point SPi, and the sensitivity has not changed from that in normal control.

In this case, the coefficient Bi associated with the relative quantity between the reference state quantity and the follow-up state quantity is especially important, and especially the sensitivity for the relative quantity between the reference state quantity and the follow-up state quantity improves when Bi>1 is set. This can operate the control apparatus to preferentially control the relative quantity. Therefore, the problem in the present invention can be solved by always setting the coefficient Am associated with the reference state quantity to Am=1, and hence it suffices to perform the following transformation to the state quantity internal set point SPi':

$$SPi' = SPm + Bi\Delta SPim + (1 - Bi)(PVi - PVm) \quad (18)$$

$$SPi' = SPm + Bi(SPi - SPm) + (1 - Bi)(PVi - PVm) \quad (19)$$

$$SPi' = PVi + (SPm - PVm) + Bi\{\Delta SPim - (PVi - PVm)\} \quad (20)$$

$$SPi' = PVi + (SPm - PVm) + Bi\{(SPi - SPm) - (PVi - PVm)\} \quad (21)$$

Note, however, that if only the sensitivity for the relative quantity between a reference state quantity and a follow-up state quantity is improved, the sensitivity may be excessive to make the control system unstable before satisfactory control characteristics for a relative quantity are obtained. In such a case, instability can be eliminated by setting the coefficient Am associated with a reference state quantity to Am<1 instead of returning the coefficient Bi associated with the relative quantity between the reference state quantity and the follow-up state quantity to a small value. This can also avoid the sacrifice of the priority of the relative quantity between a reference state quantity and a follow-up state quantity. It is therefore more preferable to use a transformation expression which allows adjustment of the coefficient Am associated with a reference state quantity.

First Embodiment

Figure 3:
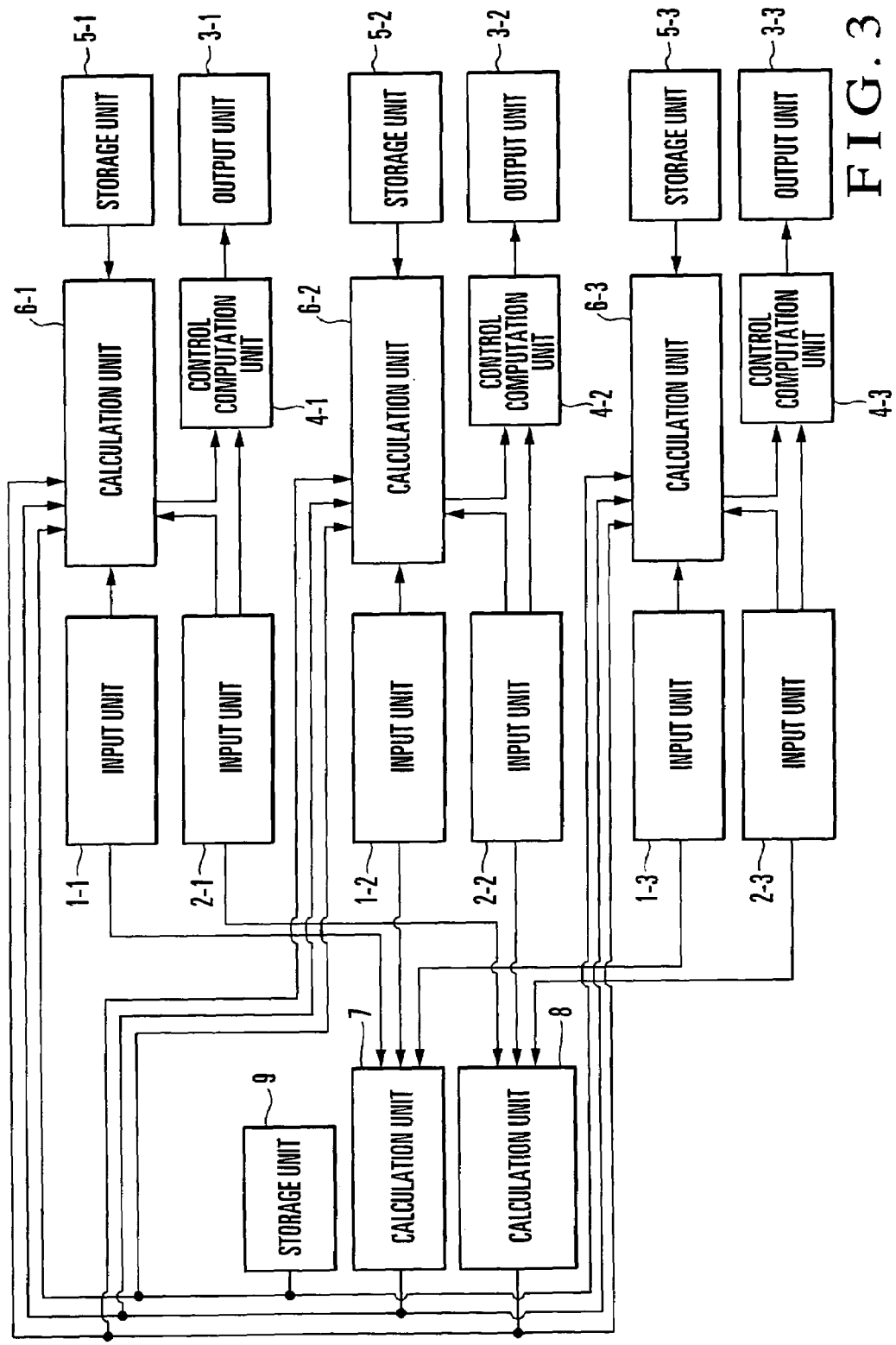
FIG. 3 is a block diagram showing the arrangement of a control apparatus according to the first embodiment of the present invention.

The first embodiment of the present invention will be described in detail below with reference to the accompanying drawings. FIG. 3 shows the arrangement of a control apparatus according to the first embodiment of the present invention. This embodiment exemplifies a case wherein there are three control loops, the state quantity mean value of the three control loops is used as a reference state quantity, and the state quantities of the three control loops are used as follow-up state quantities. However, as long as there are two or more control loops, a similar control system can be formed on a similar principle.

In the control apparatus in FIG. 3, the arrangement of the first control system associated with the first follow-up state quantity comprises a follow-up state quantity set point SP1 input unit 1-1, a follow-up state quantity measurement value PV1 input unit 2-1, a manipulated variable MV1 output unit 3-1, a PID control computation unit (PID controller) 4-1, a coefficient B1 storage unit 5-1, and a follow-up state quantity internal set point SP1' calculation unit 6-1 serving as an internal input value calculation unit. In the control apparatus in FIG. 3, the arrangement of the second control system associated with the second follow-up state quantity comprises a follow-up state quantity set point SP2 input unit 1-2, a follow-up state quantity measurement value PV2 input unit 2-2, a manipulated variable MV2 output unit 3-2, a PID control computation unit 4-2, a coefficient B2 storage unit 5-2, and a follow-up state quantity internal set point SP2' calculation unit 6-2 serving as an internal input value calculation unit. In the control apparatus in FIG. 3, the arrangement of the third control system associated with the third follow-up state quantity comprises a follow-up state quantity set point SP3 input unit 1-3, a follow-up state quantity measurement value PV3 input unit 2-3, a manipulated variable MV3 output unit 3-3, a PID control computation unit 4-3, a coefficient B3 storage unit 5-3, and a follow-up state quantity internal set point SP3' calculation unit 6-3 serving as an internal input value calculation unit.

In addition, in the control apparatus in FIG. 3, an arrangement associated with a reference state quantity comprises a reference state quantity set point SPm calculation unit 7 which calculates the mean value of a follow-up state quantity set point SP1, follow-up state quantity set point SP2, and follow-up state quantity set point SP3 as a reference state quantity set point SPm, a reference state quantity measurement value PVm calculation unit 8 which calculates the mean value of a follow-up state quantity measurement value PV1, follow-up state quantity measurement value PV2, and follow-up state quantity measurement value PV3 as a reference state quantity measurement value PVm, and a coefficient Am storage unit 9.

Figure 4:
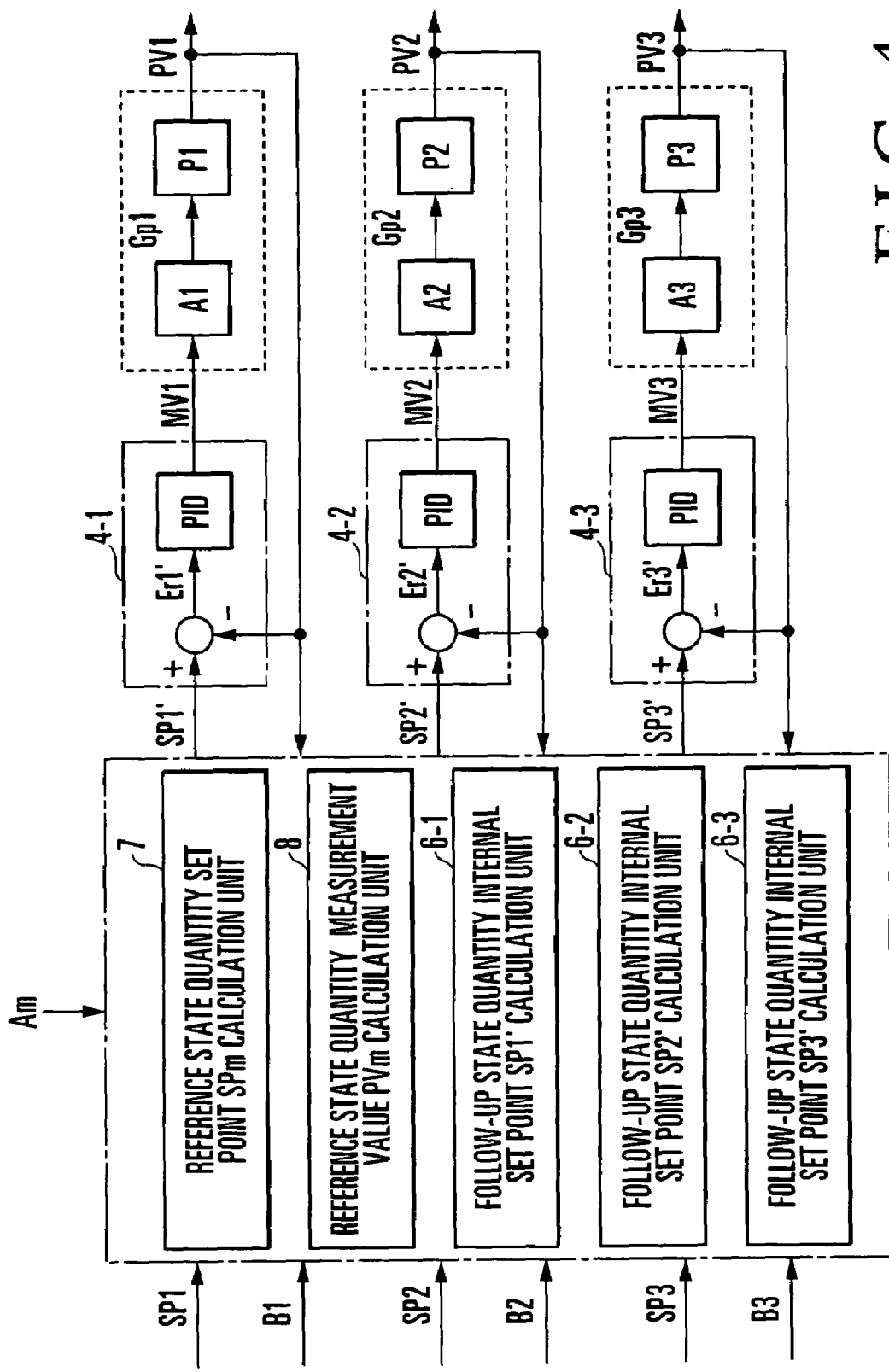
FIG. 4 is a block diagram showing control systems in the first embodiment of the present invention.

FIG. 4 shows a control system in this embodiment. Referring to FIG. 4, reference symbol Er1' denotes the deviation between a first follow-up state quantity internal set point SP1' and the first follow-up state quantity measurement value PV1; Er 2', the deviation between a second follow-up state quantity internal set point SP2' and the second follow-up state quantity measurement value PV2; Er 3', the deviation between a third follow-up state quantity internal set point SP3' and the third follow-up state quantity measurement value PV3; Am, a coefficient associated with a reference state quantity; B1, a coefficient associated with the state quantity difference between the first follow-up state quantity and the reference state quantity; B2, a coefficient associated with the state quantity difference between the second follow-up state quantity and the reference state quantity; B3, a coefficient associated with the state quantity difference between the third follow-up state quantity and the reference state quantity; A1, an actuator which controls the first follow-up state quantity; A2, an actuator which controls the second follow-up state quantity; A3, an actuator which controls the third follow-up state quantity; P1, a controlled system process associated with the first follow-up state quantity; P2, a controlled system process associated with the second follow-up state quantity; P3, a controlled system process associated with the third follow-up state quantity; Gp1, a transfer function for a block including the actuator A1 and process P1; Gp2, a transfer function for a block including the actuator A2 and process P2; and Gp3, a transfer function for a block including the actuator A3 and process P3.

The follow-up state quantity set point SP1 input unit 1-1, follow-up state quantity measurement value PV1 input unit 2-1, manipulated variable MV1 output unit 3-1, PID control computation unit 4-1, follow-up state quantity internal set point SP1' calculation unit 6-1, actuator A1, and process P1 constitute the first control system (first control loop). The follow-up state quantity set point SP2 input unit 1-2, follow-up state quantity measurement value PV2 input unit 2-2, manipulated variable MV2 output unit 3-2, PID control computation unit 4-2, follow-up state quantity internal set point SP2' calculation unit 6-2, actuator A2, and process P2 constitute the second control system (second control loop). The follow-up state quantity set point SP3 input unit 1-3, follow-up state quantity measurement value PV3 input unit 2-3, manipulated variable MV3 output unit 3-3, PID control computation unit 4-3, follow-up state quantity internal set point SP3' calculation unit 6-3, actuator A3, and process P3 constitute the third control system (third control loop).

Figure 5:
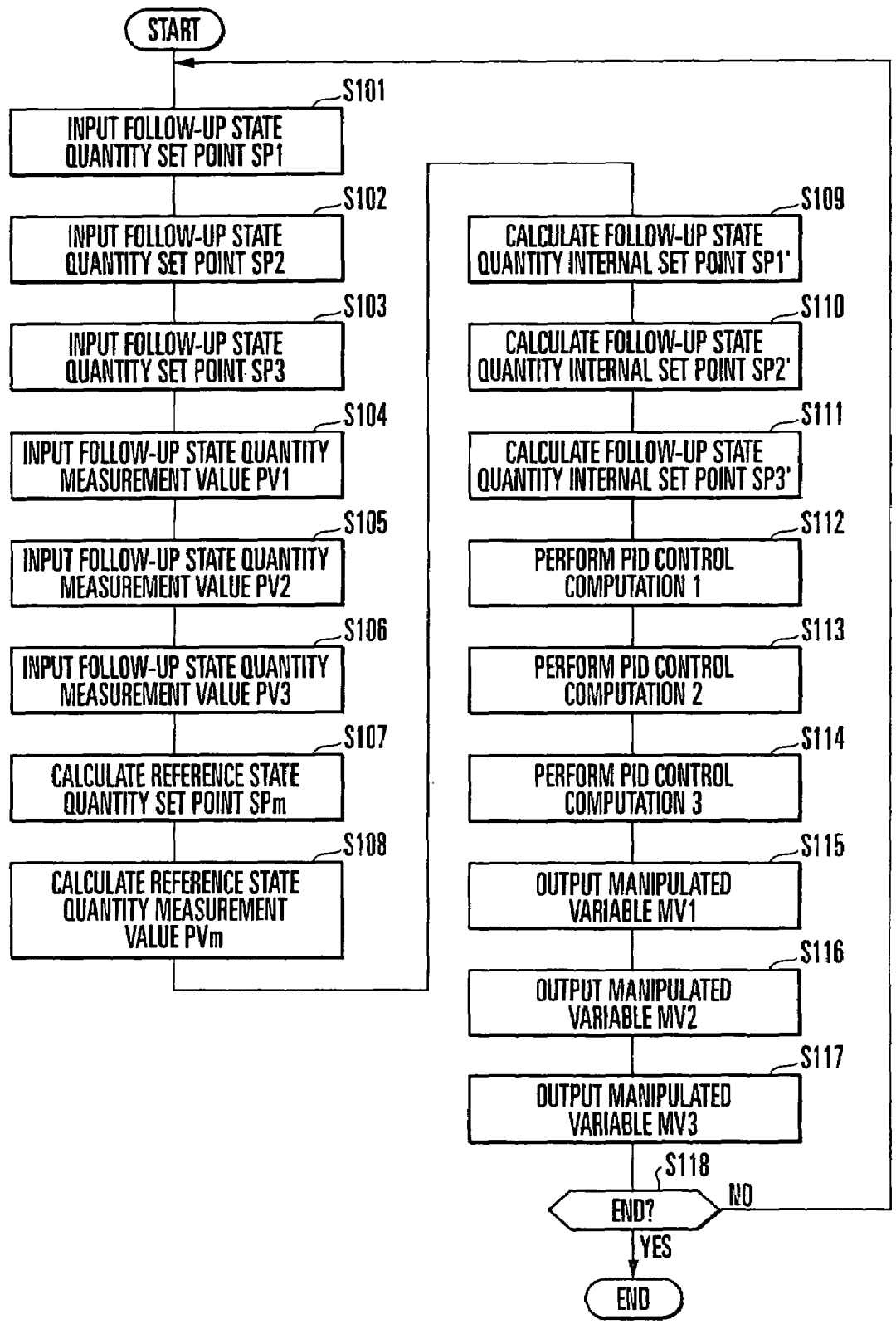
FIG. 5 is a flowchart showing the operation of the control apparatus according to the first embodiment of the present invention.

The operation of the control apparatus according to this embodiment will be described next with reference to FIG. 5. First of all, the follow-up state quantity set point SP1 is set by the operator of the control apparatus and input to the follow-up state quantity internal set point SP1' calculation unit 6-1 and reference state quantity set point SPm calculation unit 7 through the follow-up state quantity set point SP1 input unit 1-1 (step S101 in FIG. 5). The follow-up state quantity set point SP2 is set by the operator and input to the follow-up state quantity internal set point SP2' calculation unit 6-2 and reference state quantity set point SPm calculation unit 7 through the follow-up state quantity set point SP2 input unit 1-2 (step S102). The follow-up state quantity set point SP3 is set by the operator and input to the follow-up state quantity internal set point SP3' calculation unit 6-3 and reference state quantity set point SPm calculation unit 7 through the follow-up state quantity set point SP3 input unit 1-3 (step S103).

The follow-up state quantity measurement value PV1 is detected by the first detection means (not shown) and input to the PID control computation unit 4-1, follow-up state quantity internal set point SP1' calculation unit 6-1, and reference state quantity measurement value PVm calculation unit 8 through the follow-up state quantity measurement value PV1 input unit 2-1 (step S104). The follow-up state quantity measurement value PV2 is detected by the second detection means (not shown) and input to the PID control computation unit 4-2, follow-up state quantity internal set point SP2' calculation unit 6-2, and reference state quantity measurement value PVm calculation unit 8 through the follow-up state quantity measurement value PV2 input unit 2-2 (step S105). The follow-up state quantity measurement value PV3 is detected by the third detection means (not shown) and input to the PID control computation unit 4-3, follow-up state quantity internal set point SP3' calculation unit 6-3, and reference state quantity measurement value PVm calculation unit 8 through the follow-up state quantity measurement value PV3 input unit 2-3 (step S106).

Subsequently, the reference state quantity set point SPm calculation unit 7 calculates the mean value of the follow-up state quantity set point SP1, follow-up state quantity set point SP2, and follow-up state quantity set point SP3 as the reference state quantity set point SPm according to the following equation, and outputs the reference state quantity set point SPm to the follow-up state quantity internal set point SP1' calculation unit 6-1, follow-up state quantity internal set point SP2' calculation unit 6-2, and follow-up state quantity internal set point SP3' calculation unit 6-3 (step S107).

$$SPm = (SP1 + SP2 + SP3)/3 \tag{22}$$

The reference state quantity measurement value PVm calculation unit 8 calculates the mean value of the follow-up state quantity measurement value PV1, follow-up state quantity measurement value PV2, and follow-up state quantity measurement value PV3 as the reference state quantity measurement value PVm according to the following equation, and outputs the reference state quantity measurement value PVm to the follow-up state quantity internal set point SP1' calculation unit 6-1, follow-up state quantity internal set point SP2' calculation unit 6-2, and follow-up state quantity internal set point SP3' calculation unit 6-3 (step S108).

$$PVm = (PV1 + PV2 + PV3)/3 \tag{23}$$

The coefficient Am storage unit 9 stores the coefficient Am associated with a reference state quantity in advance, and the coefficient B1 storage unit 5-1 stores the coefficient B1 associated with the state quantity difference between the first follow-up state quantity and the reference state quantity in advance. The follow-up state quantity internal set point SP1' calculation unit 6-1 calculates the follow-up state quantity internal set point SP1' on the basis of the coefficients Am and B1, the reference state quantity set point SPm, the reference state quantity measurement value PVm, the follow-up state quantity set point SP1, and the follow-up state quantity measurement value PV1 according to the following equation (step S109).

$$SP1' = \tag{24}$$
$$AmSPm + (1 - Am)PVm + B1(SP1 - SPm) + (1 - B1)(PV1 - PVm)$$

The coefficient B2 storage unit 5-2 stores the coefficient B2 associated with the state quantity difference between the second follow-up state quantity and the reference state quantity in advance. The follow-up state quantity internal set point SP2' calculation unit 6-2 calculates the follow-up state quantity internal set point SP2' on the basis of the coefficients Am and B2, the reference state quantity set point SPm, the reference state quantity measurement value PVm, the follow-up state quantity set point SP2, and the follow-up state quantity measurement value PV2 according to the following equation (step S110).

$$SP2' = \tag{25}$$
$$AmSPm + (1 - Am)PVm + B2(SP2 - SPm) + (1 - B2)(PV2 - PVm)$$

The coefficient B3 storage unit 5-3 stores the coefficient B3 associated with the state quantity difference between the third follow-up state quantity and the reference state quantity in advance. The follow-up state quantity internal set point SP3' calculation unit 6-3 calculates the follow-up state quantity internal set point SP3' on the basis of the coefficients Am and B3, the reference state quantity set point SPm, the reference state quantity measurement value PVm, the follow-up state quantity set point SP3, and the follow-up state quantity measurement value PV3 according to the following equation (step S111).

$$SP3' = \quad (26)$$
$$AmSPm + (1 - Am)PVm + B3(SP3 - SPm) + (1 - B3)(PV3 - PVm)$$

The PID control computation unit 4-1 calculates a manipulated variable MV1 by performing PID control computation represented by the following transfer function equation (step S112).

$$MV1=(100/Pb1)\{1+(1/Ti1s)+Td1s\}(SP1'-PV1) \quad (27)$$

where Pb1 is a proportional band, Ti1 is a reset time, Td1 is a rate time, and s is a Laplace operator. Note that as a measure against integration windup, the PID control computation unit 4-1 performs manipulated variable upper/lower limit processing as follows. If the calculated manipulated variable MV1 is smaller than a lower limit value OL1 of the output of the actuator A1, the PID control computation unit 4-1 sets manipulated variable MV1=OL1. If the calculated manipulated variable MV1 is larger than an upper limit value OH1 of the output of the actuator A1, the PID control computation unit 4-1 sets manipulated variable MV1=OH1.

The PID control computation unit 4-2 calculates a manipulated variable MV2 by performing PID control computation represented by the following transfer function equation (step S113).

$$MV2=(100/Pb2)\{1+(1/Ti2s)+Td2s\}(SP2'-PV2) \quad (28)$$

where Pb2 is a proportional band, Ti2 is a reset time, and Td2 is a rate time. Note that as a measure against integration windup, the PID control computation unit 4-2 performs manipulated variable upper/lower limit processing as follows. If the calculated manipulated variable MV2 is smaller than a lower limit value OL2 of the output of the actuator A2, the PID control computation unit 4-2 sets manipulated variable MV2=OL2. If the calculated manipulated variable MV2 is larger than an upper limit value OH2 of the output of the actuator A2, the PID control computation unit 4-2 sets manipulated variable MV2=OH2.

The PID control computation unit 4-3 calculates a manipulated variable MV3 by performing PID control computation represented by the following transfer function equation (step S114).

$$MV3=(100/Pb3)\{1+(1/Ti3s)+Td3s\}(SP3'-PV3) \quad (29)$$

where Pb3 is a proportional band, Ti3 is a reset time, and Td3 is a rate time. Note that as a measure against integration windup, the PID control computation unit 4-3 performs manipulated variable upper/lower limit processing as follows. If the calculated manipulated variable MV3 is smaller than a lower limit value OL3 of the output of the actuator A3, the PID control computation unit 4-3 sets manipulated variable MV3=OL3. If the calculated manipulated variable MV3 is larger than an upper limit value OH3 of the output of the actuator A3, the PID control computation unit 4-3 sets manipulated variable MV3=OH3.

The manipulated variable MV1 output unit 3-1 outputs the manipulated variable MV1 calculated by the PID control computation unit 4-1 to the actuator A1 (step S115). The actuator A1 operates to control the first follow-up state quantity on the basis of the manipulated variable MV1.

The manipulated variable MV2 output unit 3-2 outputs the manipulated variable MV2 calculated by the PID control computation unit 4-2 to the actuator A2 (step S116). The actuator A2 operates to control the second follow-up state quantity on the basis of the manipulated variable MV2.

The manipulated variable MV3 output unit 3-3 outputs the manipulated variable MV3 calculated by the PID control computation unit 4-3 to the actuator A3 (step S117). The actuator A3 operates to control the first follow-up state quantity on the basis of the manipulated variable MV3.

The above processing in steps S101 to S117 is repeatedly executed in control cycles until the end of control is designated by the operator (YES in step S118).

FIGS. 6A, 7A, 8A, 9A, and 10A show the step responses of the control system when the follow-up state quantity set points SP1, SP2, and SP3 are changed to 30.0. FIGS. 6B, 7B, 8B, 9B, and 10B show the disturbance responses of the control system when disturbances are applied to the system while the system is stabilized with SP1=30.0, SP2=30.0, and SP3=30.0. Simulation conditions are set as follows.

First of all, the transfer function Gp1 for the block including the actuator A1 and process P1, the transfer function Gp2 for the block including the actuator A2 and process P2, and the transfer function Gp3 for the block including the actuator A3 and process P3 are set according to the following equations. Assume that there is no interference between the control loops.

$$Gp1=1.2 \exp(-2.0s)/\{(1+70.0s)(1+10.0s)\} \quad (30)$$

$$Gp2=1.6 \exp(-2.0s)/\{(1+60.0s)(1+10.0s)\} \quad (31)$$

$$Gp3=2.0 \exp(-2.0s)/\{(1+50.0s)(1+10.0s)\} \quad (32)$$

In accordance with the manipulated variables MV1, MV2, and MV3, the follow-up state quantity measurement values PV1, PV2 and PV3 are determined as follows:

$$PV1=Gp1MV1 \quad (33)$$

$$PV2=Gp2MV2 \quad (34)$$

$$PV3=Gp3MV3 \quad (35)$$

Assume that the proportional band Pb1, reset time Ti1, and rate time Td1 as PID parameters in the PID control computation unit 4-1 are respectively set to 50.0, 35.0 and 20.0, the proportional band Pb2, reset time Ti2, and rate time Td2 as PID parameters in the PID control computation unit 4-2 are respectively set to 66.7, 35.0, and 20.0, and the proportional band Pb3, reset time Ti3, and rate time Td3 as PID parameters in the PID control computation unit 4-3 are respectively set to 100.0, 35.0, and 20.0.

Figure 6A:
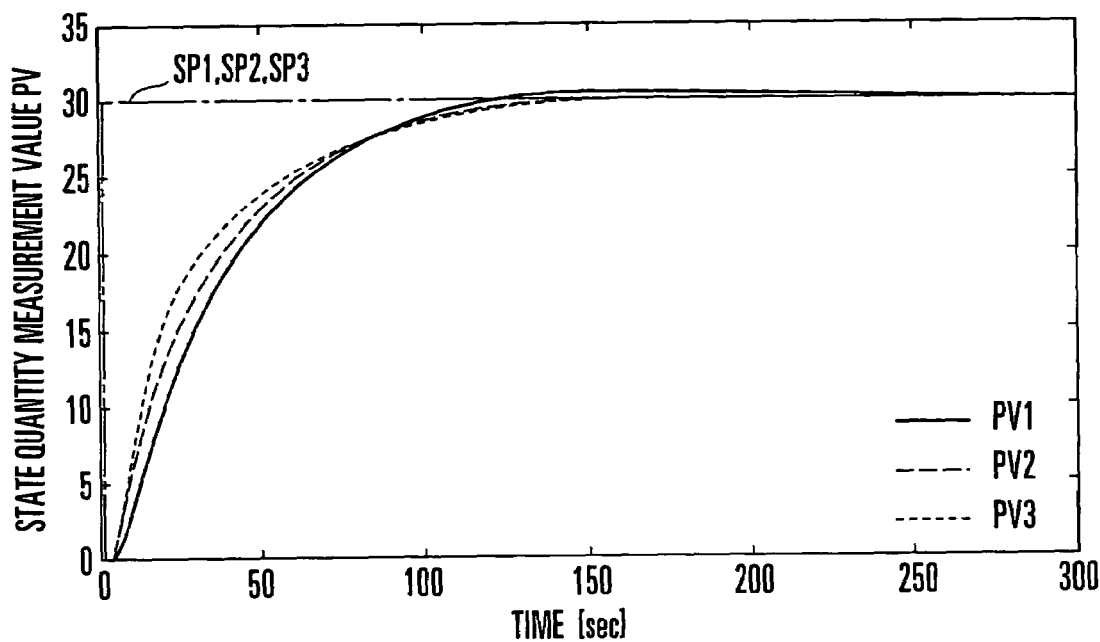
FIG. 6A is a graph showing the step responses of the control systems when follow-up state quantity set points are changed in the control apparatus according to the first embodiment of the present invention.
Figure 6B:
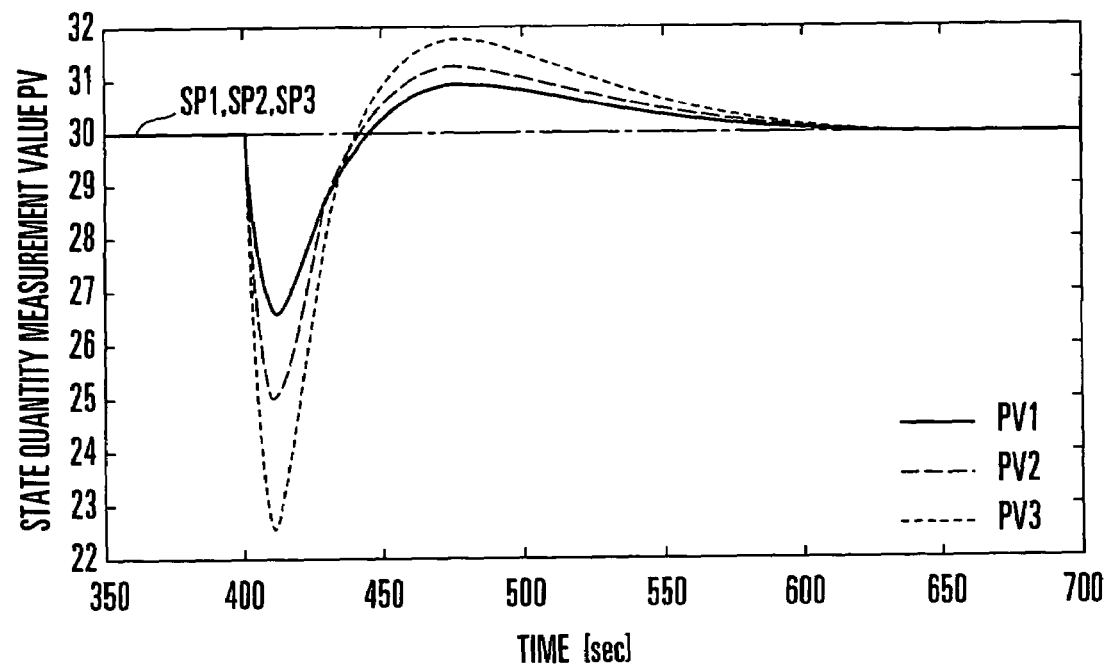
FIG. 6B is a graph showing the disturbance responses of the control systems when disturbances are applied to the control apparatus according to the first embodiment of the present invention.

The simulation result shown in FIGS. 6A and 6B is obtained with settings equivalent to general control (Am=1.0, B1=1.0, B2=1.0, and B3=1.0), and the follow-up state quantity measurement values PV1, PV2, and PV3 do not coincide with each other because the relative state quantities (state quantity differences) are not controlled.

Figure 7A:
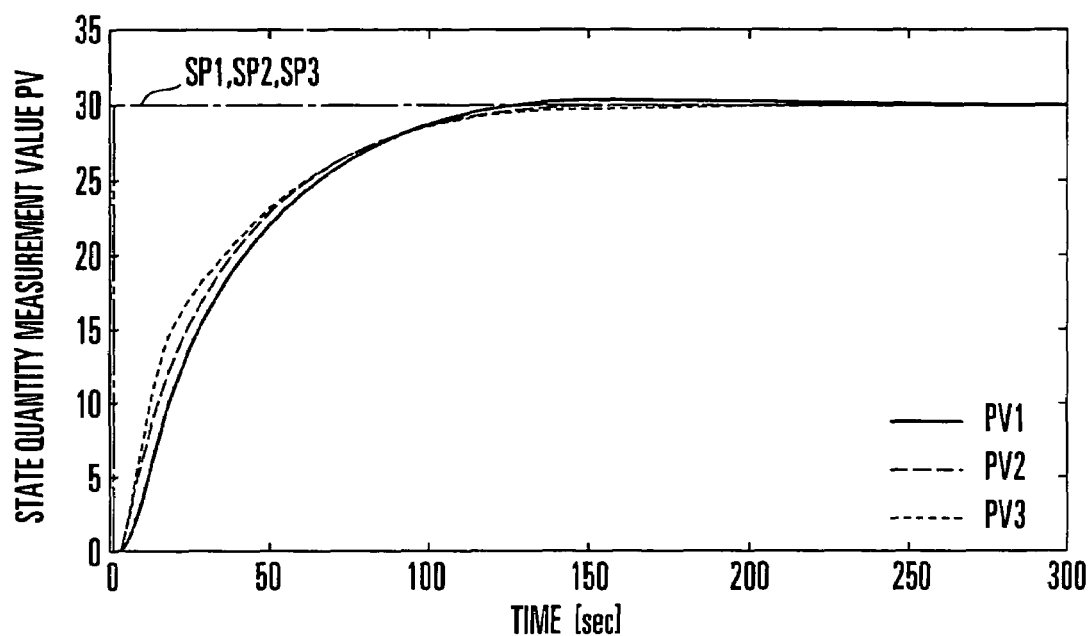
FIG. 7A is a graph showing the step responses of the control systems when follow-up state quantity set points are changed in the control apparatus according to the first embodiment of the present invention.
Figure 7B:
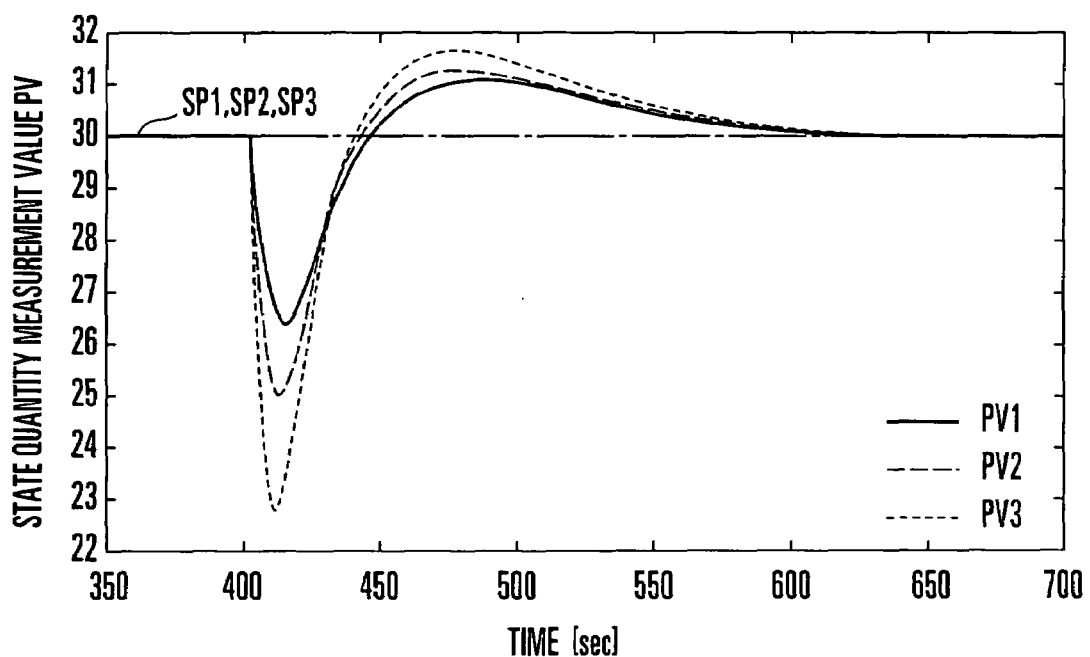
FIG. 7B is a graph showing the disturbance responses of the control systems when disturbances are applied to the control apparatus according to the first embodiment of the present invention.

The simulation result shown in FIGS. 7A and 7B is obtained with settings that allow to moderately obtain the effect of this embodiment (Am=1.0, B1=1.5, B2=1.5, and B3=1.5), and the follow-up state quantity measurement values PV1, PV2, and PV3 coincide with each other compared with the case shown in FIGS. 6A and 6B because the relative state quantities (state quantity differences) are controlled to some extent.

Figure 8A:
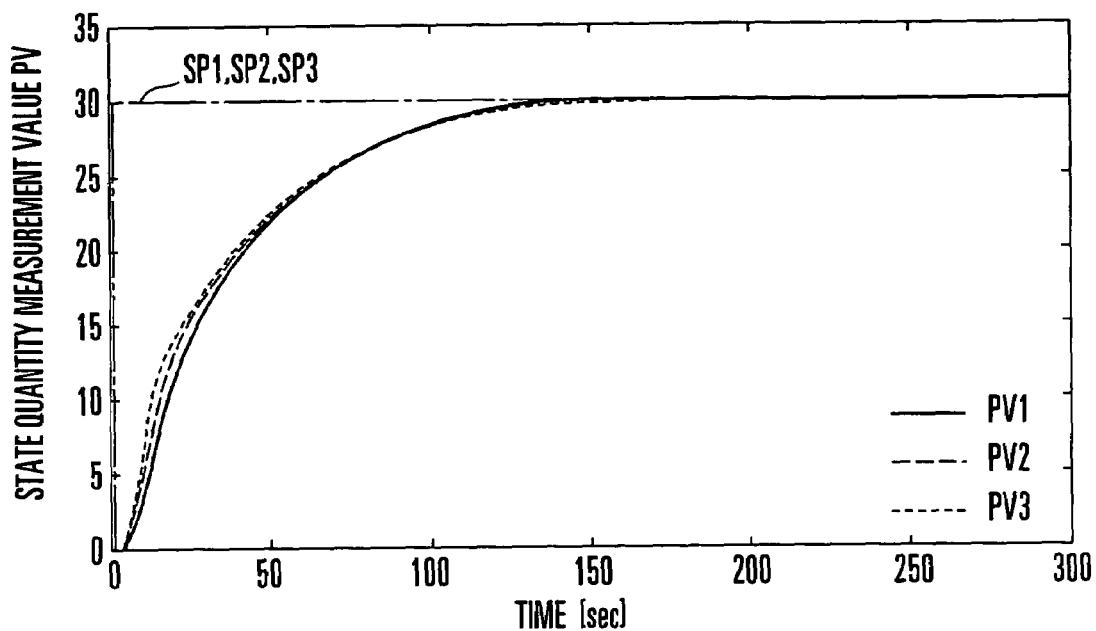
FIG. 8A is a graph showing the step responses of the control systems when follow-up state quantity set points are changed in the control apparatus according to the first embodiment of the present invention.
Figure 8B:
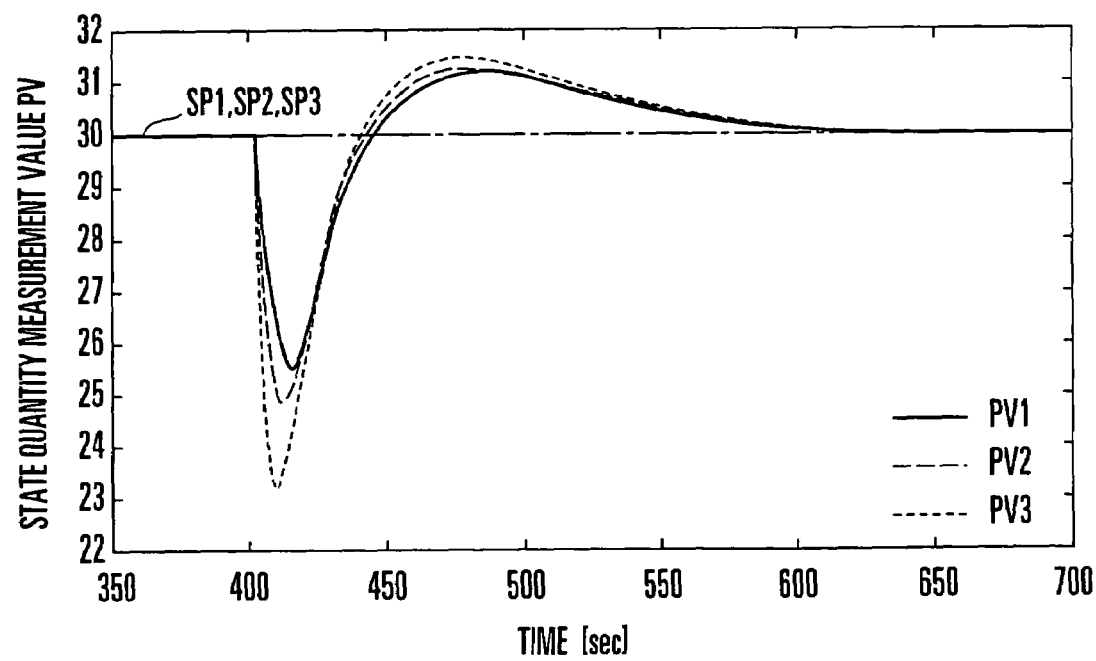
FIG. 8B is a graph showing the disturbance responses of the control systems when disturbances are applied to the control apparatus according to the first embodiment of the present invention.

The simulation result shown in FIGS. 8A and 8B is obtained with settings that allow to noticeably obtain the effect of this embodiment (Am=1.0, B1=3.0, B2=3.0, and B3=3.0), and the follow-up state quantity measurement values PV1, PV2, and PV3 noticeably coincide with each other compared with the case shown in FIGS. 6A and 6B because the relative state quantities (state quantity differences) are sufficiently controlled.

Figure 9A:
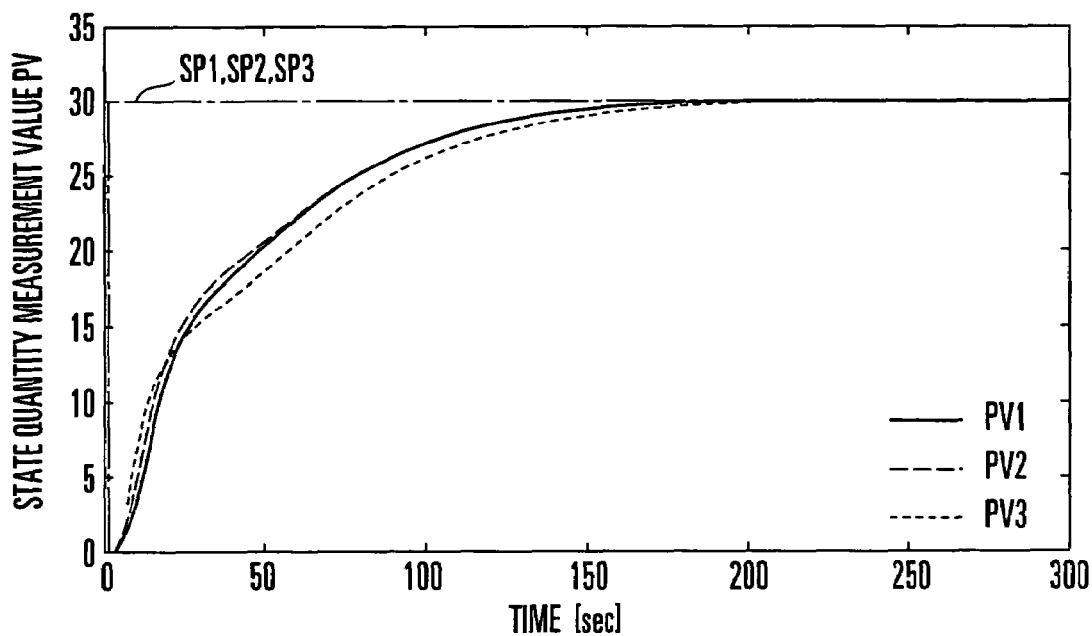
FIG. 9A is a graph showing the step responses of the control systems when follow-up state quantity set points are changed in the control apparatus according to the first embodiment of the present invention.
Figure 9B:
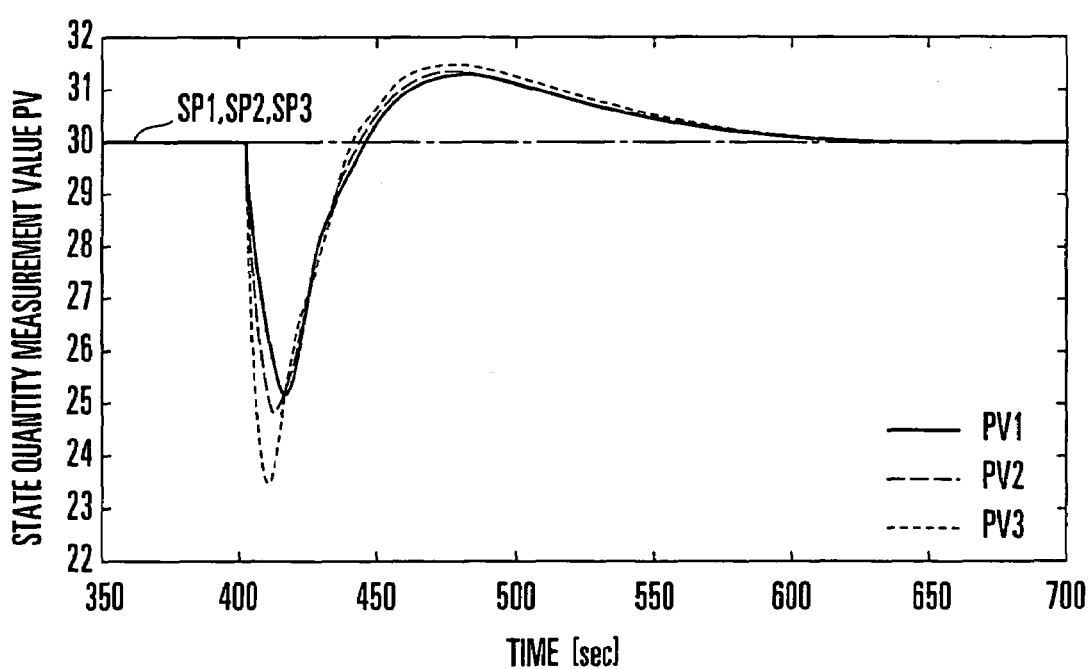
FIG. 9B is a graph showing the disturbance responses of the control systems when disturbances are applied to the control apparatus according to the first embodiment of the present invention.

The simulation result shown in FIGS. 9A and 9B is obtained with settings that result in the excessive effect of this embodiment (Am=1.0, B1=4.0, B2=4.0, and B3=4.0), and the follow-up state quantity measurement values PV1, PV2, and PV3 do not coincide with each other compared with the case shown in FIGS. 8A and 8B because control becomes unstable at the time of step response.

Figure 10A:
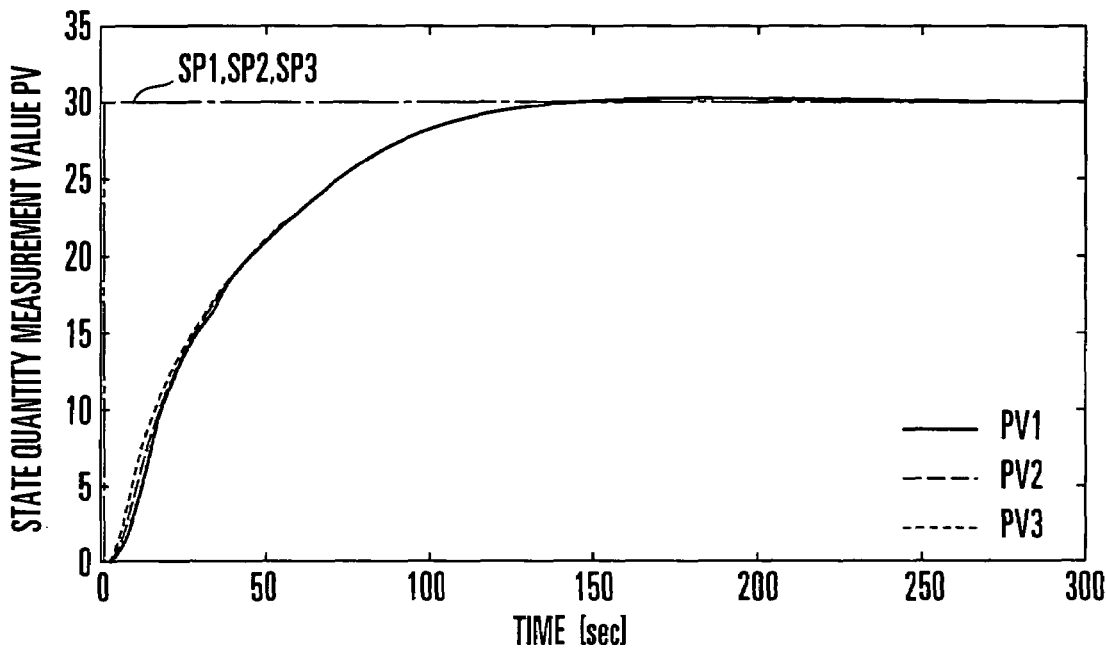
FIG. 10A is a graph showing the step responses of the control systems when follow-up state quantity set points are changed in the control apparatus according to the first embodiment of the present invention.
Figure 10B:
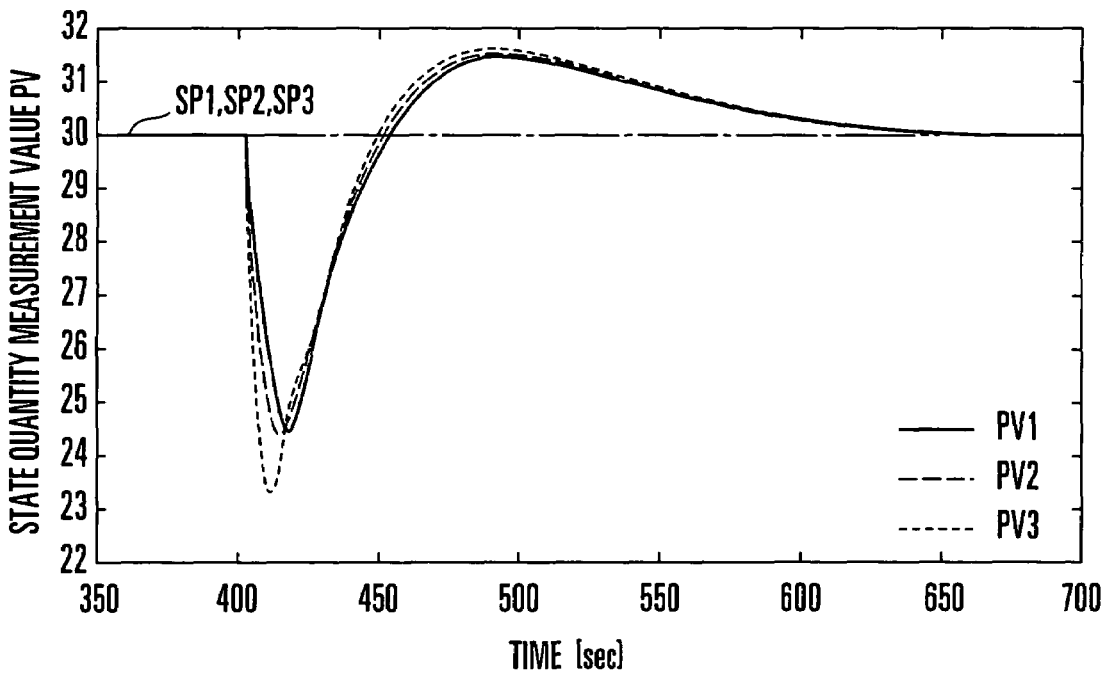
FIG. 10B is a graph showing the disturbance responses of the control systems when disturbances are applied to the control apparatus according to the first embodiment of the present invention.

The simulation result shown in FIGS. 10A and 10B is obtained with settings that avoid the excessive effect of this embodiment (Am=0.7, B1=4.0, B2=4.0, and B3=4.0), and the follow-up state quantity measurement values PV1, PV2, and PV3 further coincide with each other compared with the case shown in FIGS. 8A and 8B because the reference state quantity is shifted to the low-sensitivity side.

In the simulation results shown in FIGS. 6A and 6B to FIGS. 10A and 10B, setting SP1=SP2=SP3=30.0 makes all the state quantity differences between the first follow-up state quantity and the second follow-up state quantity, between the second follow-up state quantity and the third follow-up state quantity, and between the third follow-up state quantity and the first follow-up state quantity become 0.

If the follow-up state quantity set points SP1, SP2, and SP3 are set to different values, the state quantity measurement values PV1, PV2, and PV3 change to keep the differences between the state quantity measurement values PV1, PV2, and PV3 constant in accordance with the differences between the state quantity set points SP1, SP2, and SP3. If, for example, SP1=20.0, SP2=30.0, and SP3=40.0 are set, step responses and disturbance suppressing responses are performed to maintain state quantity difference PV3−PV2=10.0, state quantity difference PV2−PV1=10.0, and state quantity difference PV3−PV1=20.0.

According to this embodiment, in a control system having at least two control loops, when a state quantity serving as a specific reference is set as a reference state quantity, and a state quantity which is controlled to maintain a relative quantity with respect to the reference state quantity at a specified value is set as a follow-up state quantity, a calculation sequence is executed, in which a follow-up state quantity set point SPi of a plurality of control computation input values input to the controller which controls the follow-up state quantity is transformed into a follow-up state quantity internal set point SPi' and input to the controller. In this calculation sequence, the follow-up state quantity internal set point SPi' is calculated as the sum of the first element with respect to the reference state quantity and the second element with respect to the relative quantity. This makes it possible to realize control operation of changing the reference state quantity such as a state quantity mean value to a desired value while maintaining a relative quantity such as the state quantity difference between the reference state quantity and the follow-up state quantity at a desired value. In addition, this embodiment can form a control system in which manipulated variables from the controller correspond to outputs from actual actuators on a one-to-one basis, integration windup can be prevented, and the controller can be adjusted by using a conventionally proposed parameter adjustment method or automatic adjustment function. Furthermore, using the value obtained by multiplying an element for a control computation input value to a relative quantity by the first coefficient as the second element of internal input values makes it possible to control the reference state quantity while preferentially controlling the relative quantity.

In addition, using the value obtained by multiplying an element of control computation input values to the reference state quantity by the second coefficient as the first element of follow-up state quantity internal set points SPi' makes it possible to avoid control instability due to an increase in the sensitivity of control based on the first coefficient and also avoid the sacrifice of the priority of the relative quantity between the reference state quantity and the follow-up state quantity.

Second Embodiment

Figure 11:
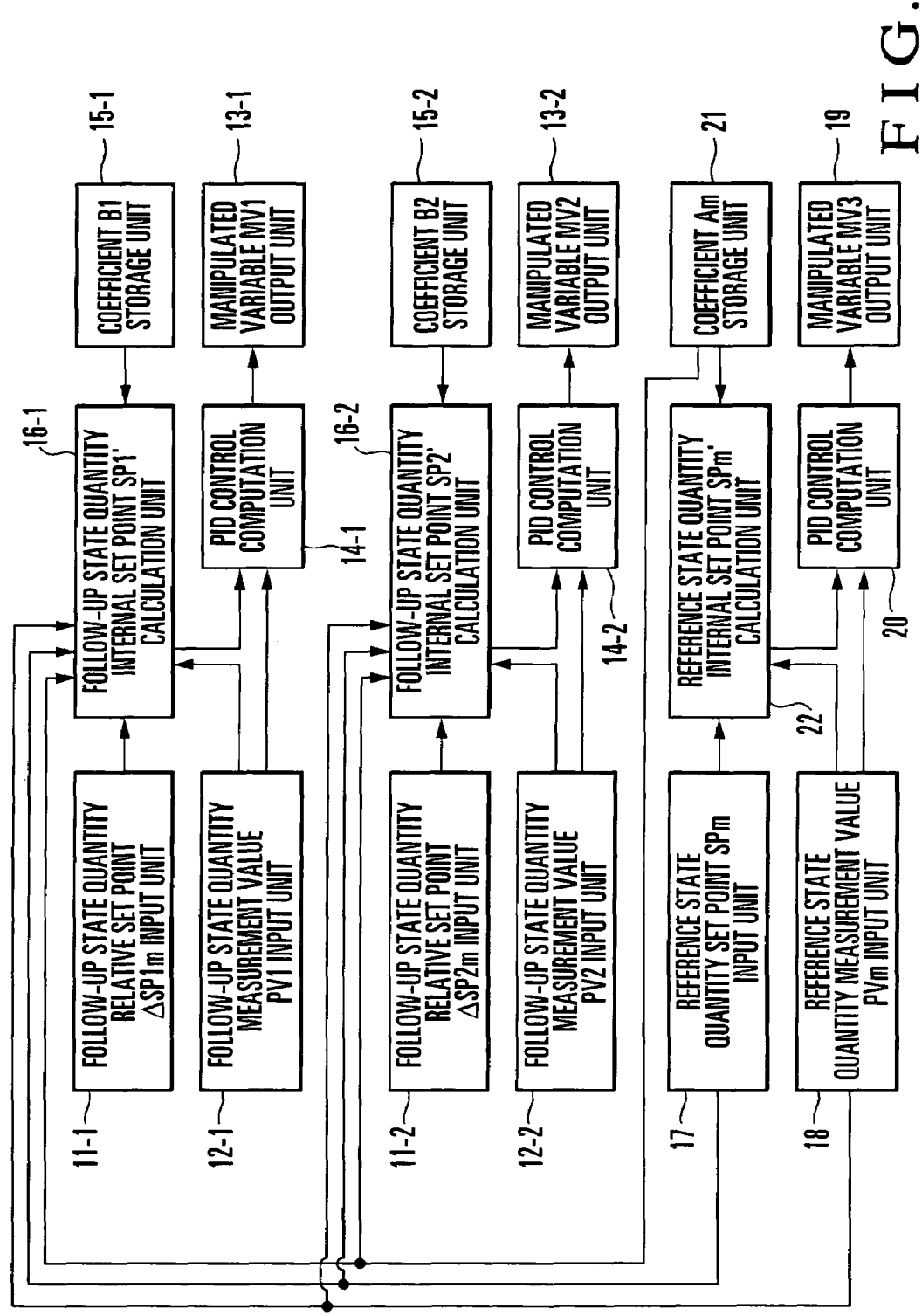
FIG. 11 is a block diagram showing the arrangement of a control apparatus according to the second embodiment of the present invention.

The second embodiment of the present invention will be described next. FIG. 11 shows the arrangement of a control apparatus according to the second embodiment of the present invention. This embodiment will exemplify a case wherein there are three control loops, the state quantity of one typical control loop is used as a reference state quantity, and the state quantities of the remaining two control loops are used as follow-up state quantities. However, a similar control system can be formed on the basis of the same principle as long as there are two or more control loops.

In the control apparatus in FIG. 11, the arrangement of the first control system associated with the first follow-up state quantity comprises a follow-up state quantity relative set point ΔSP1m input unit 11-1, a follow-up state quantity measurement value PV1 input unit 12-1, a manipulated variable MV1 output unit 13-1, a PID control computation unit (PID controller) 14-1, a coefficient B1 storage unit 15-1, and a follow-up state quantity internal set point SP1' calculation unit 16-1 serving as an internal input value calculation unit. In addition, in the control apparatus in FIG. 11, the arrangement of the second control system associated with the second follow-up state quantity comprises a follow-up state quantity relative set point ΔSP2 m input unit 11-2, a follow-up state quantity measurement value PV2 input unit 12-2, a manipulated variable MV2 output unit 13-2, a PID control computation unit 14-2, a coefficient B2 storage unit 15-2, and a follow-up state quantity internal set point SP2' calculation unit 16-2 serving as an internal input value calculation unit.

Furthermore, in the control apparatus in FIG. 11, the arrangement of the third control system associated with a reference state quantity comprises a reference state quantity set point SPm input unit 17, reference state quantity measurement value PVm input unit 18, manipulated variable MV3 output unit 19, PID control computation unit 20, coefficient Am storage unit 21, and reference state quantity internal set point SPm' calculation unit 22.

Figure 12:
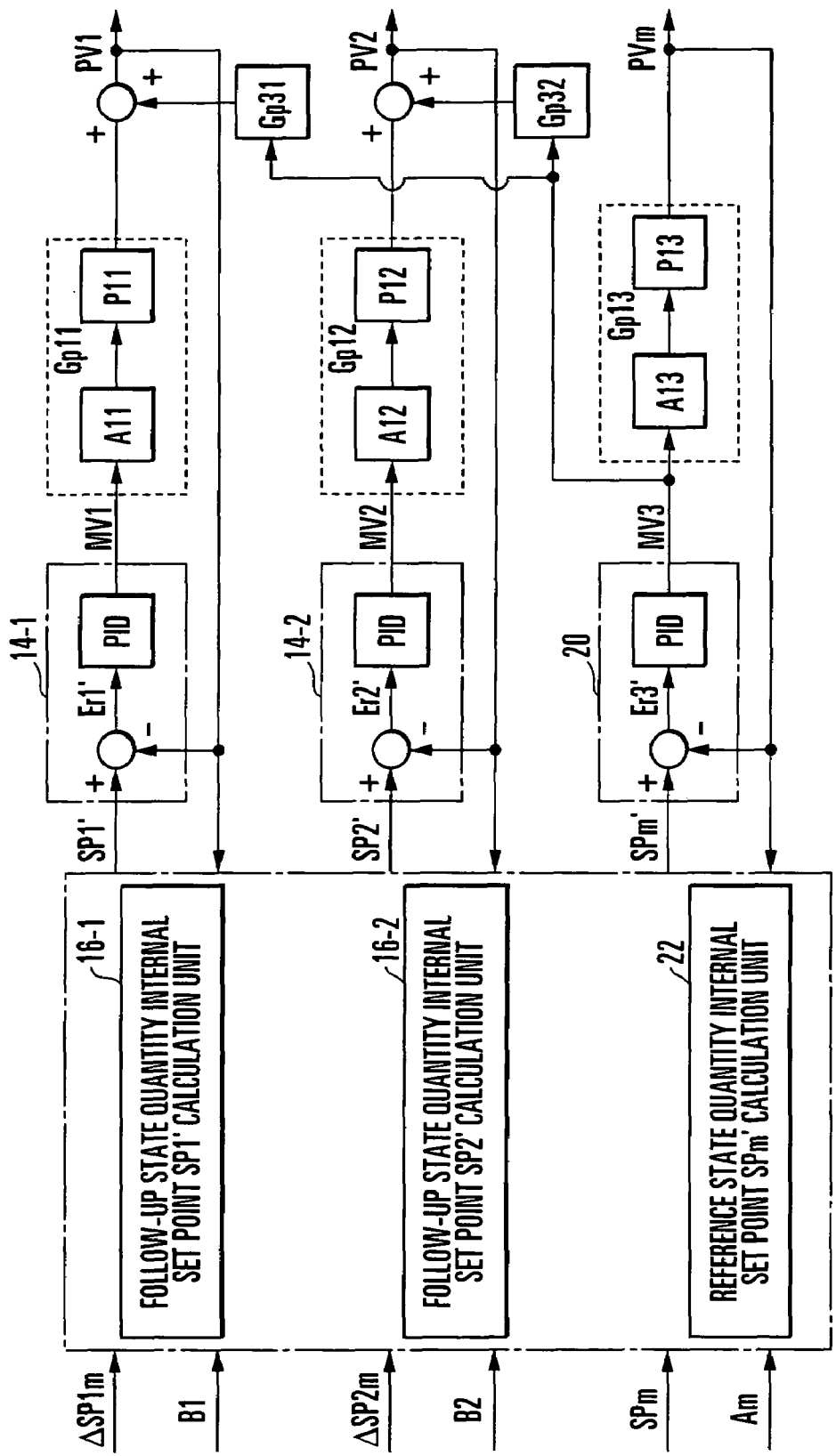
FIG. 12 is a bock diagram of control systems in the second embodiment of the present invention.

FIG. 12 shows a control system according to this embodiment. Referring to FIG. 12, reference symbol Er1' denotes the deviation between a first follow-up state quantity internal set point SP1' and a first follow-up state quantity measurement value PV1; Er 2', the deviation between a second follow-up state quantity internal set point SP2' and a second follow-up state quantity measurement value PV2; Er 3', the deviation between a reference state quantity internal set point SPm' and a reference state quantity measurement value PVm; Am, a coefficient associated with the reference state quantity; B1, a coefficient associated with the state quantity difference between the first follow-up state quantity and the reference state quantity; B2, a coefficient associated with the state quantity difference between the second follow-up state quantity and the reference state quantity; A11, an actuator which controls the first follow-up state quantity; A12, an actuator which controls the second follow-up state quantity; A13, an actuator which controls the reference state quantity;

P11, a controlled system process associated with the first follow-up state quantity; P12, a controlled system process associated with the second follow-up state quantity; P13, a controlled system process associated with the reference state quantity; Gp11, a transfer function for a block including the actuator A11 and process P11; Gp12, a transfer function for a block including the actuator A12 and process P12; Gp13, a transfer function for a block including the actuator A13 and process P13; Gp31, a transfer function representing the interference between the first control loop and the third control loop; and Gp32, a transfer function representing the interference between the second control loop and the third control loop.

The follow-up state quantity relative set point ΔSP1m input unit 11-1, follow-up state quantity measurement value PV1 input unit 12-1, manipulated variable MV1 output unit 13-1, PID control computation unit 14-1, follow-up state quantity internal set point SP1' calculation unit 16-1, actuator A1, and process P11 constitute the first control system (first control loop). The follow-up state quantity relative set point ΔSP2m input unit 11-2, follow-up state quantity measurement value PV2 input unit 12-2, manipulated variable MV2 output unit 13-2, PID control computation unit 14-2, follow-up state quantity internal set point SP2' calculation unit 16-2, actuator A12, and process P12 constitute the second control system (second control loop). The reference state quantity set point SPm input unit 17, reference state quantity measurement value PVm input unit 18, manipulated variable MV3 output unit 19, PID control computation unit 20, reference state quantity internal set point SPm' calculation unit 22, actuator A13, and process P13 constitute the third control system (third control loop).

Figure 13:
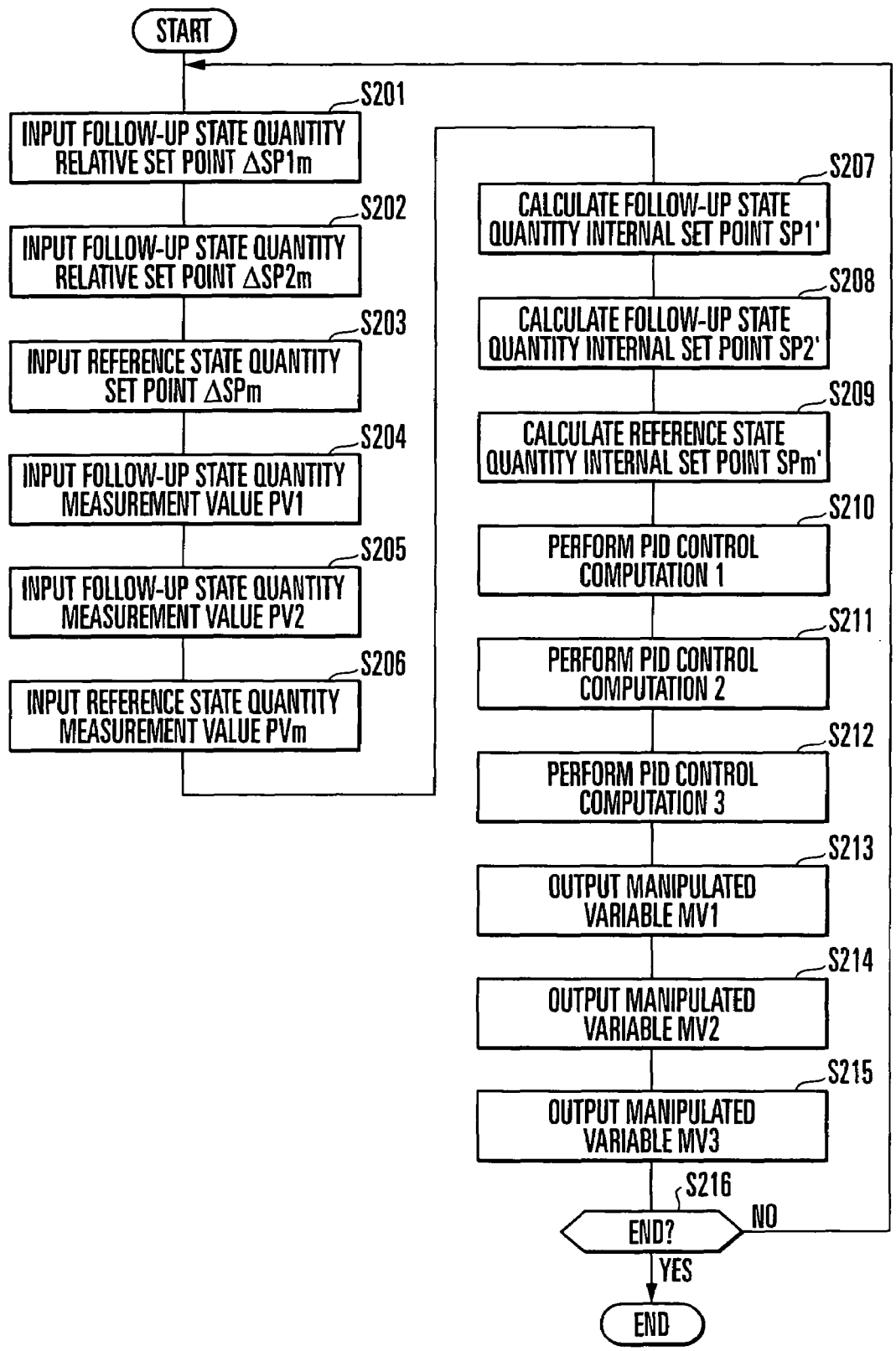
FIG. 13 is a flowchart showing the operation of a control apparatus according to the second embodiment of the present invention.

The operation of the control apparatus of this embodiment will be described next with reference to FIG. 13. First of all, a follow-up state quantity relative set point ΔSP1m is set by the operator of the control apparatus and input to the follow-up state quantity internal set point SP1' calculation unit 16-1 through the follow-up state quantity relative set point ΔSP1m input unit 11-1 (step S201 in FIG. 13). A follow-up state quantity relative set point ΔSP2m is set by the operator and input to the follow-up state quantity internal set point SP2' calculation unit 16-2 through the follow-up state quantity relative set point ΔSP2m input unit 11-2 (step S202). A reference state quantity set point SPm is set by the operator and input to the follow-up state quantity internal set point SP1' calculation unit 16-1, follow-up state quantity internal set point SP2' calculation unit 16-2, and reference state quantity internal set point SPm' calculation unit 22 through the reference state quantity set point SPm input unit 17 (step S203).

The follow-up state quantity measurement value PV1 is detected by the first detection means (not shown) and input to the PID control computation unit 14-1 and follow-up state quantity internal set point SP1' calculation unit 16-1 through the follow-up state quantity measurement value PV1 input unit 12-1 (step S204). The follow-up state quantity measurement value PV2 is detected by the second detection means (not shown) and input to the PID control computation unit 14-2 and follow-up state quantity internal set point SP2' calculation unit 16-2 through the follow-up state quantity measurement value PV2 input unit 12-2 (step S205). The reference state quantity measurement value PVm is detected by the third detection means (not shown) and input to the follow-up state quantity internal set point SP1' calculation unit 16-1, follow-up state quantity internal set point SP2' calculation unit 16-2, PID control computation unit 20, and reference state quantity internal set point SPm' calculation unit 22 through the reference state quantity measurement value PVm input unit 18 (step S206).

The coefficient Am storage unit 21 stores the coefficient Am associated with the reference state quantity in advance. The coefficient B1 storage unit 15-1 stores the coefficient B1 associated with the state quantity difference between the first follow-up state quantity and the reference state quantity in advance. The follow-up state quantity internal set point SP1' calculation unit 16-1 calculates the follow-up state quantity internal set point SP1' on the basis of the coefficients Am and B1, the reference state quantity set point SPm, the reference state quantity measurement value PVm, the follow-up state quantity relative set point ΔSP1m, and follow-up state quantity measurement value PV1 according to the following equation (step S207).

$$SP1' = AmSPm + (1 - Am)PVm + B1\Delta SP1m + (1 - B1)(PV1 - PVm) \quad (36)$$

The coefficient B2 storage unit 15-2 stores the coefficient B2 associated with the state quantity difference between the second follow-up state quantity and the reference state quantity in advance. The follow-up state quantity internal set point SP2' calculation unit 16-2 calculates the follow-up state quantity internal set point SP2' on the basis of the coefficients Am and B2, the reference state quantity set point SPm, the reference state quantity measurement value PVm, follow-up state quantity relative set point ΔSP2m, and the follow-up state quantity measurement value PV2 according to the following equation (step S208).

$$SP2' = AmSPm + (1 - Am)PVm + B2\Delta SP2m + (1 - B2)(PV2 - PVm) \quad (37)$$

The reference state quantity internal set point SPm' calculation unit 22 calculates the reference state quantity internal set point SPm' on the basis of the coefficient Am, reference state quantity set point SPm, and reference state quantity measurement value PVm according to the following equation (step S209).

$$SPm' = AmSPm + (1 - Am)PVm \quad (38)$$

The PID control computation unit 14-1 then calculates a manipulated variable MV1 by performing PID control computation represented by equation (27), like the PID control computation unit 4-1 (step S210). Note that as a measure against integration windup, the PID control computation unit 14-1 performs manipulated variable upper/lower limit processing as follows. If the calculated manipulated variable MV1 is smaller than a lower limit value OL1 of the output of the actuator A11, the PID control computation unit 14-1 sets manipulated variable MV1=OL1. If the calculated manipulated variable MV1 is larger than an upper limit value OH1 of the output of the actuator A11, the PID control computation unit 14-1 sets manipulated variable MV1=OH1.

The PID control computation unit 14-2 then calculates a manipulated variable MV2 by performing PID control computation represented by equation (28), like the PID control computation unit 4-2 (step S211). Note that as a measure against integration windup, the PID control computation unit 14-2 performs manipulated variable upper/lower limit processing as follows. If the calculated manipulated variable MV2 is smaller than a lower limit value OL2 of the output of the actuator A12, the PID control computation unit 14-2 sets manipulated variable MV2=OL2. If the calculated manipulated variable MV2 is larger than an upper limit value OH2 of the output of the actuator A12, the PID control computation unit 14-2 sets manipulated variable MV2=OH2.

The PID control computation unit 20 calculates a manipulated variable MV3 by performing PID control computation represented by the following transfer function equation (step S212).

$$MV3=(100/Pb3)\{1+(1/Ti3s)+Td3s\}(SPm'-PVm) \quad (39)$$

where Pb3 is a proportional band, Ti3 is a reset time, and Td3 is a rate time. Note that as a measure against integration windup, the PID control computation unit 20 performs manipulated variable upper/lower limit processing as follows. If the calculated manipulated variable MV3 is smaller than a lower limit value OL3 of the output of the actuator A13, the PID control computation unit 20 sets manipulated variable MV3=OL3. If the calculated manipulated variable MV3 is larger than an upper limit value OH3 of the output of the actuator A13, the PID control computation unit 20 sets manipulated variable MV3=OH3.

The manipulated variable MV1 output unit 13-1 outputs the manipulated variable MV1 calculated by the PID control computation unit 14-1 to the actuator A11 (step S213). The actuator A11 operates to control the first follow-up state quantity on the basis of the manipulated variable MV1.

The manipulated variable MV2 output unit 13-2 outputs the manipulated variable MV2 calculated by the PID control computation unit 14-2 to the actuator A12 (step S214). The actuator A12 operates to control the second follow-up state quantity on the basis of the manipulated variable MV2.

The manipulated variable MV3 output unit 19 outputs the manipulated variable MV3 calculated by the PID control computation unit 20 to the actuator A13 (step S215). The actuator A13 operates to control the reference state quantity on the basis of the manipulated variable MV3.

The above processing in steps S201 to S215 is repeatedly executed in control cycles until the end of control is designated by the operator (YES in step S216).

FIGS. 14A, 15A, 16A, 17A, and 18A show the step responses of the control system when the reference state quantity set point SPm is changed to 30.0 while the follow-up state quantity relative set points ΔSP1m and ΔSP2m are 0. FIGS. 14B, 15 B, 16B, 17B, and 18B show the disturbance responses of the control system when disturbances are applied to the system while the system is stabilized with ΔSP1m=0, ΔSP2m=0, and SPm=30.0. Simulation conditions are set as follows.

First of all, the transfer function Gp11 for the block including the actuator A11 and process P11, the transfer function Gp12 for the block including the actuator A12 and process P12, and the transfer function Gp13 for the block including the actuator A13 and process P13 are set according to the following equations.

$$Gp11=1.2\ \exp(-2.0s)/\{(1+70.0s)(1+10.0s)\} \quad (40)$$

$$Gp12=1.6\ \exp(-2.0s)/\{(1+60.0s)(1+10.0s)\} \quad (41)$$

$$Gp13=2.0\ \exp(-2.0s)/\{(1+50.0s)(1+10.0s)\} \quad (42)$$

In addition, the transfer function Gp31 representing the interference between the first control loop and the third control loop and the transfer function Gp32 representing the interference between the second control loop and the third control loop are set as follows:

$$Gp31=0.96\ \exp(-2.0s)/\{(1+70.0s)(1+10.0s)\} \quad (43)$$

$$Gp32=1.28\ \exp(-2.0s)/\{(1+60.0s)(1+10.0s)\} \quad (44)$$

In accordance with the manipulated variables MV1, MV2, and MV3, the follow-up state quantity measurement values PV1 and PV2 and the reference state quantity measurement value PVm are determined as follows:

$$PV1=Gp1MV1+Gp31MV3 \quad (45)$$

$$PV2=Gp2MV2+Gp32MV3 \quad (46)$$

$$PVm=Gp3MV3 \quad (47)$$

Assume that the proportional band Pb1, reset time Ti1, and rate time Td1 as PID parameters in the PID control computation unit 14-1 are respectively set to 50.0, 35.0, and 20.0, the proportional band Pb2, reset time Ti2, and rate time Td2 as PID parameters in the PID control computation unit 14-2 are respectively set to 66.7, 35.0, and 20.0, and the proportional band Pb3, reset time Ti3, and rate time Td3 as PID parameters in the PID control computation unit 20 are respectively set to 10.0, 35.0, and 20.0.

Figure 14A:
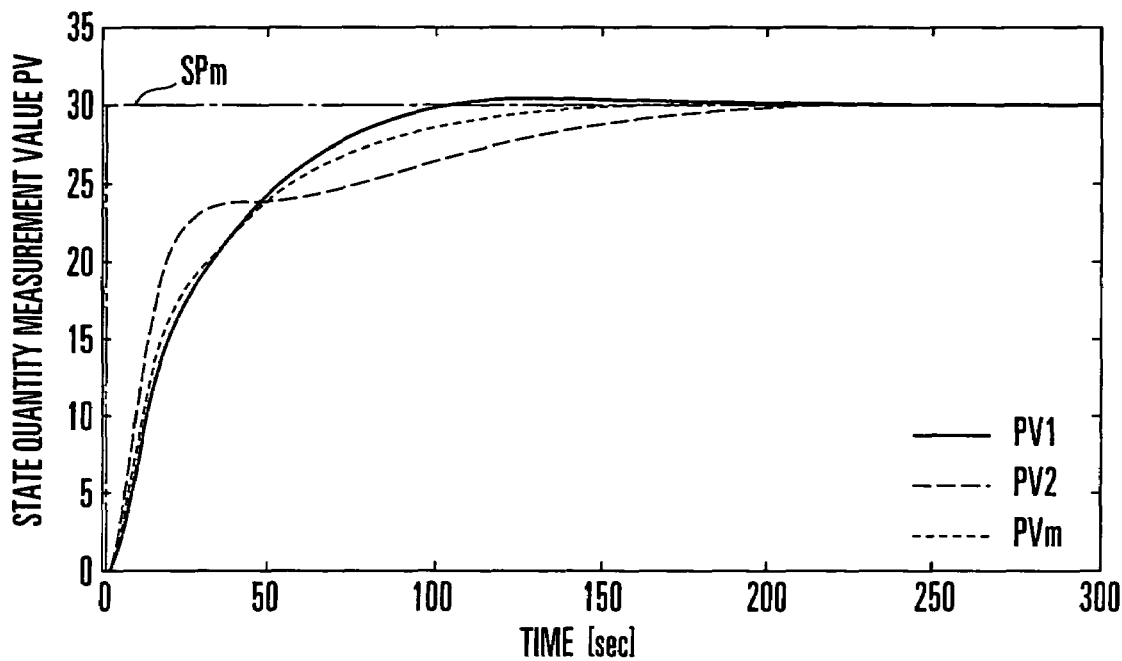
FIG. 14A is a graph showing the step responses of the control systems when reference state quantity set points are changed in the control apparatus according to the second embodiment of the present invention.
Figure 14B:
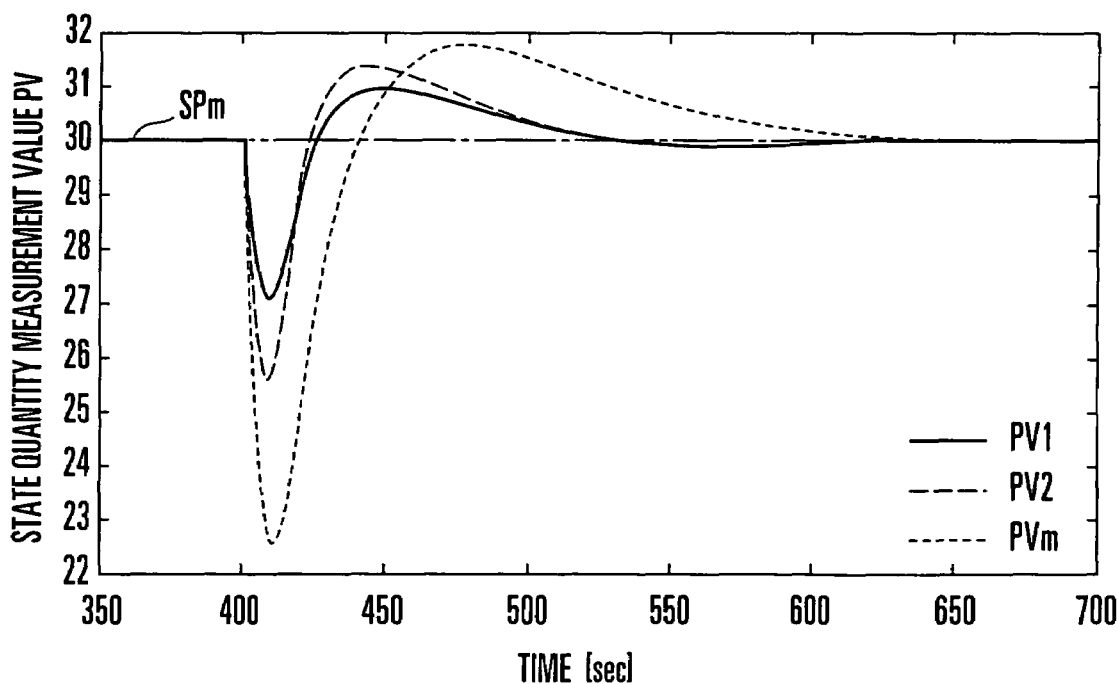
FIG. 14B is a graph showing the disturbance responses of the control systems when disturbances are applied to the control apparatus according to the second embodiment of the present invention.

The simulation result shown in FIGS. 14A and 14B is obtained with settings equivalent to general control (Am=1.0, B1=1.0, and B2=1.0), and the follow-up state quantity measurement values PV1 and PV2 and the reference state quantity measurement value PVm do not coincide with each other because the relative state quantities (state quantity differences) are not controlled.

Figure 15A:
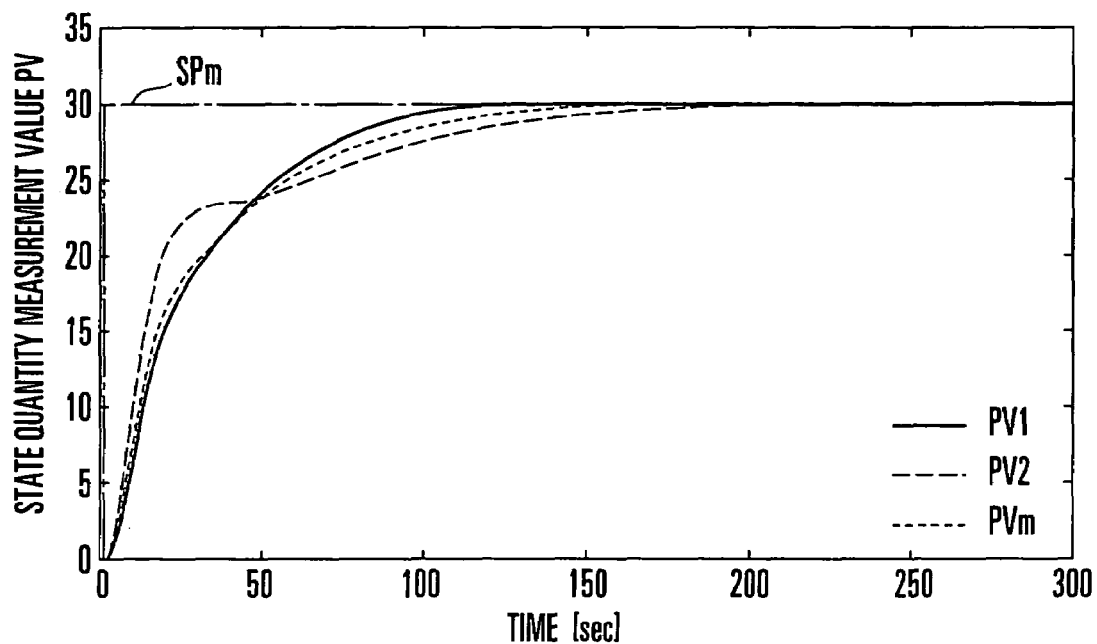
FIG. 15A is a graph showing the step responses of the control systems when reference state quantity set points are changed in the control apparatus according to the second embodiment of the present invention.
Figure 15B:
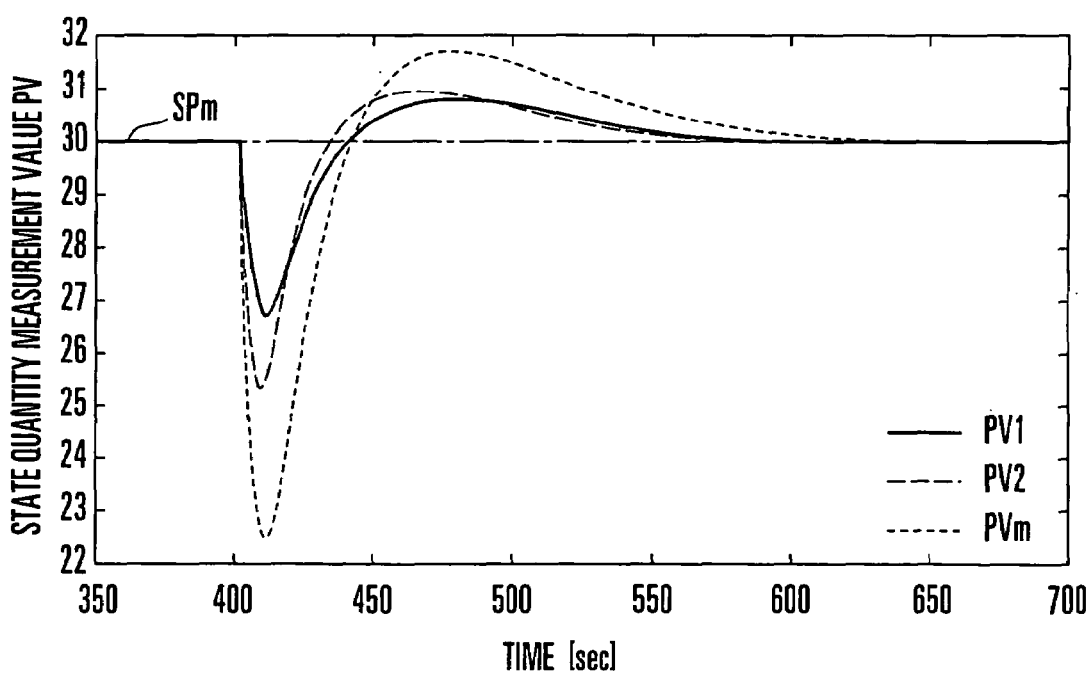
FIG. 15B is a graph showing the disturbance responses of the control systems when disturbances are applied to the control apparatus according to the second embodiment of the present invention.

The simulation result shown in FIGS. 15A and 15B is obtained with settings that allow to moderately obtain the effect of this embodiment (Am=1.0, B1=1.5, and B2=1.5), and the follow-up state quantity measurement values PV1 and PV2 and the reference state quantity measurement value PVm coincide with each other compared with the case shown in FIGS. 14A and 14B because the relative state quantities (state quantity differences) are controlled to some extent.

Figure 16A:
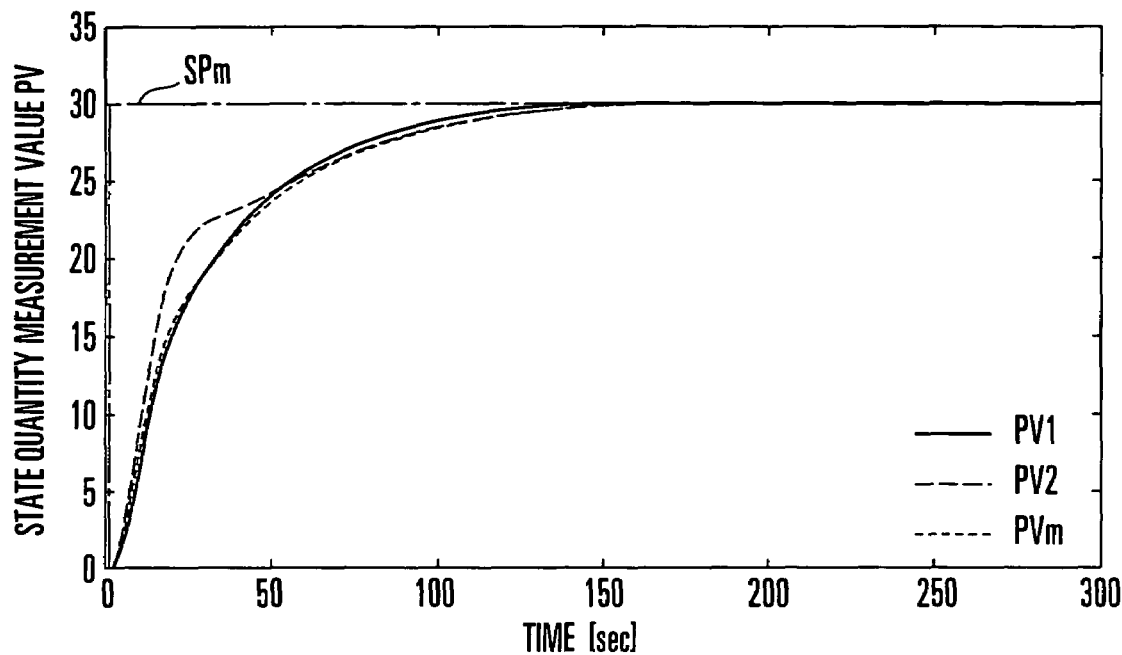
FIG. 16A is a graph showing the step responses of the control systems when reference state quantity set points are changed in the control apparatus according to the second embodiment of the present invention.
Figure 16B:
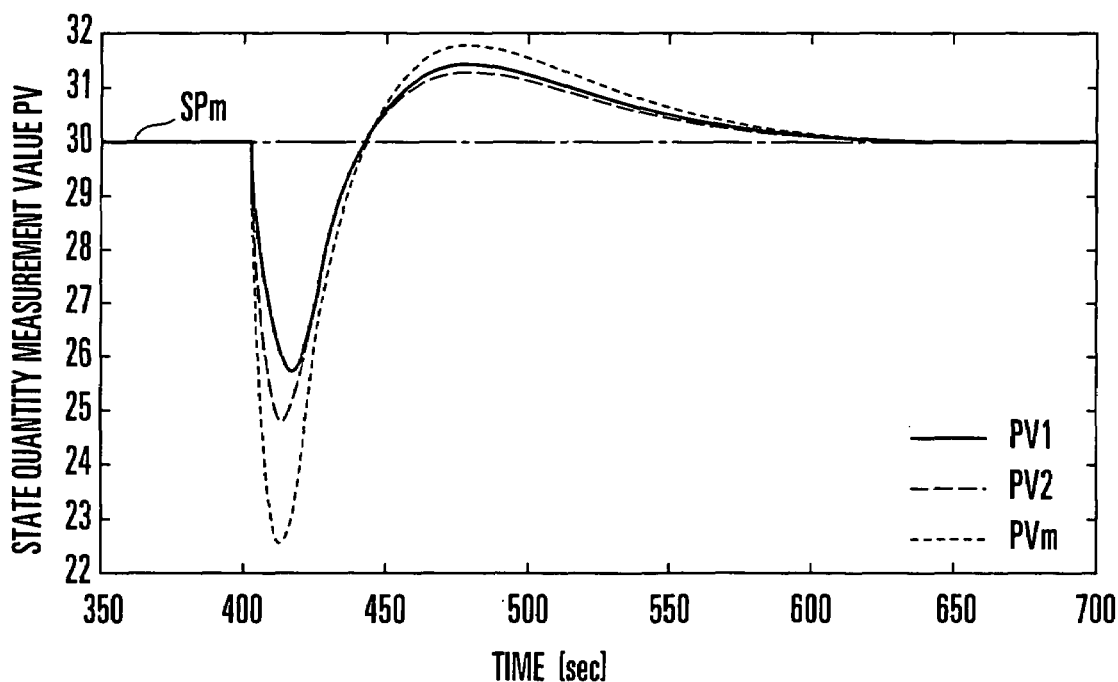
FIG. 16B is a graph showing the disturbance responses of the control systems when disturbances are applied to the control apparatus according to the second embodiment of the present invention.

The simulation result shown in FIGS. 16A and 16B is obtained with settings that allow to noticeably obtain the effect of this embodiment (Am=1.0, B1=3.0, B2=3.0, and B3=3.0), and the follow-up state quantity measurement values PV1 and PV2 and the reference state quantity measurement value PVm noticeably coincide with each other compared with the case shown in FIGS. 14A and 14B because the relative state quantities (state quantity differences) are sufficiently controlled.

Figure 17A:
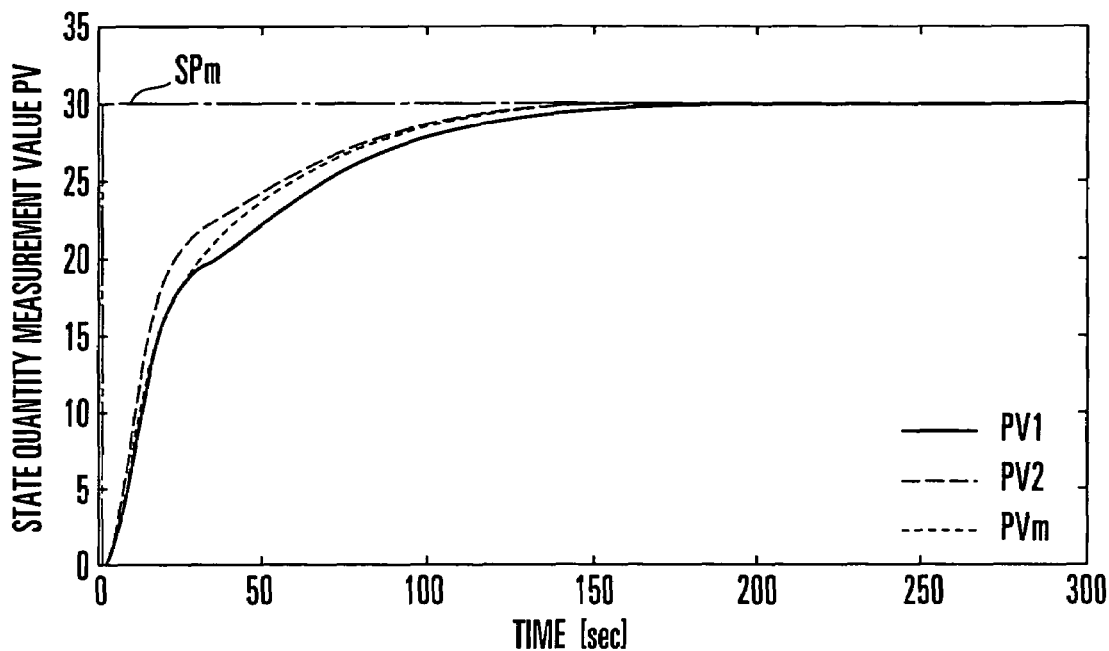
FIG. 17A is a graph showing the step responses of the control systems when reference state quantity set points are changed in the control apparatus according to the second embodiment of the present invention.
Figure 17B:
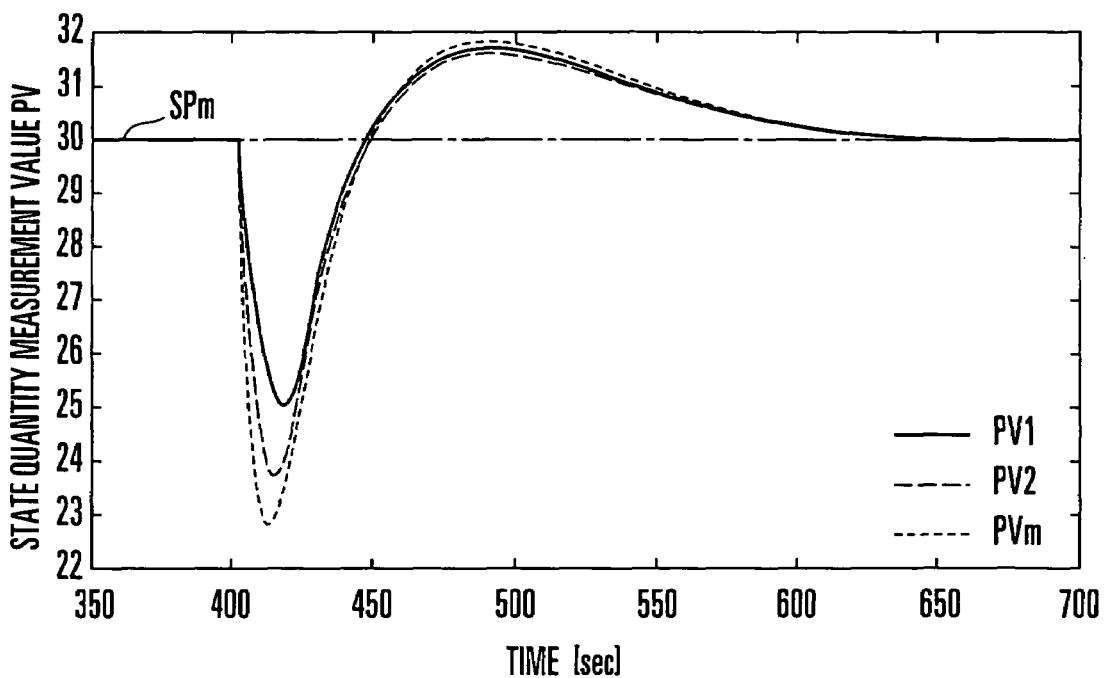
FIG. 17B is a graph showing the disturbance responses of the control systems when disturbances are applied to the control apparatus according to the second embodiment of the present invention.

The simulation result shown in FIGS. 17A and 17B is obtained with settings that result in the excessive effect of this embodiment (Am=1.0, B1=4.0, and B2=4.0), and the follow-up state quantity measurement values PV1 and PV2 and the reference state quantity measurement value PVm do not coincide with each other compared with the case shown in FIGS. 16A and 16B because control becomes unstable at the time of step response.

Figure 18A:
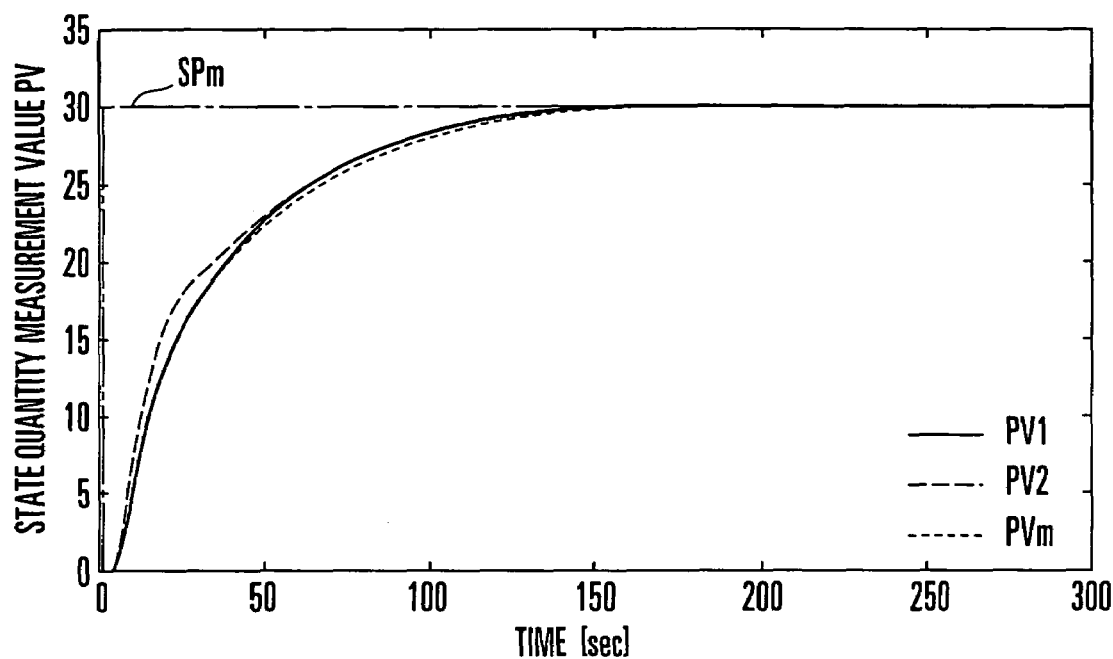
FIG. 18A is a graph showing the step responses of the control systems when reference state quantity set points are changed in the control apparatus according to the second embodiment of the present invention.
Figure 18B:
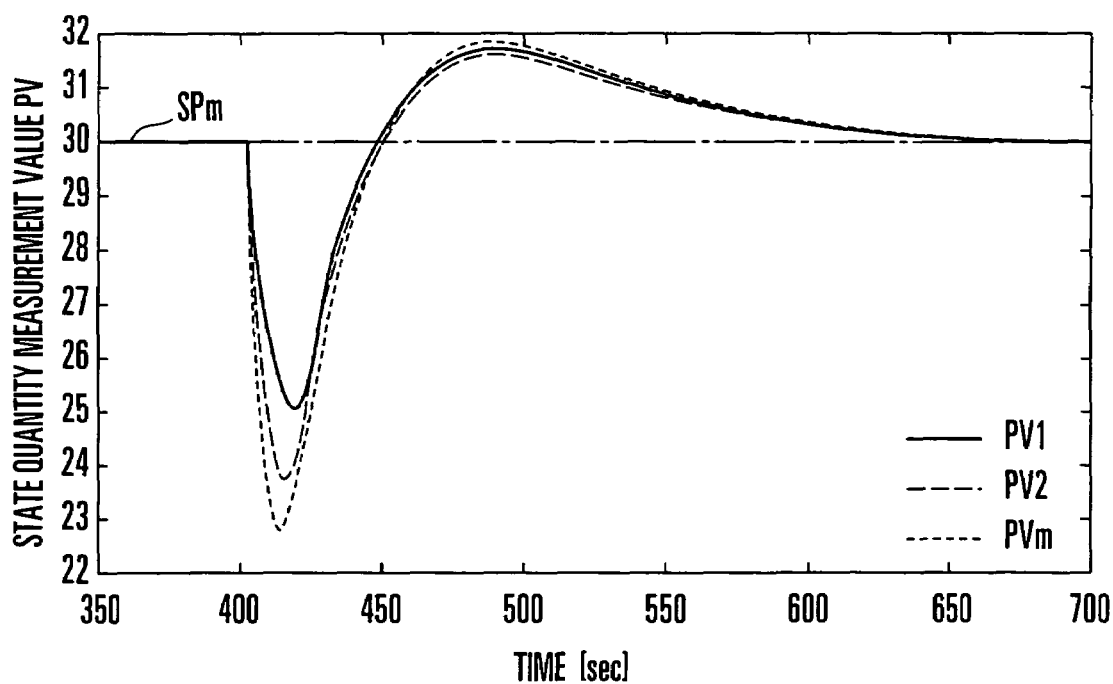
FIG. 18B is a graph showing the disturbance responses of the control systems when disturbances are applied to the control apparatus according to the second embodiment of the present invention.

The simulation result shown in FIGS. 18A and 18B is obtained with settings that avoid the excessive effect of this embodiment (Am=0.7, B1=4.0, and B2=4.0), and the follow-up state quantity measurement values PV1 and PV2 and the reference state quantity measurement value PVm further coincide with each other compared with the case shown in FIGS. 16A and 16B because the reference state quantity is shifted to the low-sensitivity side.

In the simulation results shown in FIGS. 14A and 14B to FIGS. 18A and 18B, setting $\Delta SP1m=\Delta SP2m=0.0$ makes all the state quantity differences between the first follow-up state quantity and the reference state quantity and between the second follow-up state quantity and the reference state quantity become 0.

If $\Delta SP1m$ and $\Delta SP2m$ are set to values other than 0, the state quantity measurement values PV1, PV2, PVm change to keep the differences between the state quantity measurement values PV1, PV2, and PVm constant in accordance with these settings. If, for example, $\Delta SP1m=20.0$, and $\Delta SP2m=10.0$ are set, step responses and disturbance suppressing responses are performed to maintain state quantity difference PV1–PVm=20.0 and state quantity difference PV2–PVm=10.0.

According to this embodiment, the same effects as those in the first embodiment can be obtained. In addition, as is obvious from the simulation results in FIGS. 14A and 14B to FIGS. 18A and 18B, the present invention can be effectively applied to even a control system subjected to inter-loop interference.

Principles of Third and Fourth Embodiments

In the third and fourth embodiments described below, an absolute state quantity serving as a reference such as a state quantity mean value will be referred to as a reference state quantity, and a state quantity controlled to maintain a relative quantity (e.g., a state quantity difference) with respect to a reference state quantity at a specified value will be referred to as a follow-up state quantity. In addition, a set point for a reference state quantity will be referred to as a reference state quantity set point; the measurement value of a reference state quantity, a reference state quantity measurement value; a set point for a follow-up state quantity, a follow-up state quantity set point; the measurement value of a follow-up state quantity, a follow-up state quantity measurement value; a set point for the relative quantity between a reference state quantity and a follow-up state quantity, a follow-up state quantity relative set point; the measurement value of the relative quantity between a reference state quantity and a follow-up state quantity, a follow-up state quantity relative measurement value; an internal measurement value transmitted into the controller with respect to a reference state quantity measurement value, a reference state quantity internal measurement value; and an internal measurement value transmitted into the controller with respect to a follow-up state quantity measurement value, a follow-up state quantity internal measurement value. A state quantity includes, for example, a temperature, pressure, or flow rate.

In the third and fourth embodiments, a manipulated variable MV is calculated by using a state quantity internal measurement value PV' transmitted into the controller independently of an externally provided state quantity measurement value PV. At this time, the state quantity internal measurement value PV' is separated into an element PVm for a reference state quantity and an element $\Delta PV$ for the relative quantity between the reference state quantity and a follow-up state quantity (PV'=PVm+$\Delta PV$). In the third and fourth embodiments, the measurement value PVm or $\Delta PV$ which is actually obtained by interpolation/extrapolation computation (PV'=(1–A)SP+APV) with respect to a state quantity set point is transformed into the state quantity internal measurement value PV' which can independently shift the sensitivity for a reference state quantity and the sensitivity for the relative quantity between a reference state quantity and a follow-up state quantity in consideration of the fact that the transformed set point can shift the characteristics of the controller to the low-sensitivity side or high-sensitivity side more effectively than when the set point is directly applied.

As described above, in the third and fourth embodiments, the state quantity internal measurement value PV' is separated into the element PVm for a reference state quantity and the element $\Delta PV$ for the relative quantity between a reference state quantity and a follow-up state quantity, and the state quantity internal measurement value PV' is obtained by interpolation/extrapolation computation between the state quantity set point SP and the state quantity measurement value PV and is used to calculate the manipulated variable MV. With this arrangement, in the third and fourth embodiments, the response characteristic is shifted to the low-sensitivity side with respect to a reference state quantity such as a state quantity mean value, and is shifted to a high-sensitivity side with respect to the relative quantity between a reference state quantity and a follow-up state quantity such as a state quantity difference, thereby allowing a follow-up state quantity relative measurement value $\Delta PV$ to follow up the follow-up state quantity relative set point $\Delta SP$ before a reference state quantity measurement value PVm follows up the reference state quantity set point SPm. This makes it possible to perform control to change the reference state quantity to a desired value while maintaining the relative quantity between the reference state quantity and the follow-up state quantity at a desired value.

According to the arrangements of the third and fourth embodiments, the control system in each embodiment differs from a general control system only in that the state quantity measurement value PV is transformed into the state quantity internal measurement value PV'. That is, there can be provided a control method which preferentially controls the relative quantity between a reference state quantity and a follow-up state quantity while controlling the reference state quantity in the form in which a manipulated variable from the controller corresponds to an output from an actual actuator on a one-to-one basis.

Of the above two points to be considered, the calculation of the state quantity internal measurement value PV' by interpolation/extrapolation computation between the state quantity set point SP and the state quantity measurement value PV (to be referred to as the first point to be considered hereinafter) will be described. Consider a case wherein the state quantity measurement value PV is transformed into the state quantity internal measurement value PV' to be transmitted into the controller by referring to the state quantity set point SP and state quantity measurement value PV using a specific coefficient A according to the following equation:

$$PV'=(1-A)SP+APV \qquad (48)$$

Assume that the coefficient A is a real number larger than 0. In this case, if A=1, then PV'=PV. This indicates that the state quantity measurement value PV is not transformed at all.

Figure 19:
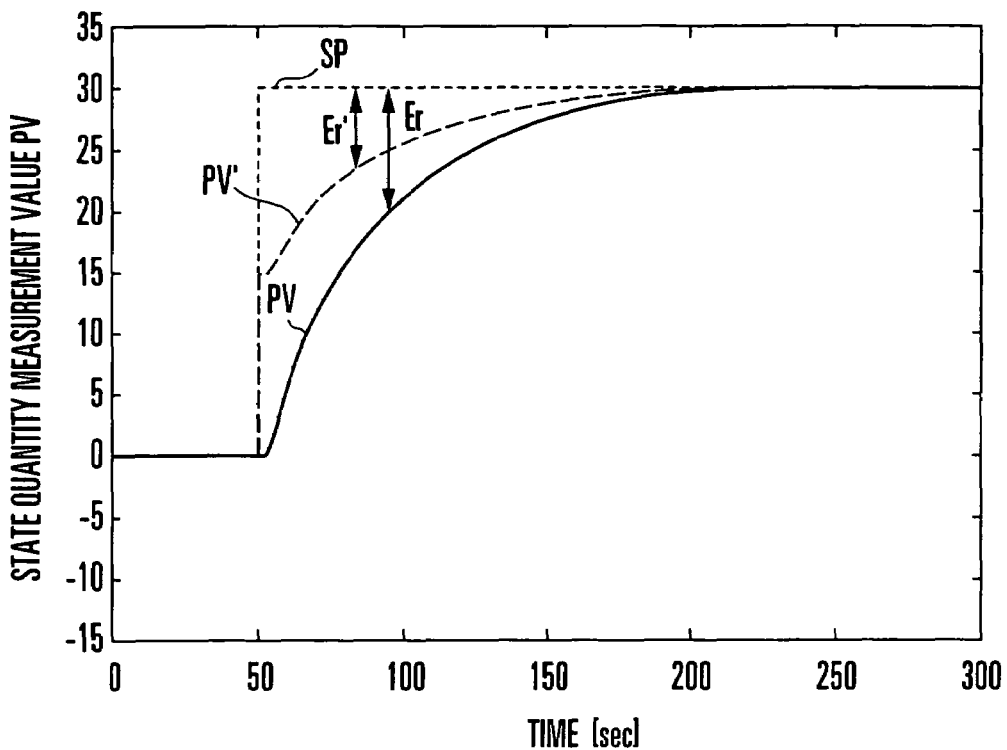
FIG. 19 is a graph showing changes in the response characteristic of a controller with changes in state quantity internal set point according to the present invention.

If the value of the coefficient A set to 0<A<1 in equation (48), the transformed state quantity internal measurement value PV' becomes a numerical value between the original state quantity set point SP and the state quantity measurement value PV (interpolation relationship). When, therefore, a deviation is calculated by, for example, a PID controller, as shown in FIG. 19, deviation Er'=SP–PV' between the state quantity set point SP and the state quantity internal measurement value PV' is smaller in absolute value than deviation Er=SP–PV between the state quantity set point SP and the state quantity measurement value PV. As a consequence, when the controller calculates a manipulated variable MV' on the basis of the deviation Er', a change in manipulated variable becomes more moderate than when the controller calculates a manipulated variable MV on the basis of the deviation Er. That is, setting the coefficient A to 0<A<1 makes the response characteristic of the controller shift to the direction to give importance to stability (low sensitivity).

Figure 20:
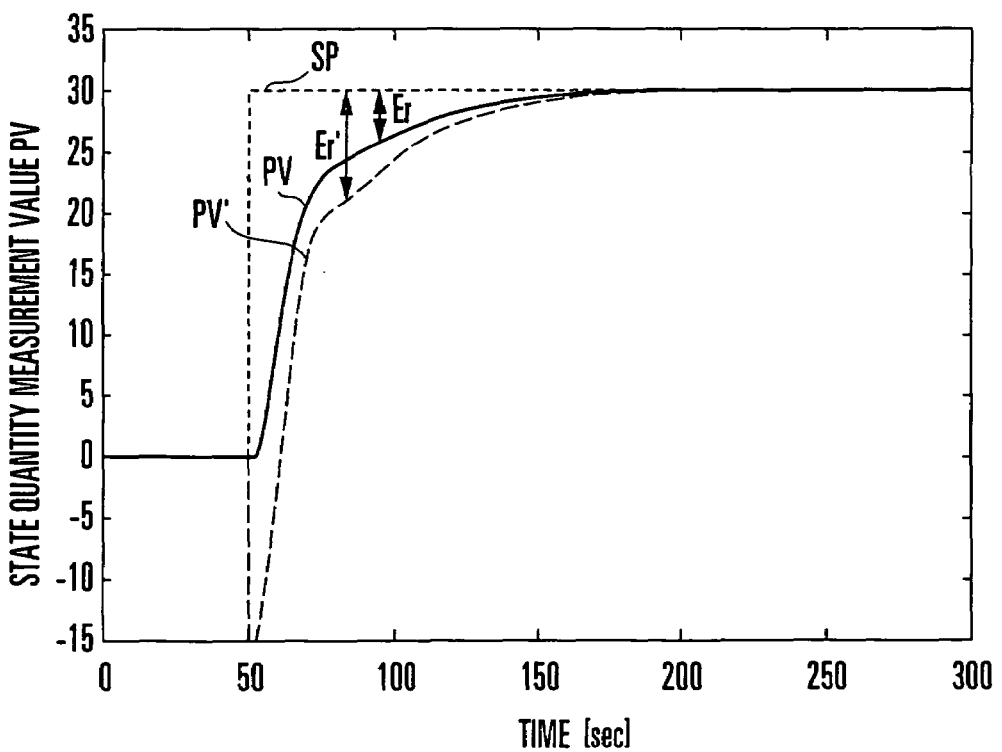
FIG. 20 is a graph showing changes in the response characteristic of the controller with changes in state quantity internal set point according to the present invention.

If the value of the coefficient A is set to A>1, the transformed state quantity internal measurement value PV' becomes a numeral value separated from the state quantity set point SP than the original state quantity measurement value PV (extrapolation relationship). When, therefore, a deviation is to be calculated by, for example, a PID controller, as shown in FIG. 20, deviation Er'=SP−PV' between the state quantity set point SP and the state quantity internal measurement value PV' becomes larger in absolute value than deviation Er=SP−PV between the state quantity set point SP and the state quantity measurement value PV. As a consequence, when the controller calculates a manipulated variable MV' on the basis of the deviation Er', a change in manipulated variable becomes steeper than when the controller calculates a manipulated variable MV on the basis of the deviation Er. That is, setting the value of the coefficient A to A>1 makes the response characteristic of the controller shift to the direction to give importance to quick response (high sensitivity).

Of the above two points to be considered, the separation of the state quantity internal measurement value PV' into an element for a reference state quantity and an element for the relative quantity between the reference state quantity and a follow-up state quantity (to be referred to as the second point to be considered hereinafter) will be described. When a reference state quantity and the relative quantity between the reference state quantity and a follow-up state quantity are to be simultaneously controlled, the state quantity measurement value PV can be separated into the element PVm for the reference state quantity and the ΔPVm for the relative quantity between the reference state quantity and the follow-up state quantity as follows:

$$PV = PVm + \Delta PVm \quad (49)$$

In accordance with the state quantity measurement value PV, the state quantity set point SP can also be separated into the reference state quantity set point SPm and the follow-up state quantity relative set point ΔSPm as follows:

$$SP = SPm + \Delta SPm \quad (50)$$

The first and second points to be considered can be summarized as follows according to equations (48) to (50):

$$PV' = (1 - A)(SPm + \Delta SPm) + A(PVm + \Delta PVm) \quad (51)$$
$$= (1 - A)SPm + APVm + (1 - A)\Delta SPm + A\Delta PVm$$

In this case, (1−A)SPm+APVm in equation (51) is an element associated with the reference state quantity, and (1−A)ΔSPm+AΔPVm is an element associated with the relative quantity between the reference state quantity and the follow-up state quantity. That is, the two elements are separated as linear binding expressions for providing an interpolation relationship and extrapolation relationship, respectively, and hence an interpolation relationship and extrapolation relationship can be provided by separate coefficients A and B as follows:

$$PV' = (1-A)SPm + APVm + (1-B)\Delta SPm + B\Delta PVm \quad (52)$$

where A is a coefficient associated with a reference state quantity, and B is a coefficient associated with the relative quantity between the reference state quantity and a follow-up state quantity. When there are a plurality of control loops, the coefficient B associated with the relative quantity between the reference state quantity and the follow-up state quantity is preferably provided for each control loop, in particular. In this case, with respect to the ith (i is 1, 2, 3, . . . ) follow-up state quantity in a plurality of control loops, a state quantity measurement value PVi may be transformed as follows:

$$PVi' = (1 - Am)SPm + AmPVm + (1 - Bi)\Delta SPim + Bi\Delta PVim \quad (53)$$

where PVi' is an internal measurement value for the ith follow-up state quantity, ΔSPim is a follow-up state quantity relative set point which is a set point for the relative quantity between the reference state quantity and the ith follow-up state quantity, ΔPVim is a follow-up state quantity relative measurement value which is the measurement value of the relative quantity between the reference state quantity and the ith follow-up state quantity, and Bi is a coefficient associated with the relative quantity between the reference state quantity and the ith follow-up state quantity. Note that the coefficient Am associated with the reference state quantity may be provided commonly for the respective control loops or may be provided for each control loop.

Obviously, in equation (53), ΔSPim=SPi−SPm and ΔPVim=PVi−PVm, and the following equivalent substitutions can be made:

$$PVi' = (1 - Am)SPm + AmPVm + (1 - Bi)\Delta SPim + Bi(PVi - PVm) \quad (54)$$

$$PVi' = \quad (55)$$
$$(1 - Am)SPm + AmPVm + (1 - Bi)(SPi - SPm) + Bi(PVi - PVm)$$

Note that the case wherein the follow-up state quantity relative measurement value ΔPVim is used differs from the case wherein a difference PVi−PVm between a follow-up state quantity measurement value PVi and the reference state quantity measurement value PVm is used only in processing in the control apparatus. In contrast to this, when a follow-up state quantity relative set point ΔSPim is used, an operator sets the reference state quantity set point SPm and follow-up state quantity relative set point ΔSPim through a user interface. When a difference SPi−SPm between a follow-up state quantity set point SPi and the reference state quantity set point SPm is to be used, the operator sets the reference state quantity set point SPm and follow-up state quantity set point SPi through the user interface. Owing to this difference between the two cases, they are handled as different arrangements.

In addition, equations (54) and (55) can be consolidated to the following equivalent equations:

$$PVi' = SPi - Am(SPm - PVm) - Bi\{\Delta SPim - (PVi - PVm)\} \quad (56)$$

$$PVi' = SPi - Am(SPm - PVm) - Bi\{(SPi - SPm) - (PVi - PVm)\} \quad (57)$$

In addition, regarding SPi=SPi"+ΔSPi" and PVi=PVi"+ΔPVi" makes it easy to perform equivalent transformation of equation (55) as follows:

$$\begin{aligned}PVi' &= (1 - Am)SPm + AmPVm + (1 - Bi)(SPi - SPm) + \quad (58)\\&\quad Bi(PVi - PVm)\\&= (1 - Am)SPm + AmPVm + (1 - Bi)(SPi'' + \Delta SPi'' -\\&\quad SPm) + Bi(PVi'' + \Delta PVi'' - PVm)\\&= (1 - Am)SPm + AmPVm + (1 - Bi)(SPi'' - SPm'') +\\&\quad Bi(PVi'' - PVm'')\end{aligned}$$

where SPi" and ΔSPi" are elements SPi" and ΔSPi" respectively corresponding to absolute and relative quantities when the follow-up state quantity set point SPi is separated into another absolute quantity and another relative quantity, and PVi" and ΔPVi" are elements PVi" and ΔPVi" respectively corresponding to absolute and relative quantities when a follow-up state quantity measurement value PVi is separated into another absolute quantity and another relative quantity. In this case, SPm"=SPm−ΔSPi" and PVm"=PVm−ΔPVi". That is, with regard to an element associated with the relative quantity between a reference state quantity and a follow-up state quantity, substituting SPm" or PVm" for SPm or PVm is equivalent to a linear binding expression as long as the relationship between the two elements is clear, and does not fall outside the ranges of the basic technical ideas of the third and fourth embodiments.

According to the above principle, the state quantity internal measurement value PV' can be obtained, which can separately shift the sensitivity for a reference state quantity and the sensitivity for the relative quantity between a reference state quantity and a follow-up state quantity.

The principle of preferentially controlling the relative quantity between a reference state quantity and a follow-up state quantity will be described next. If the relationship between a coefficient Am associated with a reference state quantity and a coefficient Bi associated with the relative quantity between the reference state quantity and a follow-up state quantity is defined by Am=Bi=1 in equation (55), then PVi'=PVi. The state quantity internal measurement value PVi' at this point of time has not changed at all from the state quantity measurement value PVi, and the sensitivity has not changed from that in normal control.

In this case, the coefficient Bi associated with the relative quantity between the reference state quantity and the follow-up state quantity is especially important, and especially the sensitivity for the relative quantity between the reference state quantity and the follow-up state quantity improves when Bi>1 is set. This can operate the control apparatus to preferentially control the relative quantity. Therefore, the problem in the present invention can be solved by always setting the coefficient Am associated with the reference state quantity to Am=1, and hence it suffices to perform the following transformation to the state quantity internal measurement value PVi':

$$PVi' = PVm + (1 - Bi)\Delta SPim + Bi(PVi - PVm) \quad (59)$$

$$PVi' = PVm + (1 - Bi)(SPi - SPm) + Bi(PVi - PVm) \quad (60)$$

$$PVi' = SPi - (SPm - PVm) - Bi\{\Delta SPim - (PVi - PVm)\} \quad (61)$$

$$PVi' = SPi - (SPm - PVm) - Bi\{(SPi - SPm) - (PVi - PVm)\} \quad (62)$$

Note, however, that if only the sensitivity for the relative quantity between a reference state quantity and a follow-up state quantity is improved, the sensitivity may be excessive to make the control system unstable before satisfactory control characteristics for a relative quantity are obtained. In such a case, instability can be eliminated by setting the coefficient Am associated with a reference state quantity to Am<1 instead of returning the coefficient Bi associated with the relative quantity between the reference state quantity and the follow-up state quantity to a small value. This can also avoid the sacrifice of the priority of the relative quantity between a reference state quantity and a follow-up state quantity. It is therefore more preferable to use a transformation expression which allows adjustment of the coefficient Am associated with a reference state quantity.

Third Embodiment

Figure 21:
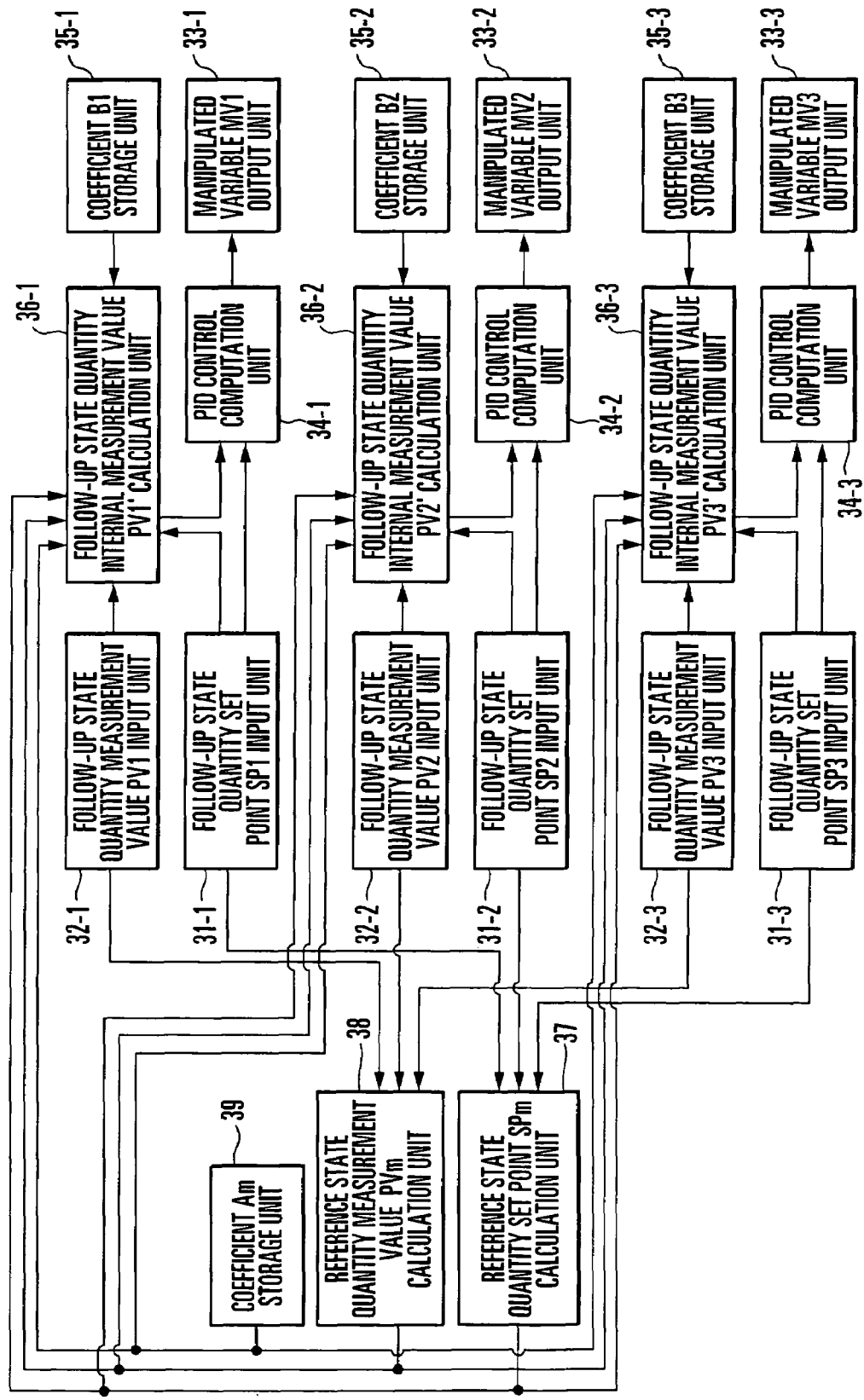
FIG. 21 is a block diagram showing the arrangement of a control apparatus according to the third embodiment of the present invention.

The third embodiment of the present invention will be described in detail below with reference to the accompanying drawings. FIG. 21 shows the arrangement of a control apparatus according to the third embodiment of the present invention. This embodiment exemplifies a case wherein there are three control loops, the state quantity mean value of the three control loops is used as a reference state quantity, and the state quantities of the three control loops are used as follow-up state quantities. However, as long as there are two or more control loops, a similar control system can be formed on a similar principle.

In the control apparatus in FIG. 21, the arrangement of the first control system associated with the first follow-up state quantity comprises a follow-up state quantity set point SP1 input unit 31-1, a follow-up state quantity measurement value PV1 input unit 32-1, a manipulated variable MV1 output unit 33-1, a PID control computation unit (PID controller) 34-1, a coefficient B1 storage unit 35-1, and a follow-up state quantity internal measurement value PV1' calculation unit 36-1 serving as an internal input value calculation unit. In the control apparatus in FIG. 21, the arrangement of the second control system associated with the second follow-up state quantity comprises a follow-up state quantity set point SP2 input unit 31-2, a follow-up state quantity measurement value PV2 input unit 32-2, a manipulated variable MV2 output unit 33-2, a PID control computation unit 34-2, a coefficient B2 storage unit 35-2, and a follow-up state quantity internal measurement value PV2' calculation unit 36-2 serving as an internal input value calculation unit. In the control apparatus in FIG. 21, the arrangement of the third control system associated with the third follow-up state quantity comprises a follow-up state quantity set point SP3 input unit 31-3, a follow-up state quantity measurement value PV3 input unit 32-3, a manipulated variable MV3 output unit 33-3, a PID control computation unit 34-3, a coefficient B3 storage unit 35-3, and a follow-up state quantity internal measurement value PV3' calculation unit 36-3 serving as an internal input value calculation unit.

In addition, in the control apparatus in FIG. 21, an arrangement associated with a reference state quantity comprises a reference state quantity set point SPm calculation unit 37 which calculates the mean value of a follow-up state quantity set point SP1, follow-up state quantity set point SP2, and follow-up state quantity set point SP3 as a reference state quantity set point SPm, a reference state quantity measurement value PVm calculation unit 38 which calculates the mean value of a follow-up state quantity measurement value PV1, follow-up state quantity measurement value PV2, and follow-up state quantity measurement value PV3 as a reference state quantity measurement value PVm, and a coefficient Am storage unit 39.

Figure 22:
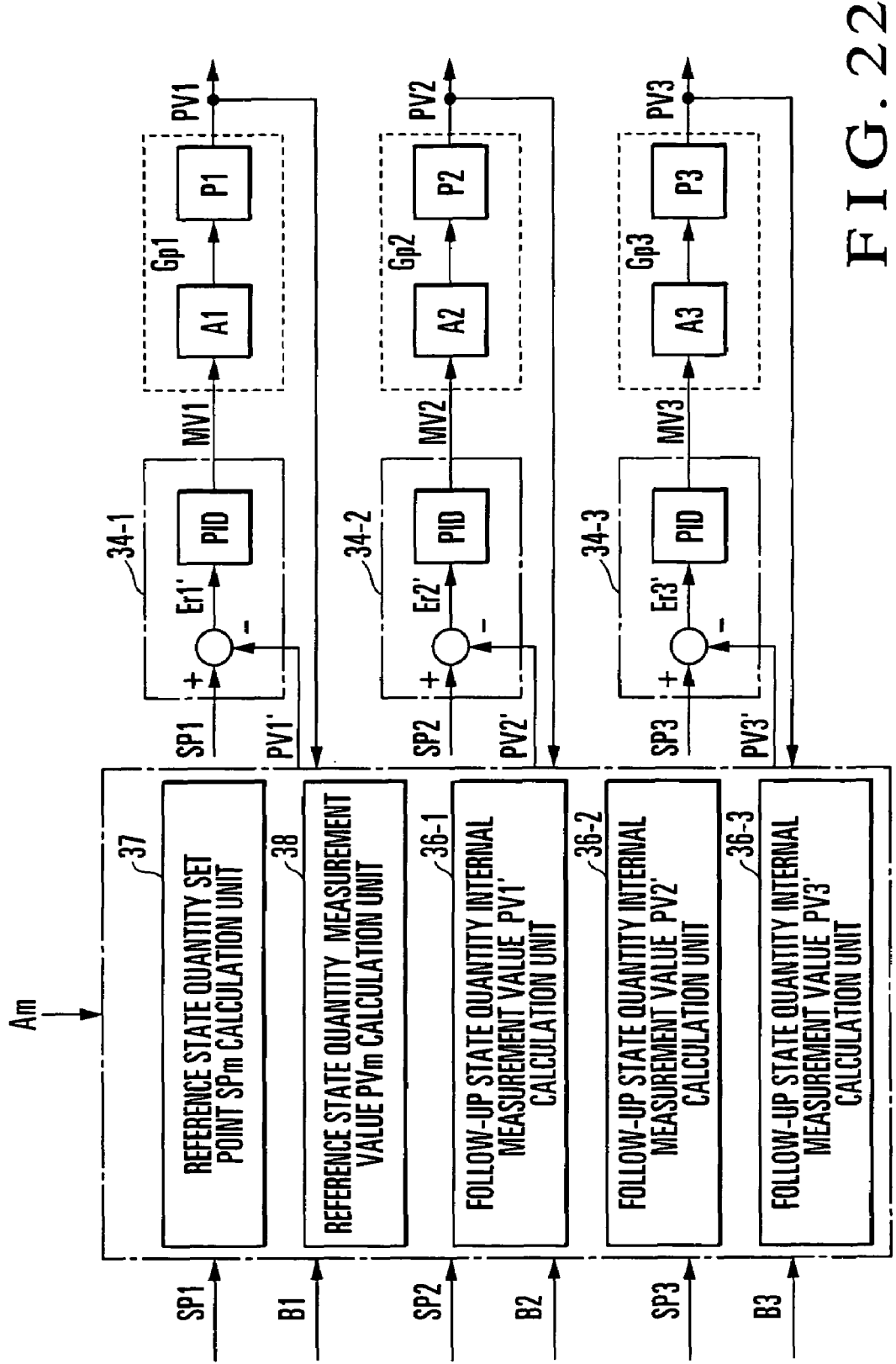
FIG. 22 is a block diagram of control systems in the third embodiment of the present invention.

FIG. 22 shows a control system in this embodiment. Referring to FIG. 22, reference symbol Er1' denotes the deviation between a first follow-up state quantity set point SP1 and the first follow-up state quantity internal measurement value PV1'; Er 2', the deviation between a second follow-up state quantity set point SP2 and the second follow-up state quantity internal measurement value PV2'; Er 3', the deviation between a third follow-up state quantity set point SP3 and the third follow-up state quantity internal measurement value PV3'; Am, a coefficient associated with a reference state quantity; B1, a coefficient associated with the state quantity difference between the first follow-up state quantity and the reference state quantity; B2, a coefficient associated with the state quantity difference between the second follow-up state quantity and the reference state quantity; B3, a coefficient associated with the state quantity difference between the third follow-up state quantity and the reference state quantity; A1, an actuator which controls the first follow-up state quantity; A2, an actuator which controls the second follow-up state quantity; A3, an actuator which controls the third follow-up state quantity; P1, a controlled system process associated with the first follow-up state quantity; P2, a controlled system process associated with the second follow-up state quantity; P3, a controlled system process associated with the third follow-up state quantity; Gp1, a transfer function for a block including the actuator A1 and process P1; Gp2, a transfer function for a block including the actuator A2 and process P2; and Gp3, a transfer function for a block including the actuator A3 and process P3.

The follow-up state quantity set point SP1 input unit 31-1, follow-up state quantity measurement value PV1 input unit 32-1, manipulated variable MV1 output unit 33-1, PID control computation unit 34-1, follow-up state quantity internal measurement value PV1' calculation unit 36-1, actuator A1, and process P1 constitute the first control system (first control loop). The follow-up state quantity set point SP2 input unit 31-2, follow-up state quantity measurement value PV2 input unit 32-2, manipulated variable MV2 output unit 33-2, PID control computation unit 34-2, follow-up state quantity internal measurement value PV2' calculation unit 36-2, actuator A2, and process P2 constitute the second control system (second control loop). The follow-up state quantity set point SP3 input unit 31-3, follow-up state quantity measurement value PV3 input unit 32-3, manipulated variable MV3 output unit 33-3, PID control computation unit 34-3, follow-up state quantity internal measurement value PV3' calculation unit 36-3, actuator A3, and process P3 constitute the third control system (third control loop).

Figure 23:
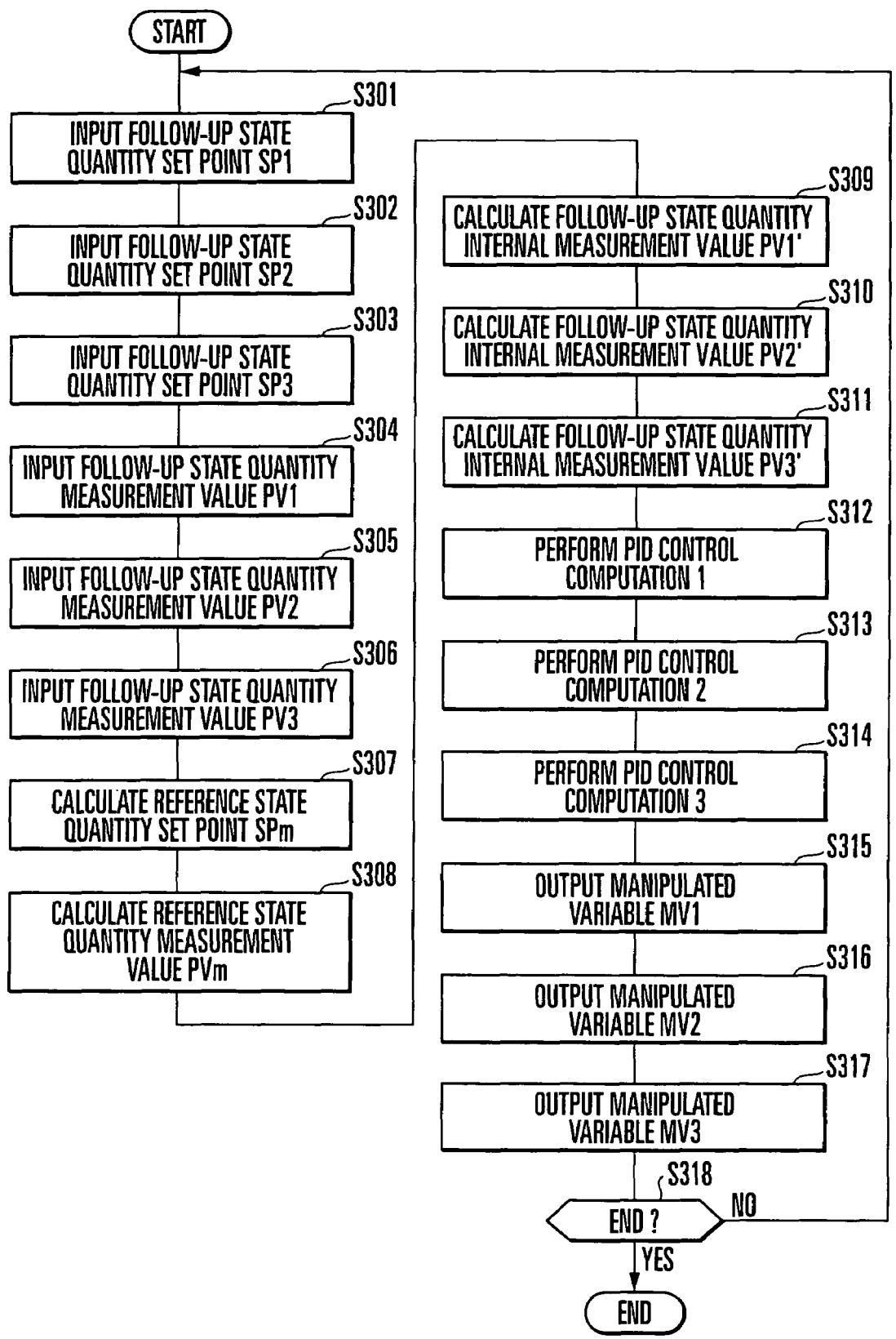
FIG. 23 is a flowchart showing the operation of the control apparatus according to the third embodiment of the present invention.

The operation of the control apparatus according to this embodiment will be described next with reference to FIG. 23. First of all, the follow-up state quantity set point SP1 is set by the operator of the control apparatus and input to the PID control computation unit 34-1, follow-up state quantity internal measurement value PV1' calculation unit 36-1, and reference state quantity set point SPm calculation unit 37 through the follow-up state quantity set point SP1 input unit 31-1 (step S301 in FIG. 23). The follow-up state quantity set point SP2 is set by the operator and input to the PID control computation unit 34-2, follow-up state quantity internal measurement value PV2' calculation unit 36-2, and reference state quantity set point SPm calculation unit 37 through the follow-up state quantity set point SP2 input unit 31-2 (step S302). The follow-up state quantity set point SP3 is set by the operator and input to the PID control computation unit 34-3, follow-up state quantity internal measurement value PV3' calculation unit 36-3, and reference state quantity set point SPm calculation unit 37 through the follow-up state quantity set point SP3 input unit 31-3 (step S303).

The follow-up state quantity measurement value PV1 is detected by the first detection means (not shown) and input to the follow-up state quantity internal measurement value PV1' calculation unit 36-1 and reference state quantity measurement value PVm calculation unit 38 through the follow-up state quantity measurement value PV1 input unit 32-1 (step S304). The follow-up state quantity measurement value PV2 is detected by the second detection means (not shown) and input to the follow-up state quantity internal measurement value PV2' calculation unit 36-2 and reference state quantity measurement value PVm calculation unit 38 through the follow-up state quantity measurement value PV2 input unit 32-2 (step S305). The follow-up state quantity measurement value PV3 is detected by the third detection means (not shown) and input to the follow-up state quantity internal measurement value PV3' calculation unit 36-3 and reference state quantity measurement value PVm calculation unit 38 through the follow-up state quantity measurement value PV3 input unit 32-3 (step S306).

Subsequently, the reference state quantity set point SPm calculation unit 37 calculates the mean value of the follow-up state quantity set point SP1, follow-up state quantity set point SP2, and follow-up state quantity set point SP3 as the reference state quantity set point SPm according to the following equation, and outputs the reference state quantity set point SPm to the follow-up state quantity internal measurement value PV1' calculation unit 36-1, follow-up state quantity internal measurement value PV2' calculation unit 36-2, and follow-up state quantity internal measurement value PV3' calculation unit 36-3 (step S307).

$$SPm=(SP1+SP2+SP3)/3 \quad (63)$$

The reference state quantity measurement value PVm calculation unit 38 calculates the mean value of the follow-up state quantity measurement value PV1, follow-up state quantity measurement value PV2, and follow-up state quantity measurement value PV3 as the reference state quantity measurement value PVm according to the following equation, and outputs the reference state quantity measurement value PVm to the follow-up state quantity internal measurement value PV1' calculation unit 36-1, follow-up state quantity internal measurement value PV2' calculation unit 36-2, and follow-up state quantity internal measurement value PV3' calculation unit 36-3 (step S308).

$$PVm=(PV1+PV2+PV3)/3 \quad (64)$$

The coefficient Am storage unit 39 stores the coefficient Am associated with a reference state quantity in advance, and the coefficient B1 storage unit 35-1 stores the coefficient B1 associated with the state quantity difference between the first follow-up state quantity and the reference state quantity in advance. The follow-up state quantity internal measurement value PV1' calculation unit 36-1 calculates the follow-up state quantity internal measurement value PV1' on the basis of the coefficients Am and B1, the reference state quantity set point SPm, the reference state quantity measurement value PVm, the follow-up state quantity set point SP1, and the follow-up state quantity measurement value PV1 according to the following equation (step S309).

$$PV1' = \quad (65)$$
$$(1-Am)SPm + AmPVm + (1-B1)(SP1-SPm) + B1(PV1-PVm)$$

The coefficient B2 storage unit 35-2 stores the coefficient B2 associated with the state quantity difference between the second follow-up state quantity and the reference state quantity in advance. The follow-up state quantity internal measurement value PV2' calculation unit 36-2 calculates the follow-up state quantity internal measurement value PV2' on the basis of the coefficients Am and B2, the reference state quantity set point SPm, the reference state quantity measurement value PVm, the follow-up state quantity set point SP2, and the follow-up state quantity measurement value PV2 according to the following equation (step S310).

$$PV2' = \quad (66)$$
$$(1-Am)SPm + AmPVm + (1-B2)(SP2-SPm) + B2(PV2-PVm)$$

The coefficient B3 storage unit 35-3 stores the coefficient B3 associated with the state quantity difference between the third follow-up state quantity and the reference state quantity in advance. The follow-up state quantity internal measurement value PV3' calculation unit 36-3 calculates the follow-up state quantity internal measurement value PV3' on the basis of the coefficients Am and B3, the reference state quantity set point SPm, the reference state quantity measurement value PVm, the follow-up state quantity set point SP3, and the-follow-up state quantity measurement value PV3 according to the following equation (step S311).

$$PV3' = \quad (67)$$
$$(1-Am)SPm + AmPVm + (1-B3)(SP3-SPm) + B3(PV3-PVm)$$

The PID control computation unit 34-1 calculates a manipulated variable MV1 by performing PID control computation represented by the following transfer function equation (step S312).

$$MV1=(100/Pb1)\{1+(1/Ti1s)+Td1s\}(SP1-PV1') \quad (68)$$

where Pb1 is a proportional band, Ti1 is a reset time, Td1 is a rate time, and s is a Laplace operator. Note that as a measure against integration windup, the PID control computation unit 34-1 performs manipulated variable upper/lower limit processing as follows. If the calculated manipulated variable MV1 is smaller than a lower limit value OL1 of the output of the actuator A1, the PID control computation unit 34-1 sets manipulated variable MV1=OL1. If the calculated manipulated variable MV1 is larger than an upper limit value OH1 of the output of the actuator A1, the PID control computation unit 34-1 sets manipulated variable MV1=OH1.

The PID control computation unit 34-2 calculates a manipulated variable MV2 by performing PID control computation represented by the following transfer function equation (step S313).

$$MV2=(100/Pb2)\{1+(1/Ti2s)+Td2s\}(SP2-PV2') \quad (69)$$

where Pb2 is a proportional band, Ti2 is a reset time, and Td2 is a rate time. Note that as a measure against integration windup, the PID control computation unit 34-2 performs manipulated variable upper/lower limit processing as follows. If the calculated manipulated variable MV2 is smaller than a lower limit value OL2 of the output of the actuator A2, the PID control computation unit 34-2 sets manipulated variable MV2=OL2. If the calculated manipulated variable MV2 is larger than an upper limit value OH2 of the output of the actuator A2, the PID control computation unit 34-2 sets manipulated variable MV2=OH2.

The PID control computation unit 34-3 calculates a manipulated variable MV3 by performing PID control computation represented by the following transfer function equation (step S314).

$$MV3=(100/Pb3)\{1+(1/Ti3s)+Td3s\}(SP3-PV3') \quad (70)$$

where Pb3 is a proportional band, Ti3 is a reset time, and Td3 is a rate time. Note that as a measure against integration windup, the PID control computation unit 34-3 performs manipulated variable upper/lower limit processing as follows. If the calculated manipulated variable MV3 is smaller than a lower limit value OL3 of the output of the actuator A3, the PID control computation unit 34-3 sets manipulated variable MV3=OL3. If the calculated manipulated variable MV3 is larger than an upper limit value OH3 of the output of the actuator A3, the PID control computation unit 34-3 sets manipulated variable MV3=OH3.

The manipulated variable MV1 output unit 33-1 outputs the manipulated variable MV1 calculated by the PID control computation unit 34-1 to the actuator A1 (step S315). The actuator A1 operates to control the first follow-up state quantity on the basis of the manipulated variable MV1.

The manipulated variable MV2 output unit 33-2 outputs the manipulated variable MV2 calculated by the PID control computation unit 34-2 to the actuator A2 (step S316). The actuator A2 operates to control the second follow-up state quantity on the basis of the manipulated variable MV2.

The manipulated variable MV3 output unit 33-3 outputs the manipulated variable MV3 calculated by the PID control computation unit 34-3 to the actuator A3 (step S317). The actuator A3 operates to control the third follow-up state quantity on the basis of the manipulated variable MV3.

The above processing in steps S301 to S317 is repeatedly executed in control cycles until the end of control is designated by the operator (YES in step S318).

FIGS. 24A, 25A, 26A, 27A, and 28A show the step responses of the control system when the follow-up state quantity set points SP1, SP2, and SP3 are changed to 30.0. FIGS. 24B, 25 B, 26B, 27B, and 28B show the disturbance responses of the control system when disturbances are applied to the system while the system is stabilized with SP1=30.0, SP2=30.0, and SP3=30.0. Simulation conditions are set as follows.

First of all, the transfer function Gp1 for the block including the actuator A1 and process P1, the transfer function Gp2 for the block including the actuator A2 and process P2, and the transfer function Gp3 for the block including the actuator A3 and process P3 are set according to the following equations. Assume that there is no interference between the control loops.

$$Gp1=1.2 \exp(-2.0s)/\{(1+70.0s)(1+10.0s)\} \quad (71)$$

$$Gp2=1.6 \exp(-2.0s)/\{(1+60.0s)(1+10.0s)\} \quad (720)$$

$$Gp3=2.0 \exp(-2.0s)/\{(1+50.0s)(1+10.0s)\} \quad (73)$$

In accordance with the manipulated variables MV1, MV2, and MV3, the follow-up state quantity measurement values PV1, PV2 and PV3 are determined as follows:

$$PV1=Gp1MV1 \quad (74)$$

$$PV2=Gp2MV2 \quad (75)$$

$$PV3=Gp3MV3 \quad (76)$$

Assume that the proportional band Pb1, reset time Ti1, and rate time Td1 as PID parameters in the PID control computation unit 34-1 are respectively set to 50.0, 35.0 and 20.0, the proportional band Pb2, reset time Ti2, and rate time Td2 as PID parameters in the PID control computation unit 34-2 are respectively set to 66.7, 35.0, and 20.0, and the proportional band Pb3, reset time Ti3, and rate time Td3 as PID parameters in the PID control computation unit 34-3 are respectively set to 100.0, 35.0, and 20.0.

Figure 24A:
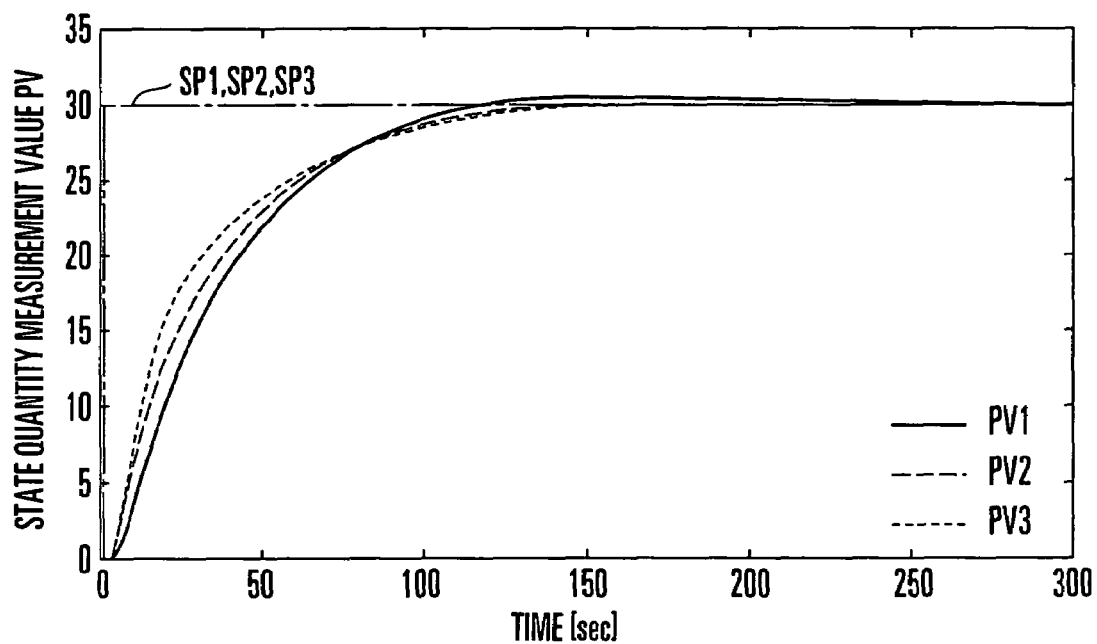
FIG. 24A is a graph showing the step responses of the control systems when follow-up state quantity set points are changed in the control apparatus according to the third embodiment of the present invention.
Figure 24B:
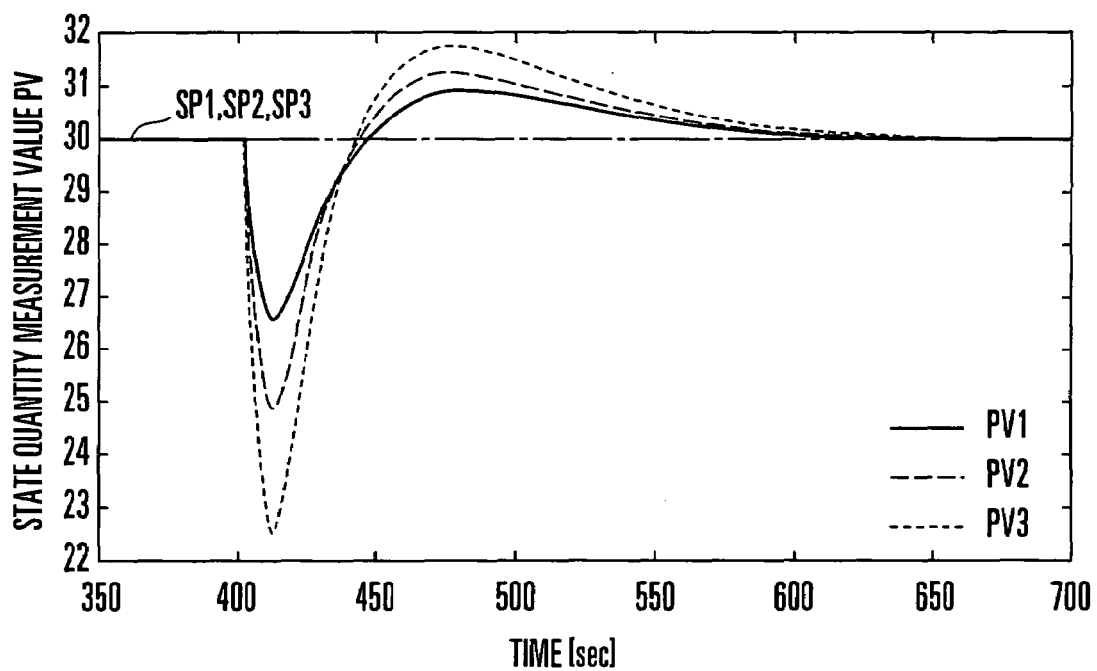
FIG. 24B is a graph showing the disturbance responses of the control systems when disturbances are applied to the control apparatus according to the third embodiment of the present invention.

The simulation result shown in FIGS. 24A and 24B is obtained with settings equivalent to general control (Am=1.0, B1=1.0, B2=1.0, and B3=1.0), and the follow-up state quantity measurement values PV1, PV2, and PV3 do not coincide with each other because the relative state quantities (state quantity differences) are not controlled.

Figure 25A:
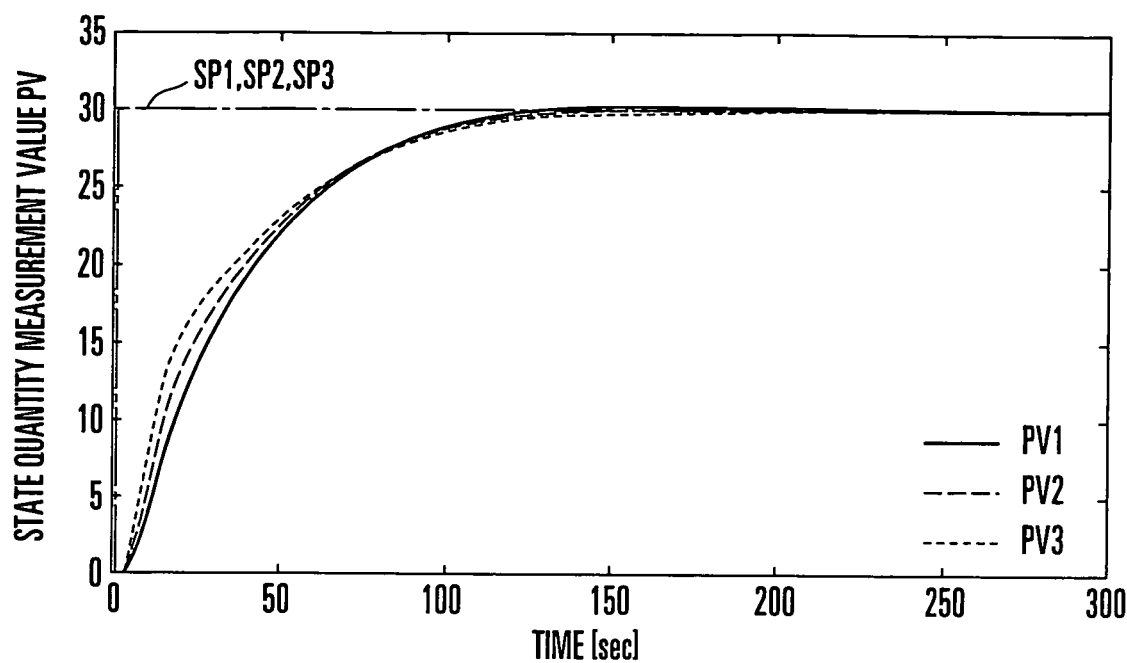
FIG. 25A is a graph showing the step responses of the control systems when follow-up state quantity set points are changed in the control apparatus according to the third embodiment of the present invention.
Figure 25B:
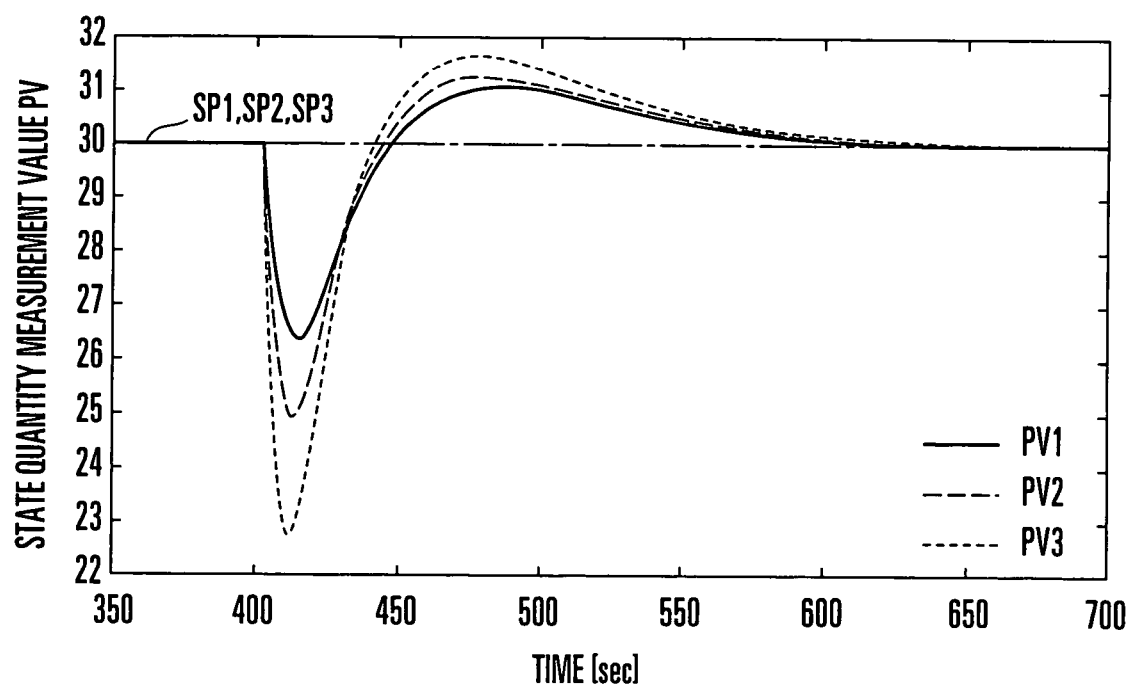
FIG. 25B is a graph showing the disturbance responses of the control systems when disturbances are applied to the control apparatus according to the third embodiment of the present invention.

The simulation result shown in FIGS. 25A and 25B is obtained with settings that allow to moderately obtain the effect of this embodiment (Am=1.0, B1=1.5, B2=1.5, and B3=1.5), and the follow-up state quantity measurement values PV1, PV2, and PV3 coincide with each other compared with the case shown in FIGS. 24A and 24B because the relative state quantities (state quantity differences) are controlled to some extent.

Figure 26A:
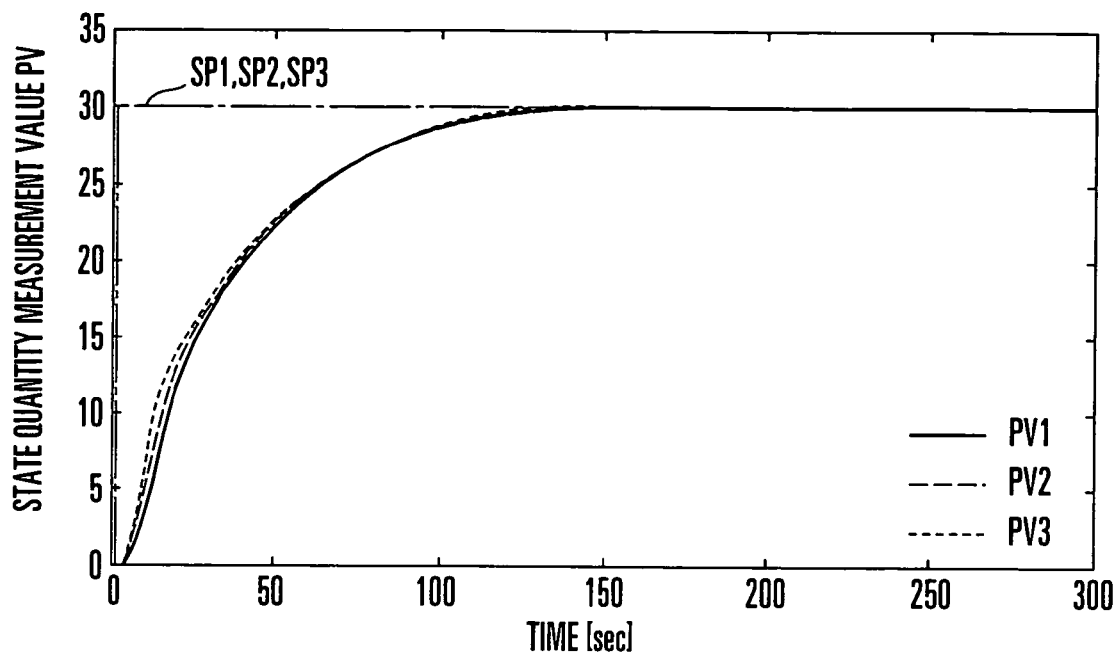
FIG. 26A is a graph showing the step responses of the control systems when follow-up state quantity set points are changed in the control apparatus according to the third embodiment of the present invention.
Figure 26B:
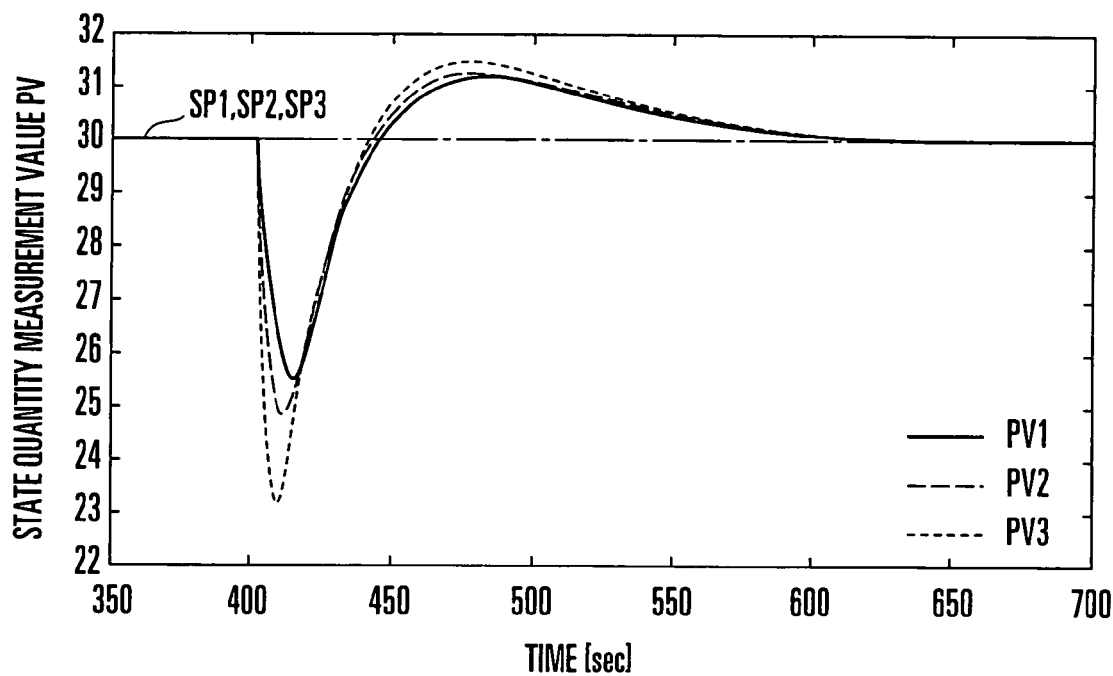
FIG. 26B is a graph showing the disturbance responses of the control systems when disturbances are applied to the control apparatus according to the third embodiment of the present invention.

The simulation result shown in FIGS. 26A and 26B is obtained with settings that allow to noticeably obtain the effect of this embodiment (Am=1.0, B1=3.0, B2=3.0, and B3=3.0), and the follow-up state quantity measurement values PV1, PV2, and PV3 noticeably coincide with each other compared with the case shown in FIGS. 24A and 24B because the relative state quantities (state quantity differences) are sufficiently controlled.

Figure 27A:
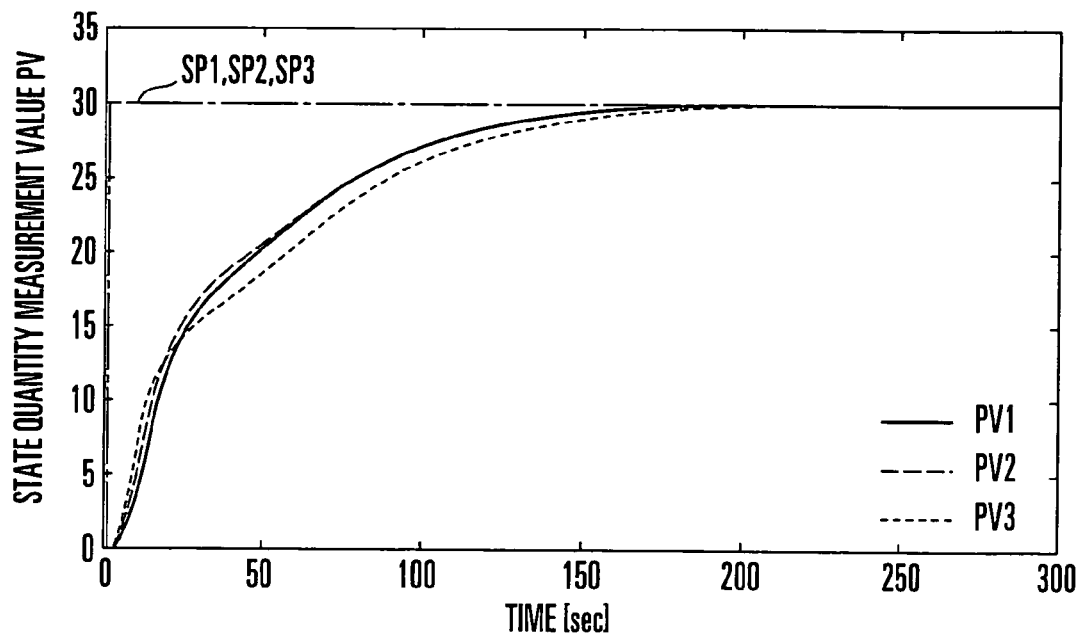
FIG. 27A is a graph showing the step responses of the control systems when follow-up state quantity set points are changed in the control apparatus according to the third embodiment of the present invention.
Figure 27B:
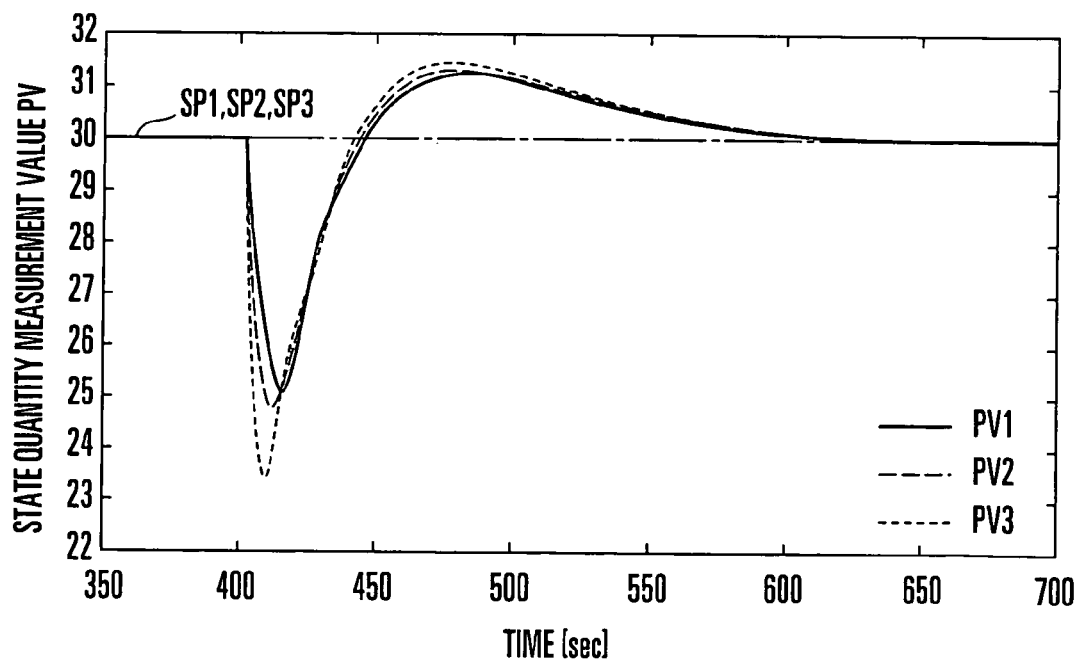
FIG. 27B is a graph showing the disturbance responses of the control systems when disturbances are applied to the control apparatus according to the third embodiment of the present invention.

The simulation result shown in FIGS. 27A and 27B is obtained with settings that result in the excessive effect of this embodiment (Am=1.0, B1=4.0, B2=4.0, and B3=4.0), and the follow-up state quantity measurement values PV1, PV2, and PV3 do not coincide with each other compared with the case shown in FIGS. 26A and 26B because control becomes unstable at the time of step response.

Figure 28A:
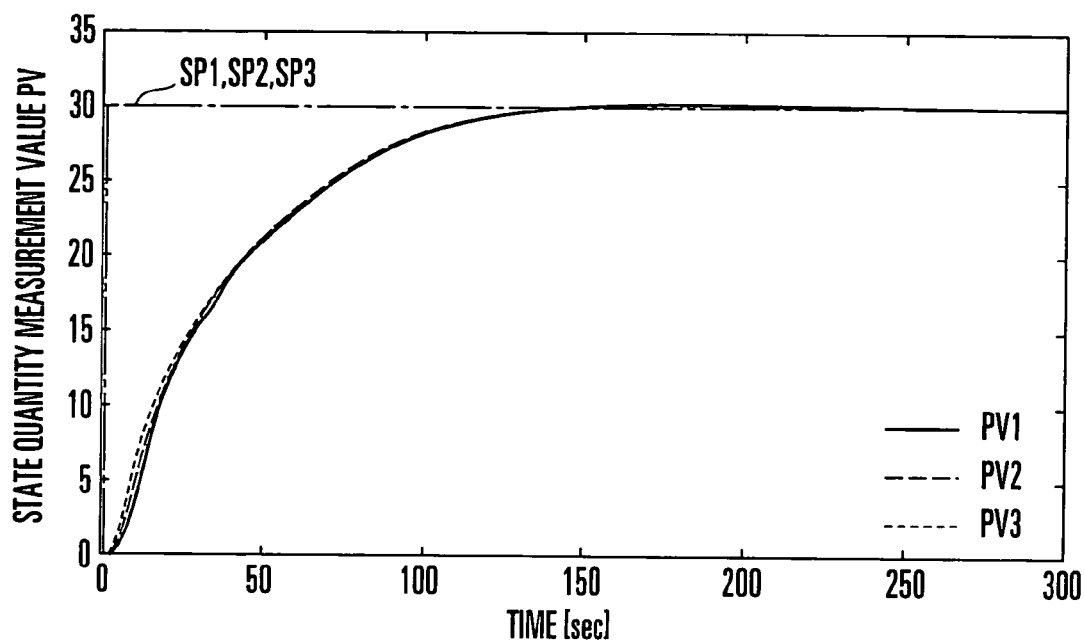
FIG. 28A is a graph showing the step responses of the control systems when follow-up state quantity set points are changed in the control apparatus according to the third embodiment of the present invention.
Figure 28B:
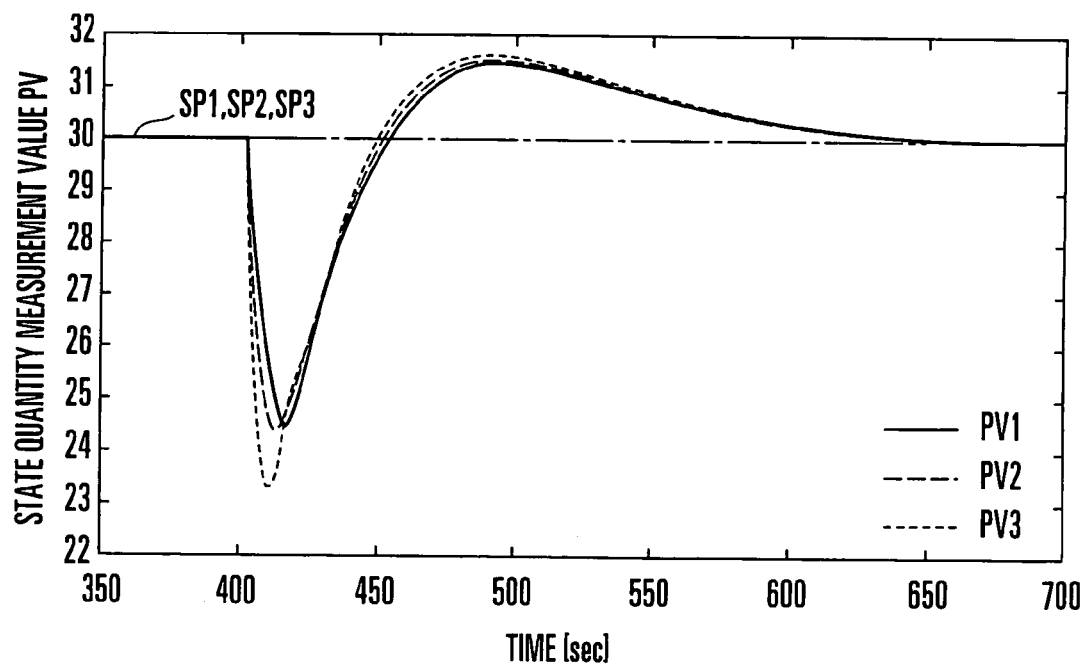
FIG. 28B is a graph showing the disturbance responses of the control systems when disturbances are applied to the control apparatus according to the third embodiment of the present invention.

The simulation result shown in FIGS. 28A and 28B is obtained with settings that avoid the excessive effect of this embodiment (Am=0.7, B1=4.0, B2=4.0, and B3=4.0), and the follow-up state quantity measurement values PV1, PV2, and PV3 further coincide with each other compared with the case shown in FIGS. 26A and 26B because the reference state quantity is shifted to the low-sensitivity side.

In the simulation results shown in FIGS. 24A and 24B to FIGS. 28A and 28B, setting SP1=SP2=SP3=30.0 makes all the state quantity differences between the first follow-up state quantity and the second follow-up state quantity, between the second follow-up state quantity and the third follow-up state quantity, and between the third follow-up state quantity and the first follow-up state quantity become 0.

If the follow-up state quantity set points SP1, SP2, and SP3 are set to different values, the state quantity measurement values PV1, PV2, and PV3 change to keep the differences between the state quantity measurement values PV1, PV2, and PV3 constant in accordance with the differences between the state quantity set points SP1, SP2, and SP3. If, for example, SP1=20.0, SP2=30.0, and SP3=40.0 are set, step responses and disturbance suppressing responses are performed to maintain state quantity difference PV3−PV2=10.0, state quantity difference PV2−PV1=10.0, and state quantity difference PV3−PV1=20.0.

According to this embodiment, in a control system having at least two control loops, when a state quantity serving as a specific reference is set as a reference state quantity, and a state quantity which is controlled to maintain a relative quantity with respect to the reference state quantity at a specified value is set as a follow-up state quantity, a calculation sequence is executed, in which a follow-up state quantity measurement value PVi of a plurality of control computation input values input to the controller which controls the follow-up state quantity is transformed into a follow-up state quantity internal measurement value PVi' and input to the controller. In this calculation sequence, the follow-up state quantity internal measurement value PVi' is calculated as the sum of the first element with respect to the reference state quantity and the second element with respect to the relative quantity. This makes it possible to realize control operation of changing the reference state quantity such as a state quantity mean value to a desired value while maintaining a relative quantity such as the state quantity difference between the reference state quantity and the follow-up state quantity at a desired value. In addition, this embodiment can form a control system in which manipulated variables from the controller correspond to outputs from actual actuators on a one-to-one basis, integration windup can be prevented, and the controller can be adjusted by using a conventionally proposed parameter adjustment method or automatic adjustment function. Furthermore, using the value obtained by multiplying an element for a control computation input value to a relative quantity by the first coefficient as the second element of the follow-up state quantity internal measurement values PVi' makes it possible to control the reference state quantity while preferentially controlling the relative quantity.

In addition, using the value obtained by multiplying an element of control computation input values to the reference state quantity by the second coefficient as the first element of the follow-up state quantity internal measurement values PVi' makes it possible to avoid control instability due to an increase in the sensitivity of control based on the first coefficient and also avoid the sacrifice of the priority of the relative quantity between the reference state quantity and the follow-up state quantity.

Fourth Embodiment

Figure 29:
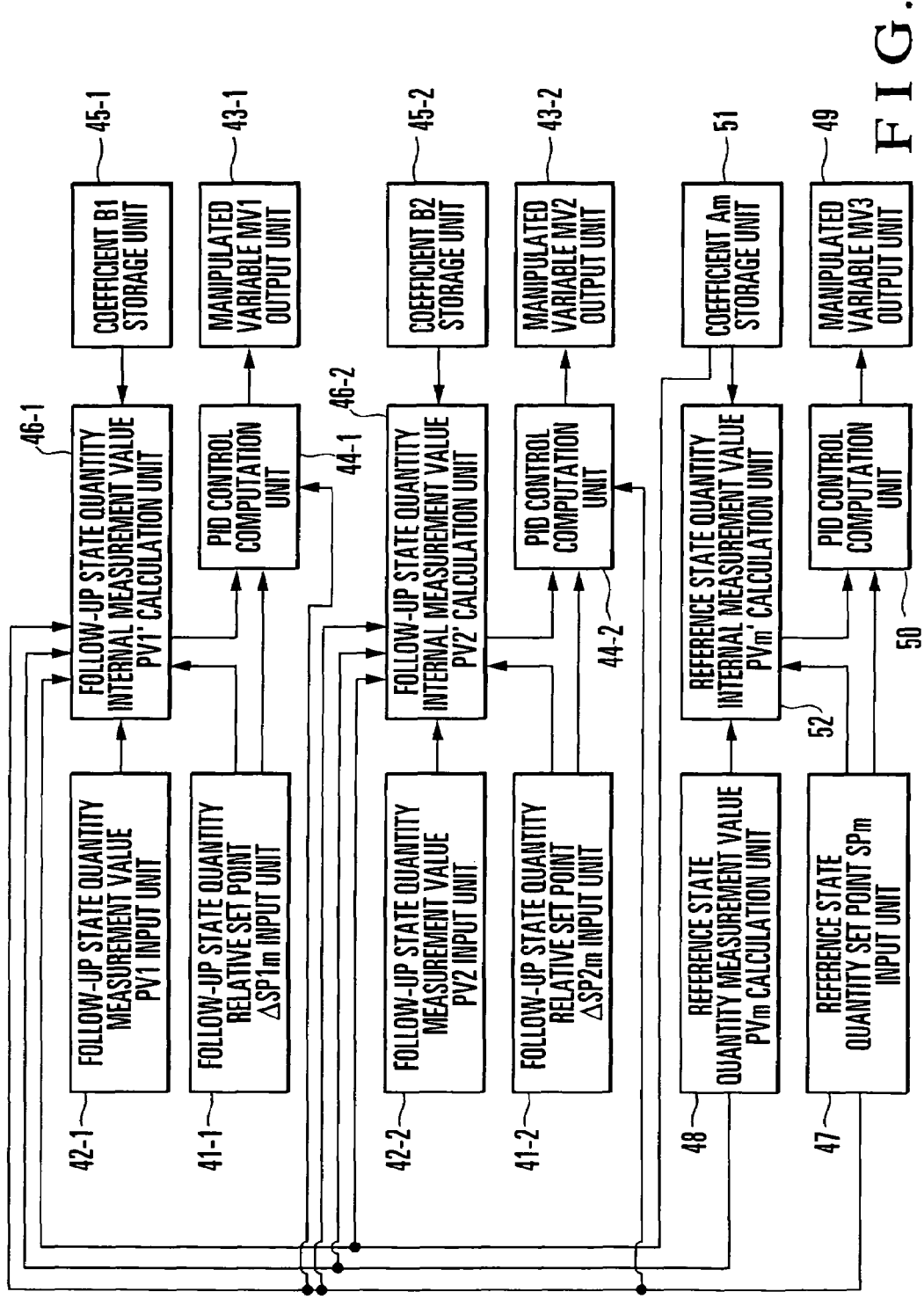
FIG. 29 is a block diagram showing the arrangement of a control apparatus according to the fourth embodiment of the present invention.

The fourth embodiment of the present invention will be described next. FIG. 29 shows the arrangement of a control apparatus according to the fourth embodiment of the present invention. This embodiment will exemplify a case wherein there are three control loops, the state quantity of one typical control loop is used as a reference state quantity, and the state quantities of the remaining two control loops are used as follow-up state quantities. However, a similar control system can be formed on the basis of the same principle as long as there are two or more control loops.

In the control apparatus in FIG. 29, the arrangement of the first control system associated with the first follow-up state quantity comprises a follow-up state quantity relative set point ΔSP1m input unit 41-1, a follow-up state quantity measurement value PV1 input unit 42-1, a manipulated variable MV1 output unit 43-1, a PID control computation unit (PID controller) 44-1, a coefficient B1 storage unit 45-1, and a follow-up state quantity internal measurement value PV1' calculation unit 46-1 serving as an internal input value calculation unit. In addition, in the control apparatus in FIG. 29, the arrangement of the second control system associated with the second follow-up state quantity comprises a follow-up state quantity relative set point ΔSP2m input unit 41-2, a follow-up state quantity measurement value PV2 input unit 42-2, manipulated variable MV2 output unit 43-2, a PID control computation unit 44-2, a coefficient B2 storage unit 45-2, and a follow-up state quantity internal measurement value PV2' calculation unit 46-2 serving as an internal input value calculation unit.

Furthermore, in the control apparatus in FIG. 29, the arrangement of the third control system associated with a reference state quantity comprises a reference state quantity set point SPm input unit 47, reference state quantity measurement value PVm input unit 48, manipulated variable MV3 output unit 49, PID control computation unit 50, coefficient Am storage unit 51, and reference state quantity internal measurement value PVm' calculation unit 52.

Figure 30:
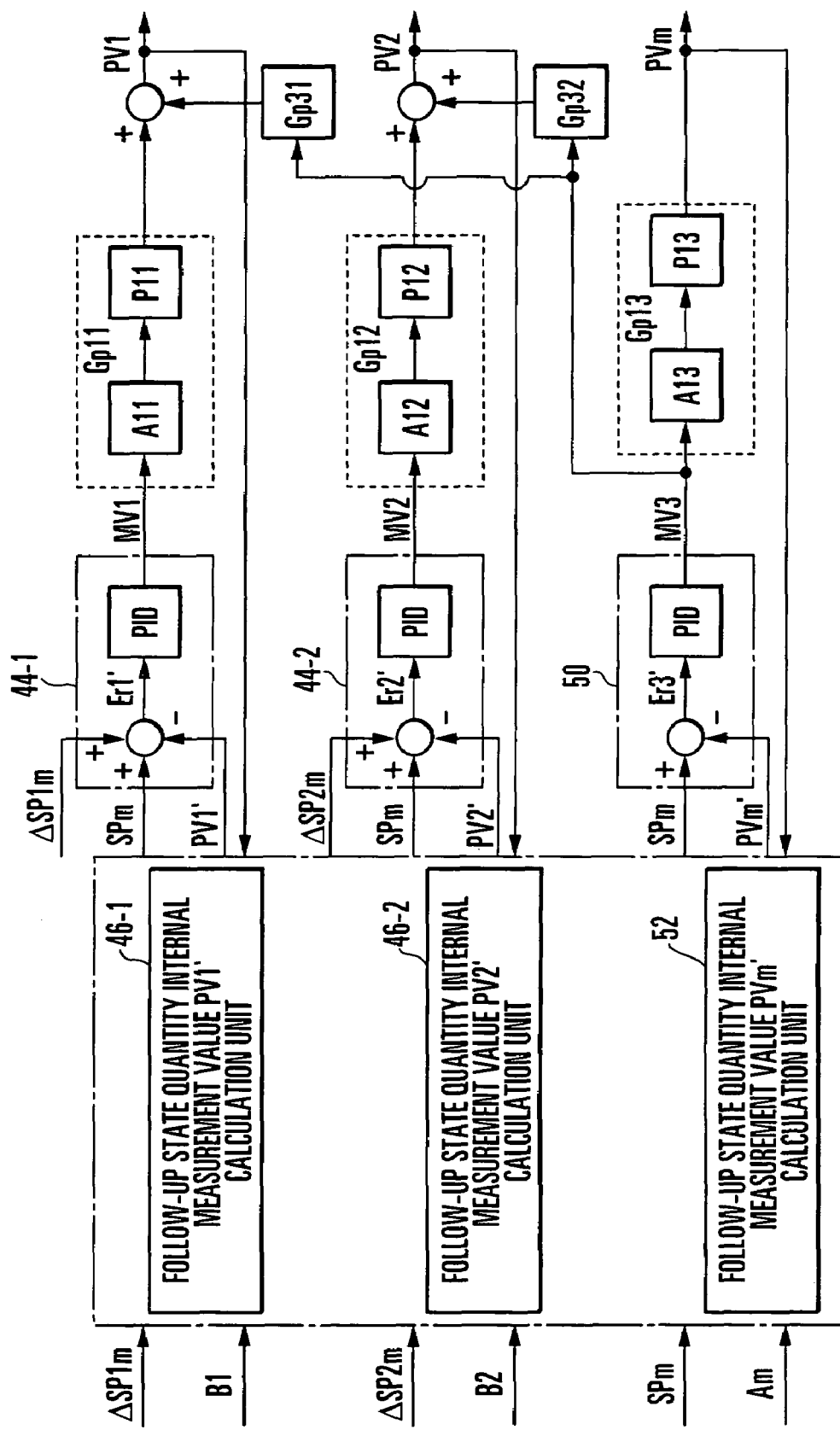
FIG. 30 is a block diagram of control systems in the fourth embodiment of the present invention.

FIG. 30 shows a control system according to this embodiment. Referring to FIG. 30, reference symbol Er1' denotes the deviation between (SPm+ΔSP1m) obtained by adding a first follow-up state quantity relative set point ΔSP1m to a reference state quantity set point SPm and a first follow-up state quantity internal measurement value PV1'; Er2', the deviation between (SPm+ΔSP2m) obtained by adding a second follow-up state quantity relative set point ΔSP2m to the reference state quantity set point SPm and a second follow-up state quantity internal measurement value PV2'; and Er3', the deviation between the reference state quantity set point SPm and a reference state quantity internal measurement value PVm'; Am, a coefficient associated with the reference state quantity; B1, a coefficient associated with the state quantity difference between the first follow-up state quantity and the reference state quantity; B2, a coefficient associated with the state quantity difference between the second follow-up state quantity and the reference state quantity; A11, an actuator which controls the first follow-up state quantity; A12, an actuator which controls the second follow-up state quantity; A13, an actuator which controls the reference state quantity; P11, a controlled system process associated with the first follow-up state quantity; P12, a controlled system process associated with the second follow-up state quantity; P13, a controlled system process associated with the reference state quantity; Gp11, a transfer function for a block including the actuator A11 and process P11; Gp12, a transfer function for a block including the actuator A12 and process P12; Gp13, a transfer function for a block including the actuator A13 and process P13; Gp31, a transfer function representing the interference between the first control loop and the third control loop; and Gp32, a transfer function representing the interference between the second control loop and the third control loop.

The follow-up state quantity relative set point ΔSP1m input unit 41-1, follow-up state quantity measurement value PV1 input unit 42-1, manipulated variable MV1 output unit 43-1, PID control computation unit 44-1, follow-up state quantity internal measurement value PV1' calculation unit 46-1, actuator A11, and process P11 constitute the first control system (first control loop). The follow-up state quantity relative set point ΔSP2m input unit 41-2, follow-up state quantity measurement value PV2 input unit 42-2, manipulated variable MV2 output unit 43-2, PID control computation unit 44-2, follow-up state quantity internal measurement value PV2' calculation unit 46-2, actuator A12, and process P12 constitute the second control system (second control loop). The reference state quantity set point SPm input unit 47, reference state quantity measurement value PVm input unit 48, manipulated variable MV3 output unit 49, PID control computation unit 50, reference state quantity internal measurement value PVm' calculation unit 52, actuator A13, and process P13 constitute the third control system (third control loop).

Figure 31:
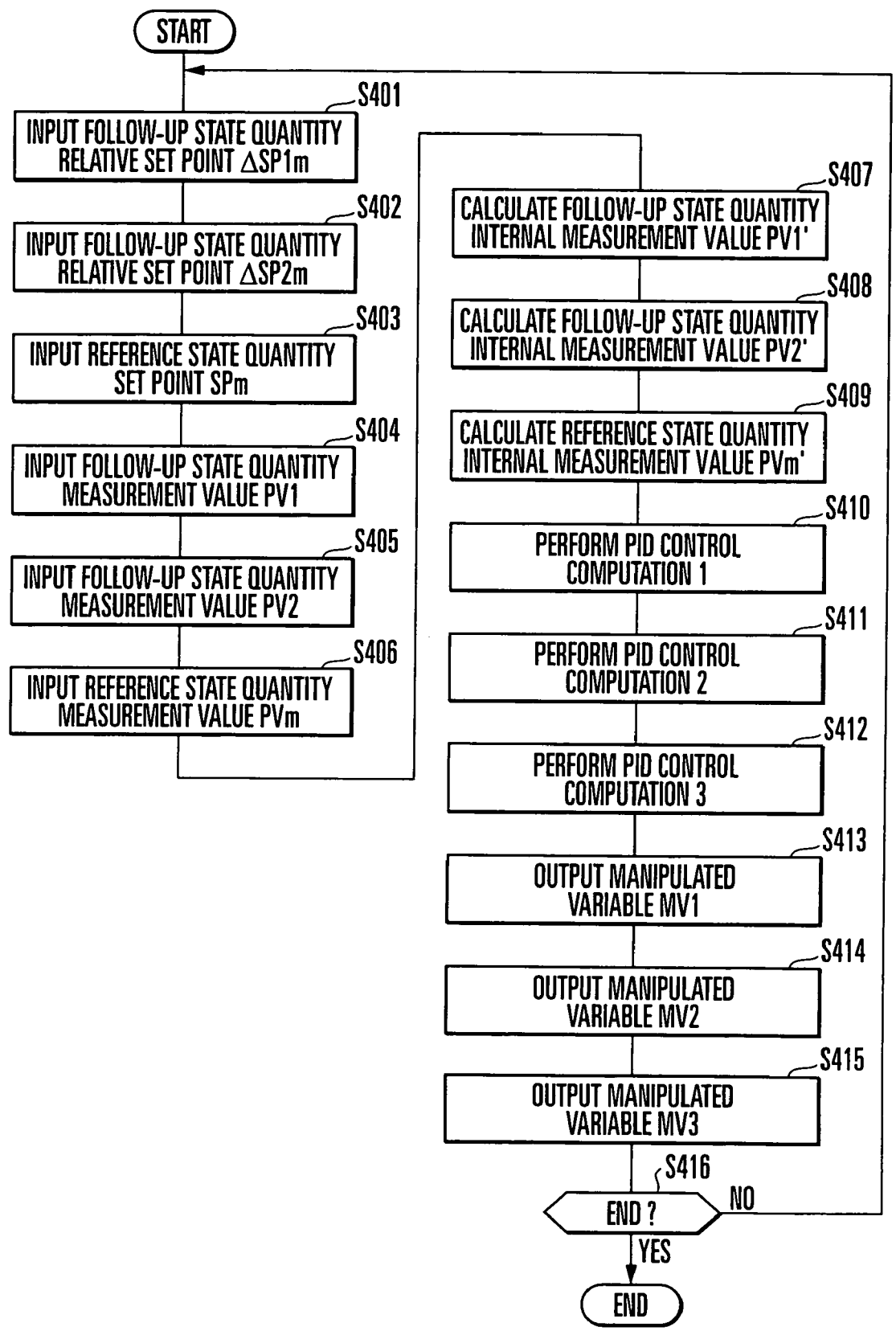
FIG. 31 is a flowchart showing the operation of the control apparatus according to the fourth embodiment of the present invention.

The operation of the control apparatus of this embodiment will be described next with reference to FIG. 31. First of all, the follow-up state quantity relative set point ΔSP1m is set by the operator of the control apparatus and input to the PID control computation unit 44-1 and follow-up state quantity internal measurement value PV1' calculation unit 46-1 through the follow-up state quantity relative set point ΔSP1m input unit 41-1 (step S401 in FIG. 31). The follow-up state quantity relative set point ΔSP2m is set by the operator and input to the PID control computation unit 44-2 and follow-up state quantity internal measurement value PV2' calculation unit 46-2 through the follow-up state quantity relative set point ΔSP2m input unit 41-2 (step S402). The reference state quantity set point SPm is set by the operator and input to the PID control computation units 44-1, 44-2, and 50, the follow-up state quantity internal measurement value PV1' calculation unit 46-1, follow-up state quantity internal measurement value PV2' calculation unit 46-2, and reference state quantity internal measurement value PVm' calculation unit 52 through the reference state quantity set point SPm input unit 47 (step S403).

A follow-up state quantity measurement value PV1 is detected by the first detection means (not shown) and input to the follow-up state quantity internal measurement value PV1' calculation unit 46-1 through the follow-up state quantity measurement value PV1 input unit 42-1 (step S404). A follow-up state quantity measurement value PV2 is detected by the second detection means (not shown) and input to the follow-up state quantity internal measurement value PV2' calculation unit 46-2 through the follow-up state quantity measurement value PV2 input unit 42-2 (step S405). The reference state quantity measurement value PVm is detected by the third detection means (not shown) and input to the follow-up state quantity internal measurement value PV1' calculation unit 46-1, follow-up state quantity internal measurement value PV2' calculation unit 46-2, and reference state quantity internal measurement value PVm' calculation unit 52 through the reference state quantity measurement value PVm input unit 48 (step S406).

The coefficient Am storage unit 51 stores the coefficient Am associated with the reference state quantity in advance. The coefficient B1 storage unit 45-1 stores the coefficient B1 associated with the state quantity difference between the first follow-up state quantity and the reference state quantity in advance. The follow-up state quantity internal measurement value PV1' calculation unit 46-1 calculates the follow-up state quantity internal measurement value PV1' on the basis of the coefficients Am and B1, the reference state quantity set point SPm, the reference state quantity measurement value PVm, the follow-up state quantity relative set point ΔSP1m, and follow-up state quantity measurement value PV1 according to the following equation (step S407).

$$PV1' = (1 - Am)SPm + AmPVm + (1 - B1)\Delta SP1m + B1(PV1 - PVm) \quad (77)$$

The coefficient B2 storage unit 45-2 stores the coefficient B2 associated with the state quantity difference between the second follow-up state quantity and the reference state quantity in advance. The follow-up state quantity internal measurement value PV2' calculation unit 46-2 calculates the follow-up state quantity internal measurement value PV2' on the basis of the coefficients Am and B2, the reference state quantity set point SPm, the reference state quantity measurement value PVm, follow-up state quantity relative set point ΔSP2m, and the follow-up state quantity measurement value PV2 according to the following equation (step S408)

$$PV2' = (1 - Am)SPm + AmPVm + (1 - B2)\Delta SP2m + B2(PV2 - PVm) \quad (78)$$

The reference state quantity internal measurement value PVm' calculation unit 52 calculates the reference state quantity internal measurement value PVm' on the basis of the coefficient Am, reference state quantity set point SPm, and reference state quantity measurement value PVm according to the following equation (step S409).

$$PVm' = (1 - Am)SPm + AmPVm \quad (79)$$

The PID control computation unit 14-1 then calculates a manipulated variable MV1 by performing PID control computation represented by the following transfer function equation (step S410)

$$MV1 = (100/Pb1)\{1 + (1/Ti1s) + Td1s\}(SPm + \Delta SP1m - PV1') \quad (80)$$

where Pb1 is a proportional band, Ti1 is a reset time, and Td1 is a rate time. Note that as a measure against integration windup, the PID control computation unit 44-1 performs manipulated variable upper/lower limit processing as follows. If the calculated manipulated variable MV1 is smaller than a lower limit value OL1 of the output of the actuator A11, the PID control computation unit 44-1 sets manipulated variable MV1=OL1. If the calculated manipulated variable MV1 is larger than an upper limit value OH1 of the output of the actuator A11, the PID control computation unit 44-1 sets manipulated variable MV1=OH1.

The PID control computation unit 44-2 then calculates a manipulated variable MV2 by performing PID control computation represented by the following transfer function equation (step S411)

$$MV2 = (100/Pb2)\{1 + (1/Ti2s) + Td2s\}(SPm + \Delta SP2m - PV2') \quad (81)$$

where Pb2 is a proportional band, Ti2 is a reset time, and Td2 is a rate time. Note that as a measure against integration windup, the PID control computation unit 44-2 performs manipulated variable upper/lower limit processing as follows. If the calculated manipulated variable MV2 is smaller than a lower limit value OL2 of the output of the actuator A12, the PID control computation unit 44-2 sets manipulated variable MV2=OL2. If the calculated manipulated variable MV2 is larger than an upper limit value OH2 of the output of the actuator A12, the PID control computation unit 44-2 sets manipulated variable MV2=OH2.

The PID control computation unit 50 then calculates a manipulated variable MV3 by performing PID control computation represented by the following transfer function equation (step S412)

$$MV3 = (100/Pb3)\{1 + (1/Ti3s) + Td3s\}(SPm - PVm') \quad *(82)$$

where Pb3 is a proportional band, Ti3 is a reset time, and Td3 is a rate time. Note that as a measure against integration windup, the PID control computation unit 50 performs manipulated variable upper/lower limit processing as follows. If the calculated manipulated variable MV3 is smaller than a lower limit value OL3 of the output of the actuator A13, the PID control computation unit 50 sets manipulated variable MV3=OL3. If the calculated manipulated variable MV3 is larger than an upper limit value OH3 of the output of the actuator A13, the PID control computation unit 50 sets manipulated variable MV3=OH3.

The manipulated variable MV1 output unit 43-1 outputs the manipulated variable MV1 calculated by the PID control computation unit 44-1 to the actuator A11 (step S413). The actuator A11 operates to control the first follow-up state quantity on the basis of the manipulated variable MV1.

The manipulated variable MV2 output unit 43-2 outputs the manipulated variable MV2 calculated by the PID control computation unit 44-2 to the actuator A12 (step S414). The actuator A12 operates to control the second follow-up state quantity on the basis of the manipulated variable MV2.

The manipulated variable MV3 output unit 49 outputs the manipulated variable MV3 calculated by the PID control computation unit 50 to the actuator A13 (step S415). The actuator A13 operates to control the reference state quantity on the basis of the manipulated variable MV3.

The above processing in steps S401 to S415 is repeatedly executed in control cycles until the end of control is designated by the operator (YES in step S416).

FIGS. 32A, 33A, 34A, 35A, and 36A show the step responses of the control system when the reference state quantity set point SPm is changed to 30.0 while the follow-up state quantity relative set points ΔSP1m and ΔSP2m are 0. FIGS. 32B, 33B, 34B, 35B, and 36B show the disturbance responses of the control system when disturbances are applied to the system while the system is stabilized with ΔSP1m=0, ΔSP2m=0, and SPm=30.0. Simulation conditions are set as follows.

First of all, the transfer function Gp11 for the block including the actuator A11 and process P11, the transfer function Gp12 for the block including the actuator A12 and process P12, and the transfer function Gp13 for the block including the actuator A13 and process P13 are set according to the following equations.

$$Gp11 = 1.2 \exp(-2.0s)/\{(1+70.0s)(1+10.0s)\} \quad (83)$$

$$Gp12 = 1.6 \exp(-2.0s)/\{(1+60.0s)(1+10.0s)\} \quad (84)$$

$$Gp13 = 2.0 \exp(-2.0s)/\{(1+50.0s)(1+10.0s)\} \quad (85)$$

In addition, the transfer function Gp31 representing the interference between the first control loop and the third control loop and the transfer function Gp32 representing the interference between the second control loop and the third control loop are set as follows:

$$Gp31=0.96 \exp(-2.0s)/\{(1+70.0s)(1+10.0s)\} \quad (86)$$

$$Gp32=1.28 \exp(-2.0s)/\{(1+60.0s)(1+10.0s)\} \quad (87)$$

In accordance with the manipulated variables MV1, MV2, and MV3, the follow-up state quantity measurement values PV1 and PV2 and the reference state quantity measurement value PVm are determined as follows:

$$PV1=Gp1MV1+Gp31MV3 \quad (88)$$

$$PV2=Gp2MV2+Gp32MV3 \quad (89)$$

$$PVm=Gp3MV3 \quad (90)$$

Assume that the proportional band Pb1, reset time Ti1, and rate time Td1 as PID parameters in the PID control computation unit 44-1 are respectively set to 50.0, 35.0 and 20.0, the proportional band Pb2, reset time Ti2, and rate time Td2 as PID parameters in the PID control computation unit 44-2 are respectively set to 66.7, 35.0, and 20.0, and the proportional band Pb3, reset time Ti3, and rate time Td3 as PID parameters in the PID control computation unit 50 are respectively set to 10.0, 35.0, and 20.0.

Figure 32A:
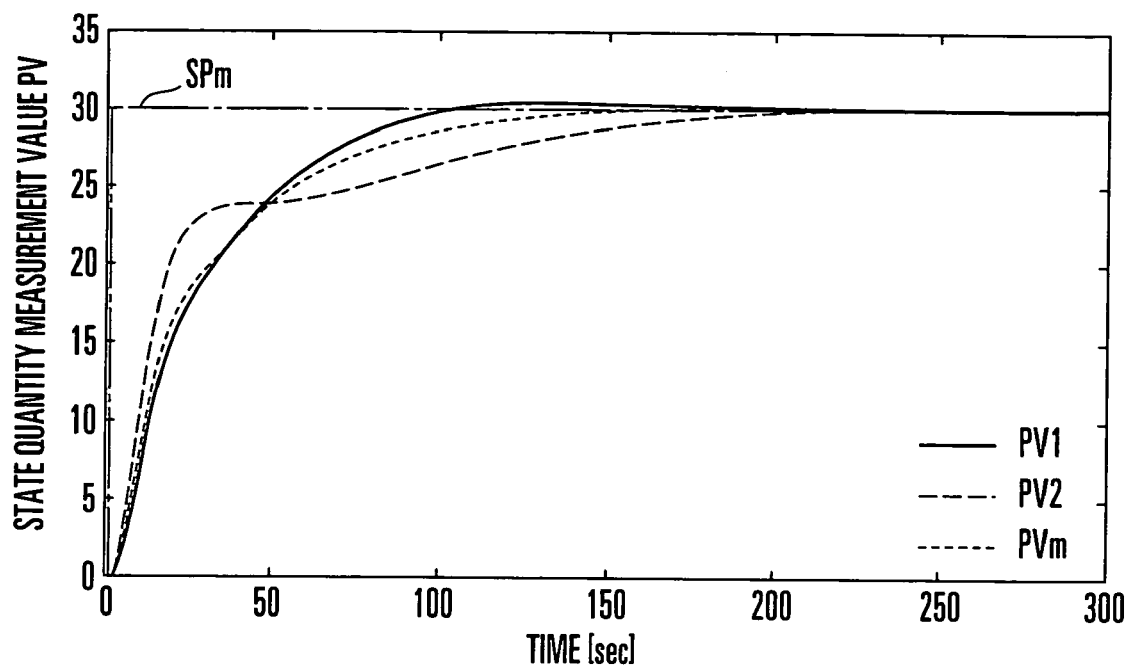
FIG. 32A is a graph showing the step responses of the control systems when reference state quantity set points are changed in the control apparatus according to the fourth embodiment of the present invention.
Figure 32B:
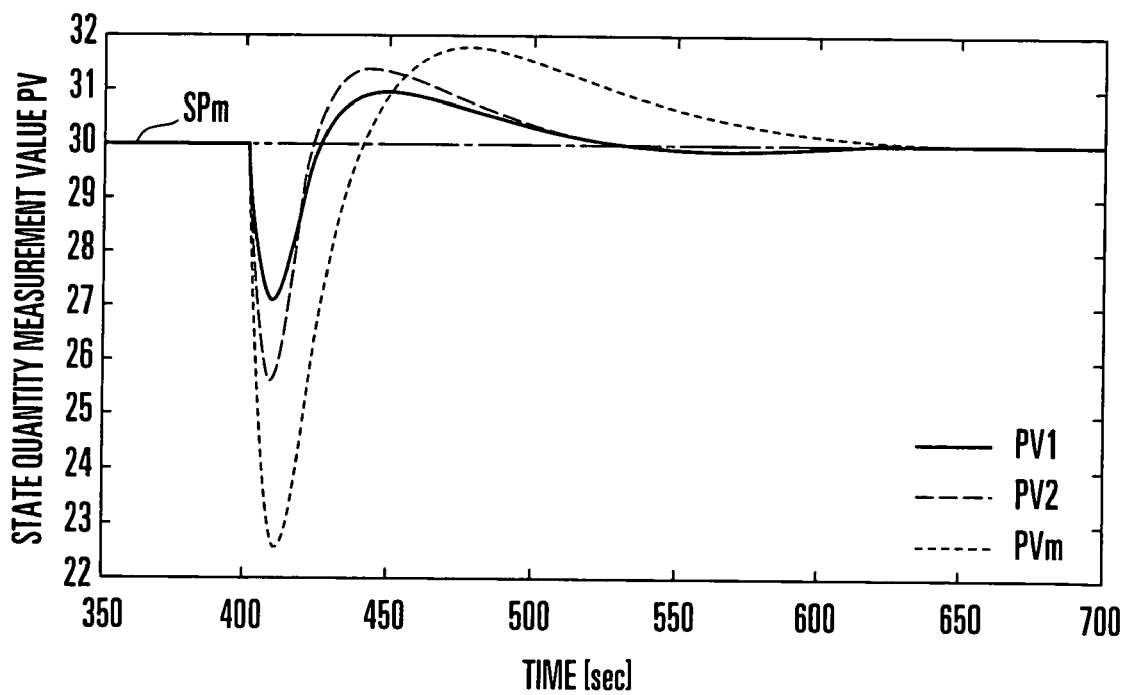
FIG. 32B is a graph showing the disturbance responses of the control systems when disturbances are applied to the control apparatus according to the fourth embodiment of the present invention.

The simulation result shown in FIGS. 32A and 32B is obtained with settings equivalent to general control (Am=1.0, B1=1.0, and B2=1.0), and the follow-up state quantity measurement values PV1 and PV2 and the reference state quantity measurement value PVm do not coincide with each other because the relative state quantities (state quantity differences) are not controlled.

Figure 33A:
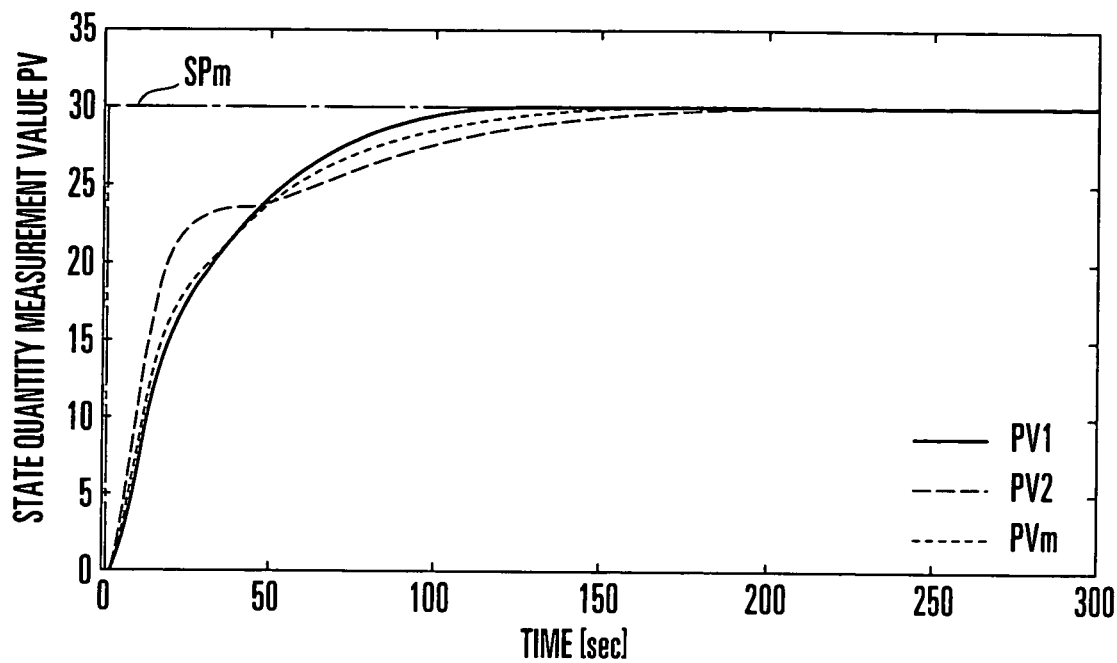
FIG. 33A is a graph showing the step responses of the control systems when reference state quantity set points are changed in the control apparatus according to the fourth embodiment of the present invention.
Figure 33B:
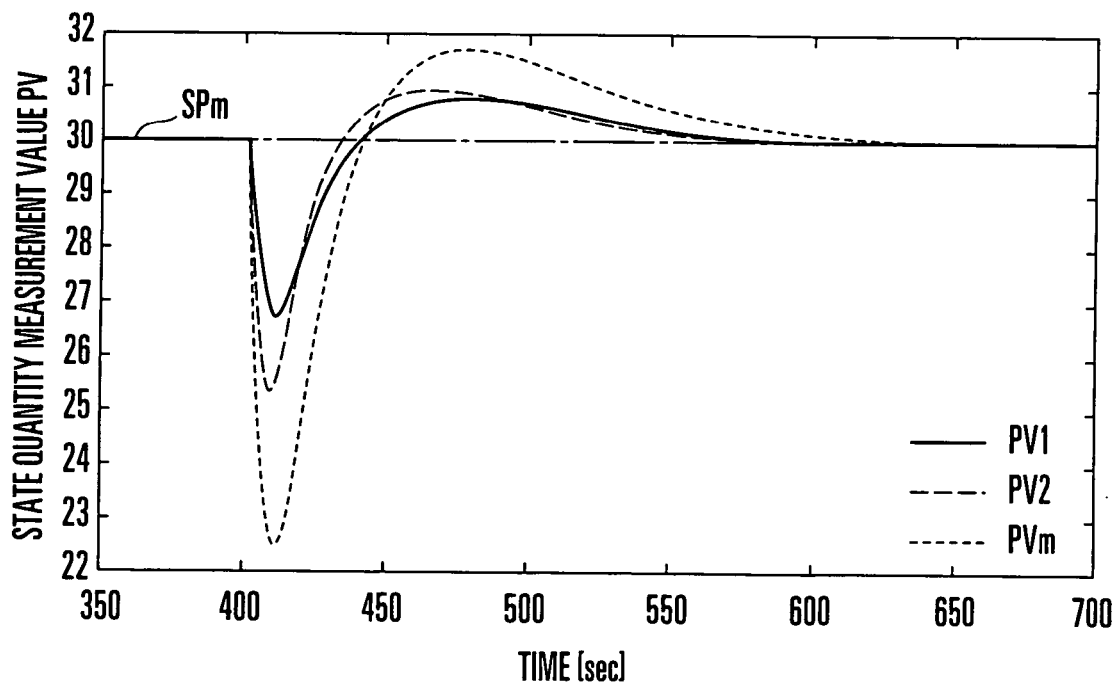
FIG. 33B is a graph showing the disturbance responses of the control systems when disturbances are applied to the control apparatus according to the fourth embodiment of the present invention.

The simulation result shown in FIGS. 33A and 33B is obtained with settings that allow to moderately obtain the effect of this embodiment (Am=1.0, B1=1.5, and B2=1.5), and the follow-up state quantity measurement values PV1 and PV2 and the reference state quantity measurement value PVm coincide with each other compared with the case shown in FIGS. 32A and 32B because the relative state quantities (state quantity differences) are controlled to some extent.

Figure 34A:
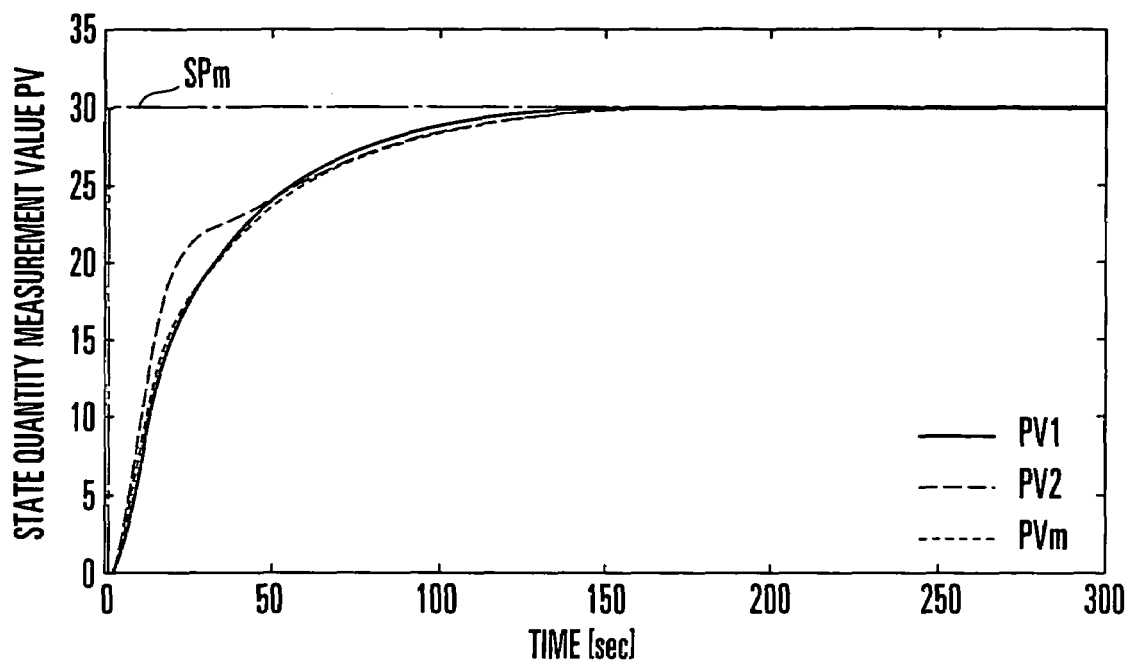
FIG. 34A is a graph showing the step responses of the control systems when reference state quantity set points are changed in the control apparatus according to the fourth embodiment of the present invention.
Figure 34B:
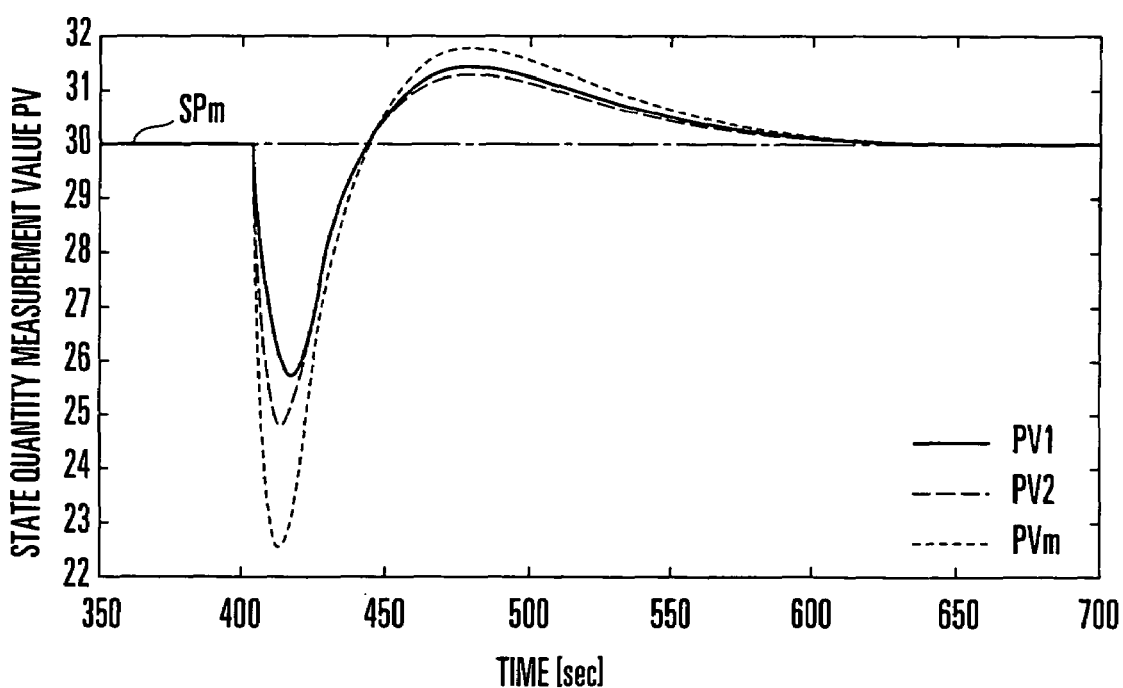
FIG. 34B is a graph showing the disturbance responses of the control systems when disturbances are applied to the control apparatus according to the fourth embodiment of the present invention.

The simulation result shown in FIGS. 34A and 34B is obtained with settings that allow to noticeably obtain the effect of this embodiment (Am=1.0, B1=3.0, and B2=3.0), and the follow-up state quantity measurement values PV1 and PV2 and the reference state quantity measurement value PVm noticeably coincide with each other compared with the case shown in FIGS. 32A and 32B because the relative state quantities (state quantity differences) are sufficiently controlled.

Figure 35A:
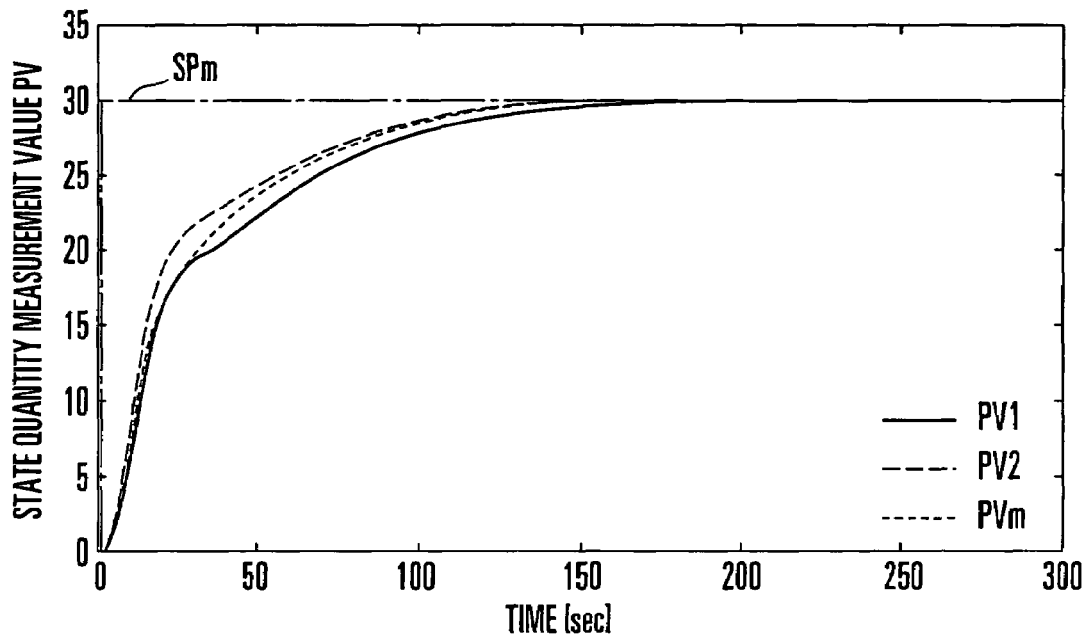
FIG. 35A is a graph showing the step responses of the control systems when reference state quantity set points are changed in the control apparatus according to the fourth embodiment of the present invention.
Figure 35B:
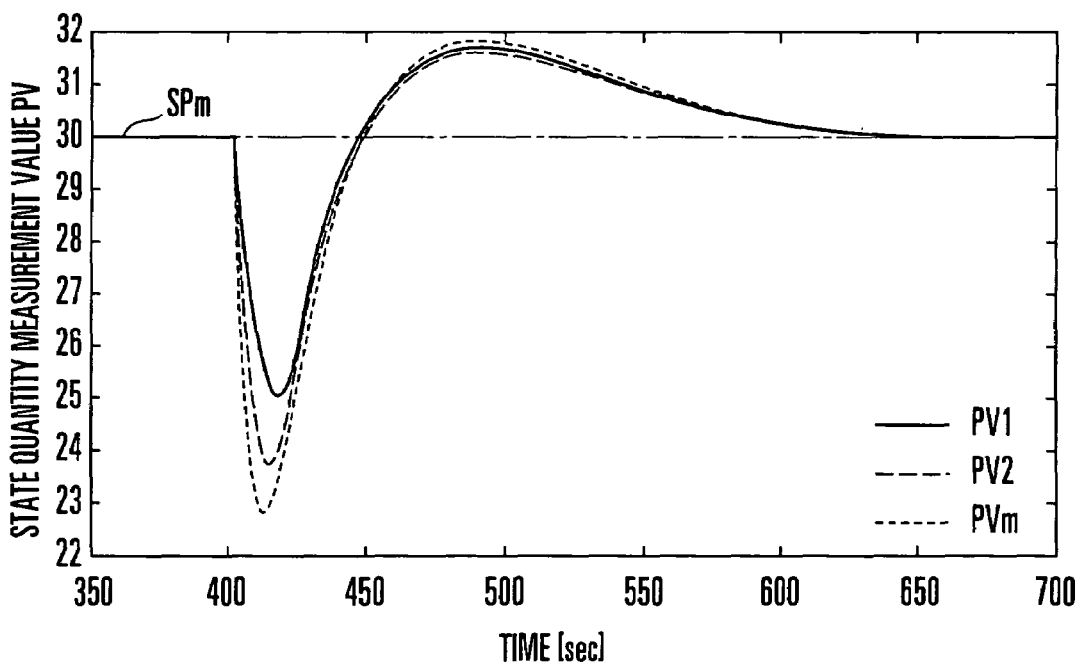
FIG. 35B is a graph showing the disturbance responses of the control systems when disturbances are applied to the control apparatus according to the fourth embodiment of the present invention.

The simulation result shown in FIGS. 35A and 35B is obtained with settings that result in the excessive effect of this embodiment (Am=1.0, B1=4.0, and B2=4.0), and the follow-up state quantity measurement values PV1 and PV2 and the reference state quantity measurement value PVm do not coincide with each other compared with the case shown in FIGS. 34A and 34B because control becomes unstable at the time of step response.

Figure 36A:
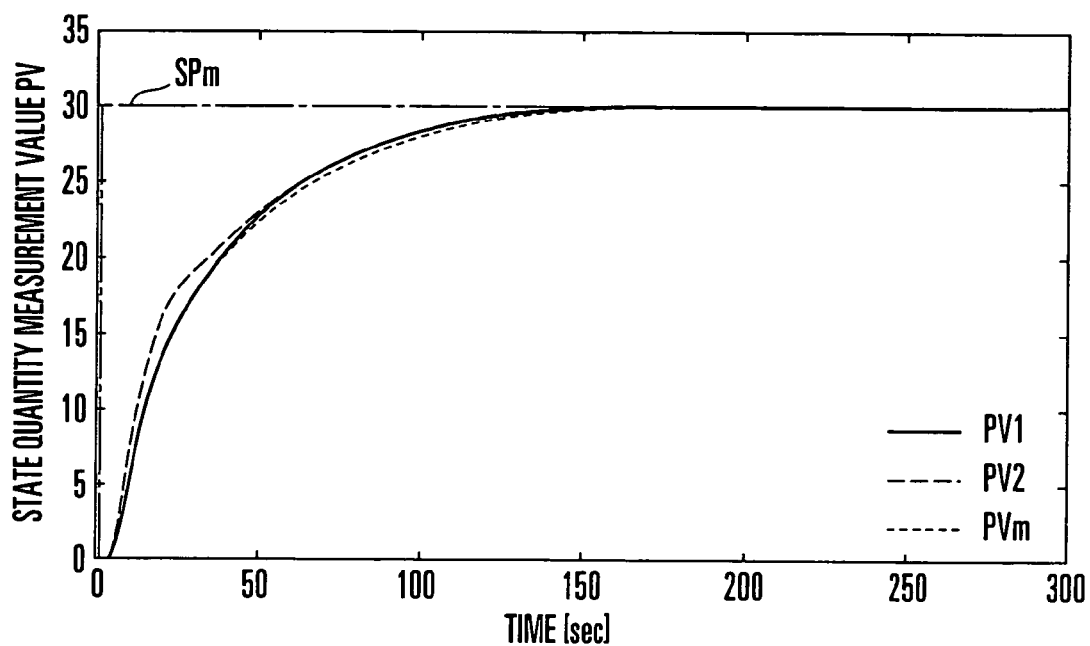
FIG. 36A is a graph showing the step responses of the control systems when reference state quantity set points are changed in the control apparatus according to the fourth embodiment of the present invention.
Figure 36B:
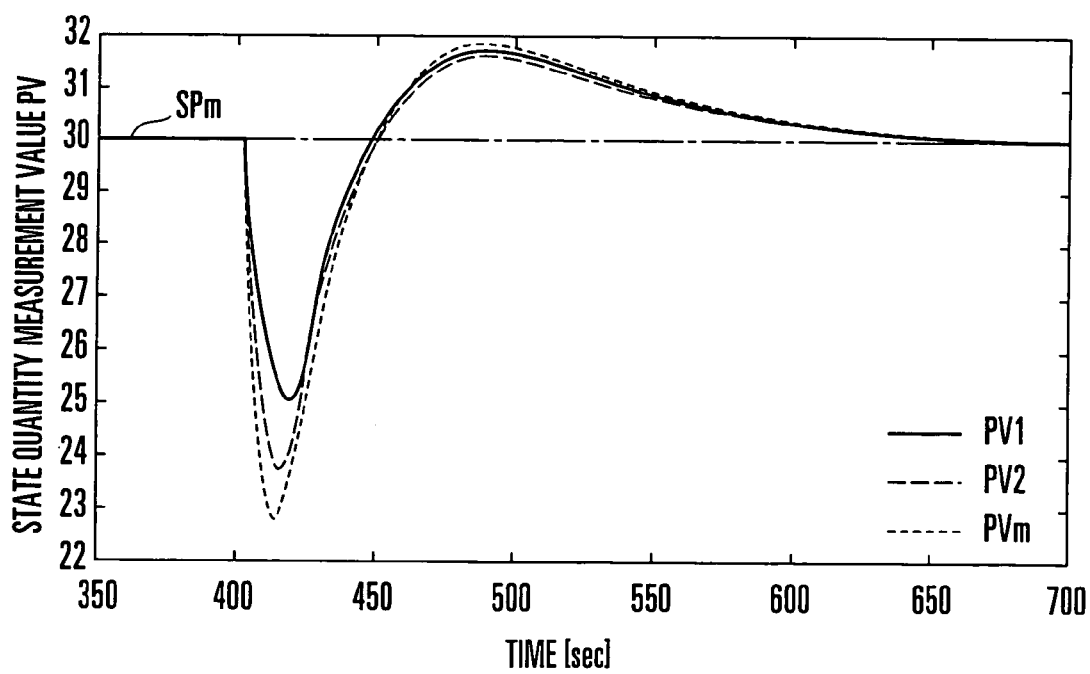
FIG. 36B is a graph showing the disturbance responses of the control systems when disturbances are applied to the control apparatus according to the fourth embodiment of the present invention.

The simulation result shown in FIGS. 36A and 36B is obtained with settings that avoid the excessive effect of this embodiment (Am=0.7, B1=4.0, and B2=4.0), and the follow-up state quantity measurement values PV1 and PV2 and the reference state quantity measurement value PVm further coincide with each other compared with the case shown in FIGS. 34A and 34B because the reference state quantity is shifted to the low-sensitivity side.

In the simulation results shown in FIGS. 32A and 32B to FIGS. 36A and 36B, setting $\Delta SP1m=\Delta SP2m=0.0$ makes all the state quantity differences between the first follow-up state quantity and the reference state quantity and between the second follow-up state quantity and the reference state quantity become 0.

If $\Delta SP1m$ and $\Delta SP2m$ are set to values other than 0, the state quantity measurement values PV1, PV2, PVm change to keep the differences between the state quantity measurement values PV1, PV2, and PVm constant in accordance with these settings. If, for example, $\Delta SP1m=20.0$, and $\Delta SP2m=10.0$ are set, step responses and disturbance suppressing responses are performed to maintain state quantity difference PV1−PVm=20.0 and state quantity difference PV2−PVm=10.0.

According to this embodiment, the same effects as those in the third embodiment can be obtained. In addition, as is obvious from the simulation results in FIGS. 32A and 32B to FIGS. 36A and 36B, the present invention can be effectively applied to even a control system subjected to inter-loop interference.

Principles of Fifth and Sixth Embodiments

In the fifth and sixth embodiments described below, an absolute state quantity serving as a reference such as a state quantity mean value will be referred to as a reference state quantity, and a state quantity controlled to maintain a relative quantity (e.g., a state quantity difference) with respect to a reference state quantity at a specified value will be referred to as a follow-up state quantity. In addition, a set point for a reference state quantity will be referred to as a reference state quantity set point; the measurement value of a reference state quantity, a reference state quantity measurement value; a set point for a follow-up state quantity, a follow-up state quantity set point; the measurement value of a follow-up state quantity, a follow-up state quantity measurement value; a set point for the relative quantity between a reference state quantity and a follow-up state quantity, a follow-up state quantity relative set point; the measurement value of the relative quantity between a reference state quantity and a follow-up state quantity, a follow-up state quantity relative measurement value; the internal deviation set in the controller with respect to a reference state quantity deviation which is the difference between the reference state quantity set point and the reference state quantity measurement value, a reference state quantity internal deviation; and the internal deviation set in the controller with respect to a follow-up state quantity deviation which is the difference between the follow-up state quantity set point and the follow-up state quantity measurement value, a follow-up state quantity internal deviation. A state quantity includes, for example, a temperature, pressure, or flow rate.

In the fifth and sixth embodiments, a manipulated variable MV is calculated by using an internal deviation Er' calculated in the controller independently of a deviation Er=SP−PV between an externally supplied state quantity set point SP and a state quantity measurement value PV. At this time, the internal deviation Er' is separated into an element Erm for a reference state quantity and an element $\Delta$Er for the relative quantity between the reference state quantity and a follow-up state quantity (Er'=Erm+$\Delta$Er). In the fifth and sixth embodiments, a deviation is transformed into the internal deviation Er' which can independently shift the sensitivity for a reference state quantity and the sensitivity for the relative quantity between the reference state quantity and a follow-up state quantity in consideration of the fact that the deviation can substantially shift the characteristics of the controller to the low-sensitivity side or high-sensitivity side by correcting the deviation to a value smaller than an actual value or to a value larger than the actual value.

As described above, in the fifth and sixth embodiments, the internal deviation Er' is separated into the element Erm for a reference state quantity and the element ΔEr for the relative quantity between the reference state quantity and a follow-up state quantity, and the internal deviation Er' is corrected to a value smaller or larger than the actual deviation Er to be used to calculate the manipulated variable MV. With this arrangement, in the fifth and sixth embodiments, the response characteristic is shifted to the low-sensitivity side with respect to a reference state quantity such as a state quantity mean value, and is shifted to a high-sensitivity side with respect to the relative quantity between the reference state quantity and a follow-up state quantity such as a state quantity difference, thereby allowing a follow-up state quantity relative measurement value ΔPV to follow up a follow-up state quantity relative set point ΔSP before a reference state quantity measurement value PVm follows up a reference state quantity set point SPm. This makes it possible to perform control to change the reference state quantity to a desired value while maintaining the relative quantity between the reference state quantity and the follow-up state quantity at a desired value.

According to the arrangements of the fifth and sixth embodiments, the control system in each embodiment differs from a general control system only in that the deviation Er is transformed into the internal deviation Er'. That is, there can be provided a control method which preferentially controls the relative quantity between a reference state quantity and a follow-up state quantity while controlling the reference state quantity in the form in which a manipulated variable from the controller corresponds to an output from an actual actuator on a one-to-one basis.

Of the above two points to be considered, the operation of correcting the deviation Er (to be referred to as the first point to be considered hereinafter) will be described. For example, a PID controller or the like calculates the manipulated variable MV on the basis of deviation Er=SP−PV. For the sake of simple explanation, consider a proportional operation P, of PID operations, in which the manipulated variable MV is calculated in proportion to the deviation Er. As is generally known, as a proportional band Pb decreases, the characteristics of the PID controller shift to the high-sensitivity side on which importance is given to quick response, whereas as the proportional band Pb increases, the characteristics of the PID controller shift to the low-sensitivity side on which importance is given to stability. In this case, PID computation can be conceptually described by using the proportional band Pb as follows:

$$MV=(100/Pb)Er \quad (91)$$

As is obvious from equation (91), correcting the deviation Er to a larger value is equivalent to correcting the proportional band Pb to a smaller value, and vice versa. Obviously, therefore, the characteristics of the controller can be adjusted by just simply correcting the deviation Er before control computation is executed by the controller. The deviation Er can be corrected by being transformed into the internal deviation Er' using a specific coefficient A according to the following equation. Setting the value of the coefficient A to 0<A<1 can decrease the sensitivity for the response characteristic of the controller. Setting A>1 can increase the sensitivity for the response characteristic of the controller.

$$Er'=AEr \quad (92)$$

Of the above two points to be considered, the separation of the internal deviation Er' into an element for a reference state quantity and an element for the relative quantity between the reference state quantity and a follow-up state quantity (to be referred to as the second point to be considered hereinafter) will be described. When a reference state quantity and the relative quantity between the reference state quantity and the follow-up state quantity are to be simultaneously controlled, the deviation Er can be separated into the element Erm for the reference state quantity and the element ΔErm for the relative quantity between the reference state quantity and the follow-up state quantity as follows:

$$Er=Erm+\Delta Erm=(SPm-PVm)+(\Delta SPm-\Delta PVm) \quad (93)$$

where ΔSPm is a follow-up state quantity relative set point, and ΔPVm is a follow-up state quantity relative measurement value. The first and second points to be considered can be summarized as follows according to equations (92) and (93):

$$Er'=A(Erm+\Delta Erm)=AErm+A\Delta Erm \quad (94)$$

In this case, AErm in equation (94) is an element associated with the reference state quantity, and AΔErm is an element associated with the relative quantity between the reference state quantity and the follow-up state quantity. That is, since the two elements are separated as linear binding expressions which independently allow sensitivity adjustment, sensitivity adjustment can be performed by separate coefficients A and B as follows:

$$Er' = AErm + B\Delta Erm \quad (95)$$
$$= A(SPm - PVm) + B(\Delta SPm - \Delta PVm)$$

where A is a coefficient associated with a reference state quantity, and B is a coefficient associated with the relative quantity between the reference state quantity and the follow-up state quantity. When there are a plurality of control loops, the coefficient B associated with the relative quantity between the reference state quantity and the follow-up state quantity is preferably provided for each control loop, in particular. In this case, with respect to the ith (i is 1, 2, 3, . . . ) follow-up state quantity in a plurality of control loops, a deviation Eri may be transformed as follows:

$$Eri' = AmErm + Bi\Delta Erm \quad (96)$$
$$= Am(SPm - PVm) + Bi(\Delta SPim - \Delta PVim)$$

where Eri' is an internal deviation for the ith follow-up state quantity, ΔSPim is a follow-up state quantity relative set point which is a set point for the relative quantity between the reference state quantity and the ith follow-up state quantity, ΔPVim is a follow-up state quantity relative measurement value which is the measurement value of the relative quantity between the reference state quantity and the ith follow-up state quantity, and Bi is a coefficient associated with the relative quantity between the reference state quantity and the ith follow-up state quantity. Note that the coefficient Am associated with the reference state quantity may be independently provided commonly for the respective control loops or may be provided for each control loop.

Obviously, in equation (96), $\Delta SPim=SPi-SPm$ and $\Delta PVim=PVi-PVm$, and the following equivalent substitutions can be made:

$$Eri' = Am(SPm - PVm) + Bi\{\Delta SPim - (PVi - PVm)\} \quad (97)$$

$$Eri' = Am(SPm - PVm) + Bi\{(SPi - SPm) - (PVi - PVm)\} \quad (98)$$

Note that the case wherein the follow-up state quantity relative measurement value $\Delta PVim$ is used differs from the case wherein a difference $PVi-PVm$ between a follow-up state quantity measurement value PVi and the reference state quantity measurement value PVm is used only in processing in the control apparatus. In contrast to this, when the follow-up state quantity set point $\Delta SPim$ is used, an operator sets the reference state quantity set point SPm and follow-up state quantity relative set point $\Delta SPim$ through a user interface. When a difference SPi–SPm between a follow-up state quantity set point SPi and the reference state quantity set point SPm is to be used, the operator sets the reference state quantity set point SPm and follow-up state quantity set point SPi through the user interface. Owing to this difference between the two cases, they are handled as different arrangements.

In addition, equations (97) and (98) can be consolidated to the following equivalent equations:

$$Eri' = (Am - Bi)(SPm - PVm) + Bi(SPi - PVi) \quad (99)$$

$$Eri' = \{(Am - Bi)SPm + BiSPi\} - \{(Am - Bi)PVm + BiPVi\} \quad (100)$$

In addition, regarding $SPi=SPi''+\Delta SPi''$ and $PVi=PVi''+\Delta PVi''$ makes it easy to perform equivalent transformation of equation (98) as follows:

$$Eri' = Am(SPm - PVm) + Bi\{(SPi - SPm) - (PVi - PVm)\} \quad (101)$$
$$= Am(SPm - PVm) + Bi\{(SPi'' + \Delta SPi'' - SPm) -$$
$$(PVi'' + \Delta PVi'' - PVm)\}$$
$$= Am(SPm - PVm) + Bi\{(SPi'' - SPm'') - (PVi'' -$$
$$PVm'')\}$$

where SPi" and $\Delta$SPi" are elements SPi" and $\Delta$SPi" respectively corresponding to absolute and relative quantities when the follow-up state quantity set point SPi is separated into another absolute quantity and another relative quantity, and PVi" and $\Delta$PVi" are elements PVi" and $\Delta$PVi" respectively corresponding to absolute and relative quantities when a follow-up state quantity measurement value PVi is separated into another absolute quantity and another relative quantity. In this case, SPm"=SPm–$\Delta$SPi" and PVm"=PVm–$\Delta$PVi". That is, with regard to an element associated with the relative quantity between a reference state quantity and a follow-up state quantity, substituting SPm" or PVm" for SPm or PVm is equivalent to a linear binding expression as long as the relationship between the two elements is clear, and does not fall outside the ranges of the basic technical ideas of the fifth and sixth embodiments.

According to the above principle, the internal deviation Er' can be obtained, which can separately shift the sensitivity for a reference state quantity and the sensitivity for the relative quantity between a reference state quantity and a follow-up state quantity.

The principle of preferentially controlling the relative quantity between a reference state quantity and a follow-up state quantity will be described next. If the relationship between a coefficient Am associated with a reference state quantity and a coefficient Bi associated with the relative quantity between the reference state quantity and a follow-up state quantity is defined by Am=Bi=1 in equation (98), then Eri'=SPi–PVi. The internal deviation Er' at this point of time has not changed at all from the deviation Er, and the sensitivity has not changed from that in normal control.

In this case, the coefficient Bi associated with the relative quantity between the reference state quantity and the follow-up state quantity is especially important, and especially the sensitivity for the relative quantity between the reference state quantity and the follow-up state quantity improves when Bi>1 is set. This can operate the control apparatus to preferentially control the relative quantity. Therefore, the problem in the present invention can be solved by always setting the coefficient Am associated with the reference state quantity to Am=1, and hence it suffices to perform the following transformation to the internal deviation Er':

$$Eri' = (SPm - PVm) + Bi\{\Delta SPim - (PVi - PVm)\} \quad (102)$$

$$Eri' = (SPm - PVm) + Bi\{(SPi - SPm) - (PVi - PVm)\} \quad (103)$$

$$Eri' = (1 - Bi)(SPm - PVm) + Bi(SPi - PVi)\} \quad (104)$$

$$Eri' = \{(1 - Bi)SPm + BiSPi\} - \{(1 - Bi)PVm + BiPVi\} \quad (105)$$

Note, however, that if only the sensitivity for the relative quantity between a reference state quantity and a follow-up state quantity is improved, the sensitivity may be excessive to make the control system unstable before satisfactory control characteristics for a relative quantity are obtained. In such a case, instability can be eliminated by setting the coefficient Am associated with a reference state quantity to Am<1 instead of returning the coefficient Bi associated with the relative quantity between the reference state quantity and the follow-up state quantity to a small value. This can also avoid the sacrifice of the priority of the relative quantity between a reference state quantity and a follow-up state quantity. It is therefore more preferable to use a transformation expression which allows adjustment of the coefficient Am associated with a reference state quantity.

Fifth Embodiment

Figure 37:
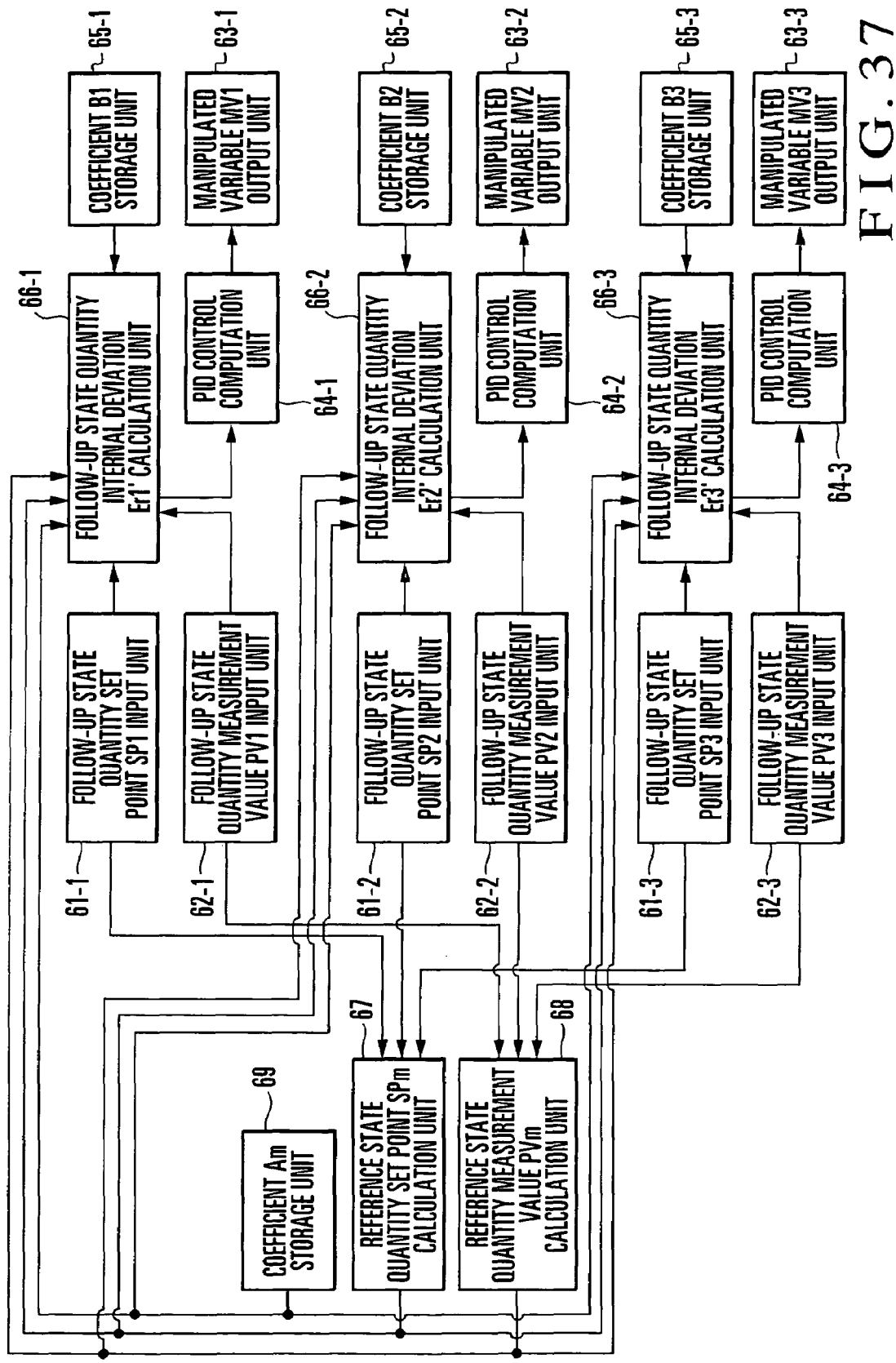
FIG. 37 is a block diagram showing the arrangement of a control apparatus according to the fifth embodiment of the present invention.

The fifth embodiment of the present invention will be described in detail below with reference to the accompanying drawings. FIG. 37 shows the arrangement of a control apparatus according to the fifth embodiment of the present invention. This embodiment exemplifies a case wherein there are three control loops, the state quantity mean value of the three control loops is used as a reference state quantity, and the state quantities of the three control loops are used as follow-up state quantities. However, as long as there are two or more control loops, a similar control system can be formed on a similar principle.

In the control apparatus in FIG. 37, the arrangement of the first control system associated with the first follow-up state quantity comprises a follow-up state quantity set point SP1 input unit 61-1, a follow-up state quantity measurement value PV1 input unit 62-1, a manipulated variable MV1 output unit 63-1, a PID control computation unit (PID controller) 64-1, a coefficient B1 storage unit 65-1, and a follow-up state quantity internal deviation Er1' calculation unit 66-1 serving as an internal input value calculation unit. In the control apparatus in FIG. 37, the arrangement of the second control system associated with the second follow-up state quantity comprises a follow-up state quantity set point SP2 input unit 61-2, a follow-up state quantity measurement value PV2 input unit 62-2, a manipulated variable MV2 output unit 63-2, a PID control computation unit 64-2, a coefficient B2 storage unit 65-2, and a follow-up state quantity internal deviation Er 2' calculation unit 66-2 serving as an internal input value calculation unit. In the control apparatus in FIG. 37, the arrangement of the third control system associated with the third follow-up state quantity comprises a follow-up state quantity set point SP3 input unit 61-3, a follow-up state quantity measurement value PV3 input unit 62-3, a manipulated variable MV3 output unit 63-3, a PID control computation unit 64-3, a coefficient B3 storage unit 65-3, and a follow-up state quantity internal deviation Er3' calculation unit 66-3 serving as an internal input value calculation unit.

In addition, in the control apparatus in FIG. 37, an arrangement associated with the reference state quantity comprises a reference state quantity set point SPm calculation unit 67 which calculates the mean value of a follow-up state quantity set point SP1, follow-up state quantity set point SP2, and follow-up state quantity set point SP3 as a reference state quantity set point SPm, a reference state quantity measurement value PVm calculation unit 68 which calculates the mean value of a follow-up state quantity measurement value PV1, follow-up state quantity measurement value PV2, and follow-up state quantity measurement value PV3 as a reference state quantity measurement value PVm, and a coefficient Am storage unit 69.

FIG. 38 shows a control system in this embodiment. Referring to FIG. 38, reference symbol Er1' denotes the first follow-up state quantity internal deviation; Er2', the second follow-up state quantity internal deviation; Er3', the third follow-up state quantity internal deviation; Am, a coefficient associated with the reference state quantity; B1, a coefficient associated with the state quantity difference between the first follow-up state quantity and the reference state quantity; B2, a coefficient associated with the state quantity difference between the second follow-up state quantity and the reference state quantity; B3, a coefficient associated with the state quantity difference between the third follow-up state quantity and the reference state quantity; A1, an actuator which controls the first follow-up state quantity; A2, an actuator which controls the second follow-up state quantity; A3, an actuator which controls the third follow-up state quantity; P1, a controlled system process associated with the first follow-up state quantity; P2, a controlled system process associated with the second follow-up state quantity; P3, a controlled system process associated with the third follow-up state quantity; Gp1, a transfer function for a block including the actuator A1 and process P1; Gp2, a transfer function for a block including the actuator A2 and process P2; and Gp3, a transfer function for a block including the actuator A3 and process P3.

The follow-up state quantity set point SP1 input unit 61-1, follow-up state quantity measurement value PV1 input unit 62-1, manipulated variable MV1 output unit 63-1, PID control computation unit 64-1, follow-up state quantity internal deviation Er1' calculation unit 66-1, actuator A1, and process P1 constitute the first control system (first control loop). The follow-up state quantity set point SP2 input unit 61-2, follow-up state quantity measurement value PV2 input unit 62-2, manipulated variable MV2 output unit 63-2, PID control computation unit 64-2, follow-up state quantity internal deviation Er2' calculation unit 66-2, actuator A2, and process P2 constitute the second control system (second control loop). The follow-up state quantity set point SP3 input unit 61-3, follow-up state quantity measurement value PV3 input unit 62-3, manipulated variable MV3 output unit 63-3, PID control computation unit 64-3, follow-up state quantity internal deviation Er3' calculation unit 66-3, actuator A3, and process P3 constitute the third control system (third control loop).

Figure 39:
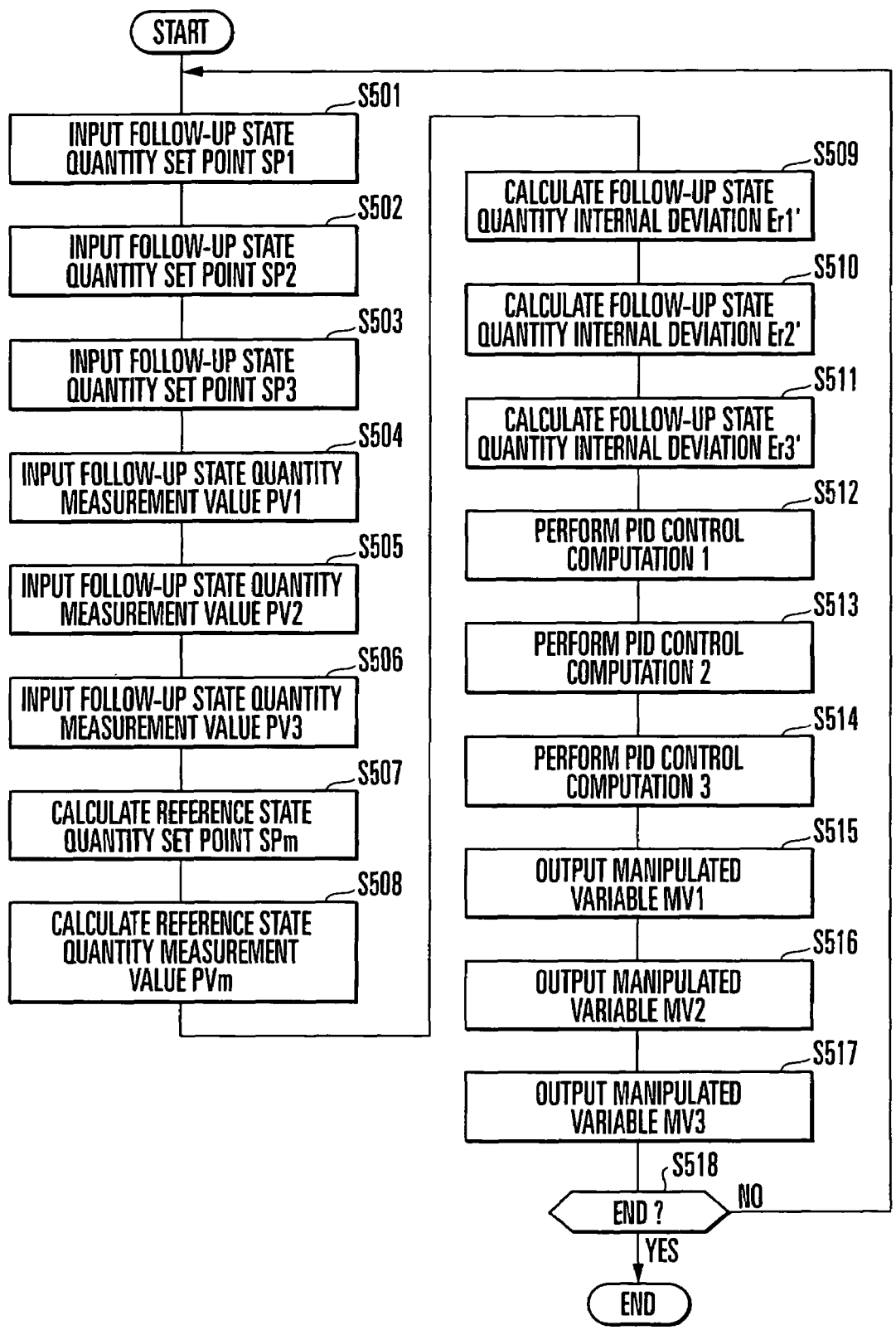
FIG. 39 is a flowchart showing the operation of the control apparatus according to the fifth embodiment of the present invention.

The operation of the control apparatus according to this embodiment will be described next with reference to FIG. 39. First of all, the follow-up state quantity set point SP1 is set by the operator of the control apparatus and input to the follow-up state quantity internal deviation Er1' calculation unit 66-1 and reference state quantity set point SPm calculation unit 67 through the follow-up state quantity set point SP1 input unit 61-1 (step S501 in FIG. 39). The follow-up state quantity set point SP2 is set by the operator and input to the follow-up state quantity internal deviation Er2' calculation unit 66-2 and reference state quantity set point SPm calculation unit 67 through the follow-up state quantity set point SP2 input unit 61-2 (step S502). The follow-up state quantity set point SP3 is set by the operator and input to the follow-up state quantity internal deviation Er3' calculation unit 66-3 and reference state quantity set point SPm calculation unit 67 through the follow-up state quantity set point SP3 input unit 61-3 (step S503).

The follow-up state quantity measurement value PV1 is detected by the first detection means (not shown) and input to the follow-up state quantity internal deviation Er1' calculation unit 66-1 and reference state quantity measurement value PVm calculation unit 68 through the follow-up state quantity measurement value PV1 input unit 62-1 (step S504). The follow-up state quantity measurement value PV2 is detected by the second detection means (not shown) and input to the follow-up state quantity internal deviation Er2' calculation unit 66-2 and reference state quantity measurement value PVm calculation unit 68 through the follow-up state quantity measurement value PV2 input unit 62-2 (step S505). The follow-up state quantity measurement value PV3 is detected by the third detection means (not shown) and input to the follow-up state quantity internal deviation Er3' calculation unit 66-3 and reference state quantity measurement value PVm calculation unit 68 through the follow-up state quantity measurement value PV3 input unit 62-3 (step S506).

Subsequently, the reference state quantity set point SPm calculation unit 67 calculates the mean value of the follow-up state quantity set point SP1, follow-up state quantity set point SP2, and follow-up state quantity set point SP3 as the reference state quantity set point SPm according to the following equation, and outputs the reference state quantity set point SPm to the follow-up state quantity internal deviation Er1' calculation unit 66-1, follow-up state quantity internal deviation Er2' calculation unit 66-2, and follow-up state quantity internal deviation Er3' calculation unit 66-3 (step S507).

$$SPm=(SP1+SP2+SP3)/3 \tag{106}$$

The reference state quantity measurement value PVm calculation unit 68 calculates the mean value of the follow-up state quantity measurement value PV1, follow-up state quantity measurement value PV2, and follow-up state quantity measurement value PV3 as the reference state quantity measurement value PVm according to the following equation, and outputs the reference state quantity measurement value PVm to the follow-up state quantity internal deviation Er1' calculation unit 66-1, follow-up state quantity internal deviation Er2' calculation unit 66-2, and follow-up state quantity internal deviation Er3' calculation unit 66-3 (step S508).

$$PVm=(PV1+PV2+PV3)/3 \qquad (107)$$

The coefficient Am storage unit 69 stores the coefficient Am associated with a reference state quantity in advance, and the coefficient B1 storage unit 65-1 stores the coefficient B1 associated with the state quantity difference between the first follow-up state quantity and the reference state quantity in advance. The follow-up state quantity internal deviation Er1' calculation unit 66-1 calculates the follow-up state quantity internal deviation Er1' on the basis of the coefficients Am and B1, the reference state quantity set point SPm, the reference state quantity measurement value PVm, the follow-up state quantity set point SP1, and the follow-up state quantity measurement value PV1 according to the following equation (step S509).

$$Er1' = Am(SPm - PVm) + B1\{(SP1 - SPm) - (PV1 - PVm)\} \qquad (108)$$

The coefficient B2 storage unit 65-2 stores the coefficient B2 associated with the state quantity difference between the second follow-up state quantity and the reference state quantity in advance. The follow-up state quantity internal deviation Er2' calculation unit 66-2 calculates the follow-up state quantity internal deviation Er2' on the basis of the coefficients Am and B2, the reference state quantity set point SPm, the reference state quantity measurement value PVm, the follow-up state quantity set point SP2, and the follow-up state quantity measurement value PV2 according to the following equation (step S510).

$$Er2' = Am(SPm - PVm) + B2\{(SP2 - SPm) - (PV2 - PVm)\} \qquad (109)$$

The coefficient B3 storage unit 65-3 stores the coefficient B3 associated with the state quantity difference between the third follow-up state quantity and the reference state quantity in advance. The follow-up state quantity internal deviation Er3' calculation unit 66-3 calculates the follow-up state quantity internal deviation Er3' on the basis of the coefficients Am and B3, the reference state quantity set point SPm, the reference state quantity measurement value PVm, the follow-up state quantity set point SP3, and the follow-up state quantity measurement value PV3 according to the following equation (step S511).

$$Er3' = Am(SPm - PVm) + B3\{(SP3 - SPm) - (PV3 - PVm)\} \qquad (110)$$

The PID control computation unit 64-1 calculates a manipulated variable MV1 by performing PID control computation represented by the following transfer function equation (step S512).

$$MV1=(100/Pb1)\{1+(1/Ti1s)+Td1s\}Er1' \qquad (111)$$

where Pb1 is a proportional band, Ti1 is a reset time, Td1 is a rate time, and s is a Laplace operator. Note that as a measure against integration windup, the PID control computation unit 64-1 performs manipulated variable upper/lower limit processing as follows. If the calculated manipulated variable MV1 is smaller than a lower limit value OL1 of the output of the actuator A1, the PID control computation unit 64-1 sets manipulated variable MV1=OL1. If the calculated manipulated variable MV1 is larger than an upper limit value OH1 of the output of the actuator A1, the PID control computation unit 64-1 sets manipulated variable MV1=OH1.

The PID control computation unit 64-2 calculates a manipulated variable MV2 by performing PID control computation represented by the following transfer function equation (step S513).

$$MV2=(100/Pb2)\{1+(1/Ti2s)+Td2s\}Er2' \qquad (112)$$

where Pb2 is a proportional band, Ti2 is a reset time, and Td2 is a rate time. Note that as a measure against integration windup, the PID control computation unit 64-2 performs manipulated variable upper/lower limit processing as follows. If the calculated manipulated variable MV2 is smaller than a lower limit value OL2 of the output of the actuator A2, the PID control computation unit 64-2 sets manipulated variable MV2=OL2. If the calculated manipulated variable MV2 is larger than an upper limit value OH2 of the output of the actuator A2, the PID control computation unit 64-2 sets manipulated variable MV2=OH2.

The PID control computation unit 64-3 calculates a manipulated variable MV3 by performing PID control computation represented by the following transfer function equation (step S514).

$$MV3=(100/Pb3)\{1+(1/Ti3s)+Td3s\}Er3' \qquad (113)$$

where Pb3 is a proportional band, Ti3 is a reset time, and Td3 is a rate time. Note that as a measure against integration windup, the PID control computation unit 64-3 performs manipulated variable upper/lower limit processing as follows. If the calculated manipulated variable MV3 is smaller than a lower limit value OL3 of the output of the actuator A3, the PID control computation unit 64-3 sets manipulated variable MV3=OL3. If the calculated manipulated variable MV3 is larger than an upper limit value OH3 of the output of the actuator A3, the PID control computation unit 64-3 sets manipulated variable MV3=OH3.

The manipulated variable MV1 output unit 63-1 outputs the manipulated variable MV1 calculated by the PID control computation unit 64-1 to the actuator A1 (step S515). The actuator A1 operates to control the first follow-up state quantity on the basis of the manipulated variable MV1.

The manipulated variable MV2 output unit 63-2 outputs the manipulated variable MV2 calculated by the PID control computation unit 64-2 to the actuator A2 (step S516). The actuator A2 operates to control the second follow-up state quantity on the basis of the manipulated variable MV2.

The manipulated variable MV3 output unit 63-3 outputs the manipulated variable MV3 calculated by the PID control computation unit 64-3 to the actuator A3 (step S517). The actuator A3 operates to control the third follow-up state quantity on the basis of the manipulated variable MV3.

The above processing in steps S501 to S517 is repeatedly executed in control cycles until the end of control is designated by the operator (YES in step S518).

FIGS. 40A, 41A, 42A, 43A, and 44A show the step responses of the control system when the follow-up state quantity set points SP1, SP2, and SP3 are changed to 30.0. FIGS. 40B, 41B, 42B, 43B, and 44B show the disturbance responses of the control system when disturbances are applied to the system while the system is stabilized with SP1=30.0, SP2=30.0, and SP3=30.0. Simulation conditions are set as follows.

First of all, the transfer function Gp1 for the block including the actuator A1 and process P1, the transfer function Gp2 for the block including the actuator A2 and process P2, and the transfer function Gp3 for the block including the actuator A3 and process P3 are set according to the following equations. Assume that there is no interference between the control loops.

$$Gp1 = 1.2 \exp(-2.0s)/\{(1+70.0s)(1+10.0s)\} \quad (114)$$

$$Gp2 = 1.6 \exp(-2.0s)/\{(1+60.0s)(1+10.0s)\} \quad (115)$$

$$Gp3 = 2.0 \exp(-2.0s)/\{(1+50.0s)(1+10.0s)\} \quad (116)$$

In accordance with the manipulated variables MV1, MV2, and MV3, the follow-up state quantity measurement values PV1, PV2 and PV3 are determined as follows:

$$PV1 = Gp1 MV1 \quad (117)$$

$$PV2 = Gp2 MV2 \quad (118)$$

$$PV3 = Gp3 MV3 \quad (119)$$

Assume that the proportional band Pb1, reset time Ti1, and rate time Td1 as PID parameters in the PID control computation unit 64-1 are respectively set to 50.0, 35.0 and 20.0, the proportional band Pb2, reset time Ti2, and rate time Td2 as PID parameters in the PID control computation unit 64-2 are respectively set to 66.7, 35.0, and 20.0, and the proportional band Pb3, reset time Ti3, and rate time Td3 as PID parameters in the PID control computation unit 64-3 are respectively set to 100.0, 35.0, and 20.0.

Figure 40A:
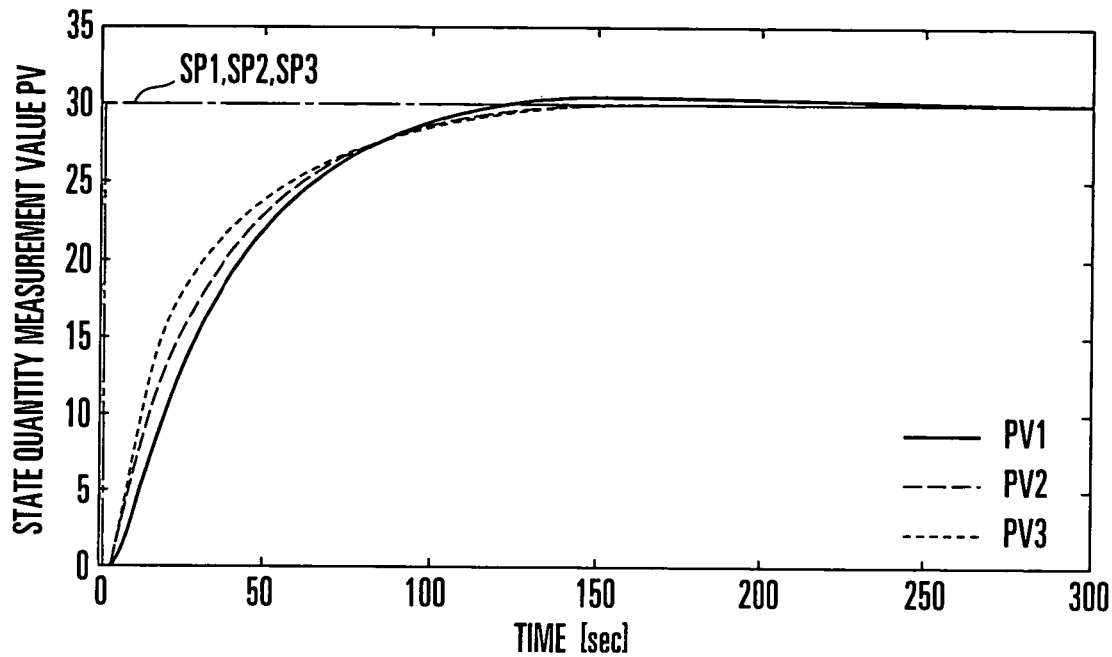
FIG. 40A is a graph showing the step responses of the control systems when follow-up state quantity set points are changed in the control apparatus according to the fifth embodiment of the present invention.
Figure 40B:
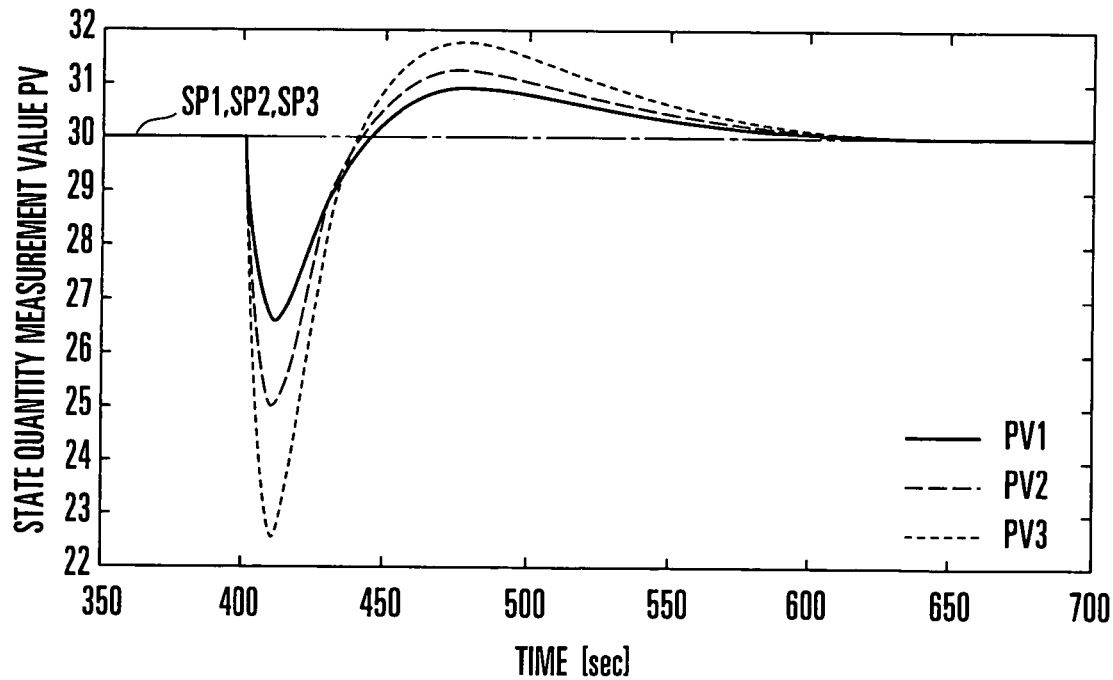
FIG. 40B is a graph showing the disturbance responses of the control systems when disturbances are applied to the control apparatus according to the fifth embodiment of the present invention.

The simulation result shown in FIGS. 40A and 40B is obtained with settings equivalent to general control (Am=1.0, B1=1.0, B2=1.0, and B3=1.0), and the follow-up state quantity measurement values PV1, PV2, and PV3 do not coincide with each other because the relative state quantities (state quantity differences) are not controlled.

Figure 41A:
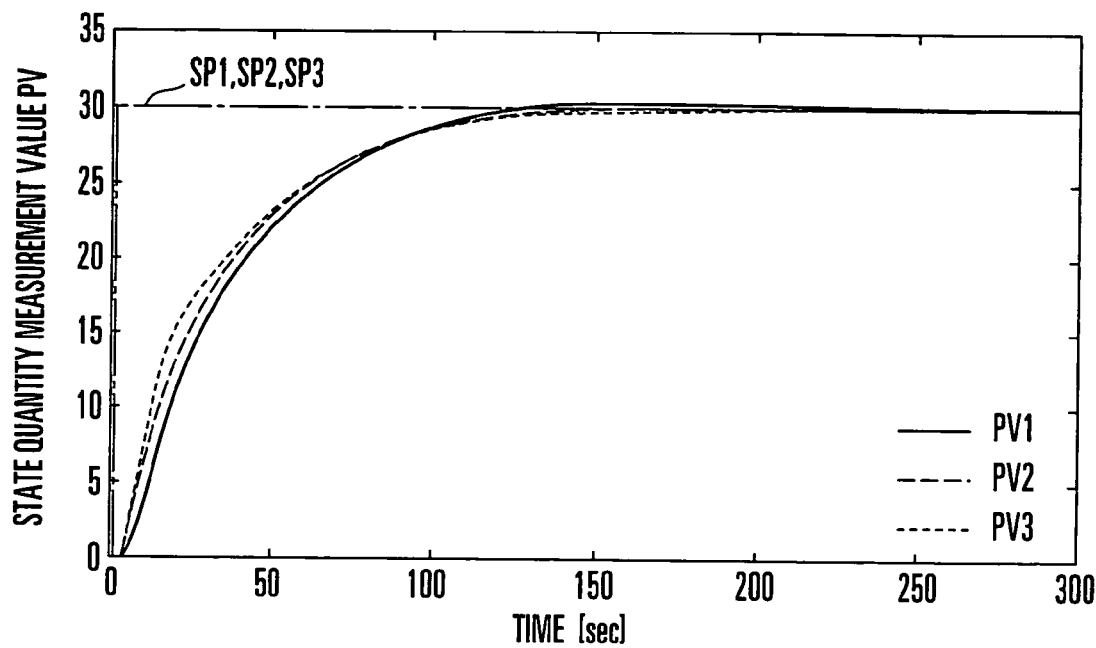
FIG. 41A is a graph showing the step responses of the control systems when follow-up state quantity set points are changed in the control apparatus according to the fifth embodiment of the present invention.
Figure 41B:
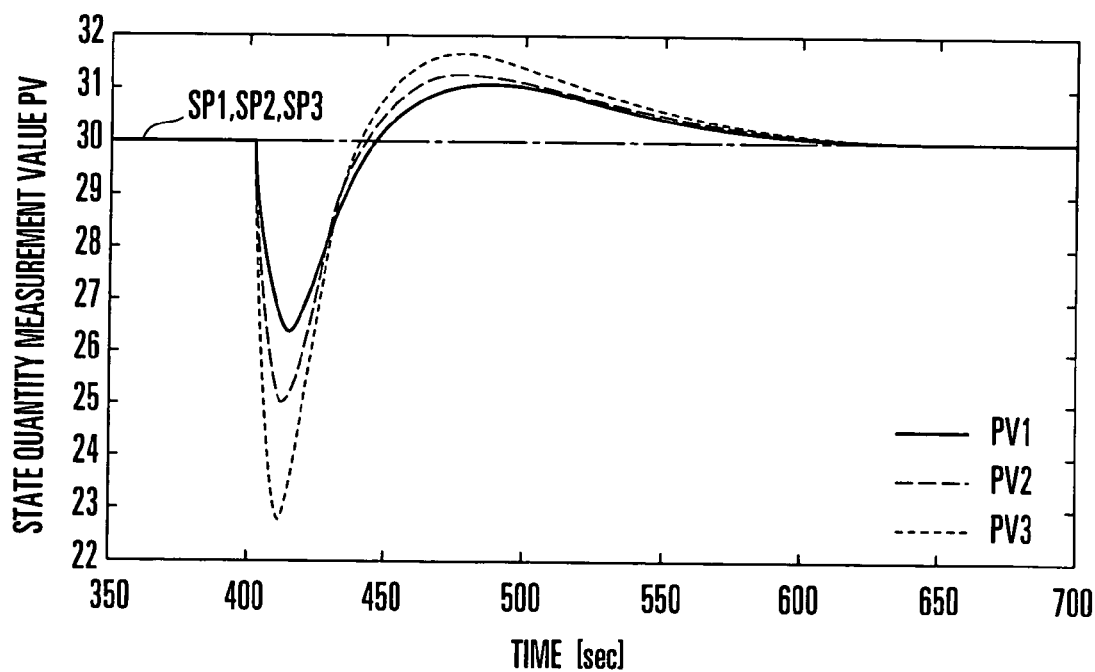
FIG. 41B is a graph showing the disturbance responses of the control systems when disturbances are applied to the control apparatus according to the fifth embodiment of the present invention.

The simulation result shown in FIGS. 41A and 41B is obtained with settings that allow to moderately obtain the effect of this embodiment (Am=1.0, B1=1.5, B2=1.5, and B3=1.5), and the follow-up state quantity measurement values PV1, PV2, and PV3 coincide with each other compared with the case shown in FIGS. 40A and 40B because the relative state quantities (state quantity differences) are controlled to some extent.

Figure 42A:
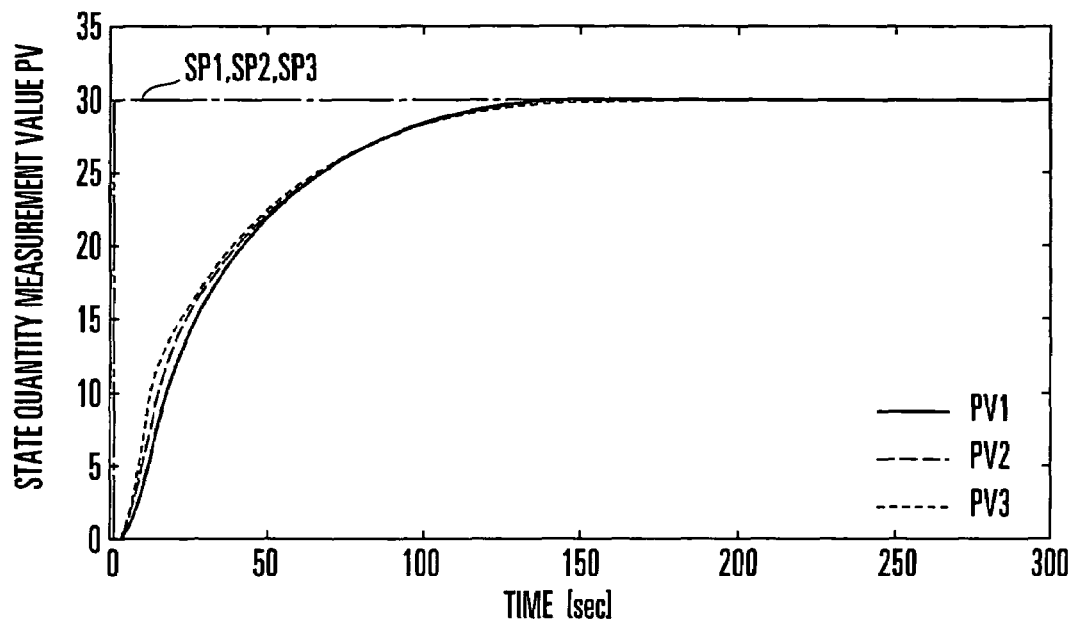
FIG. 42A is a graph showing the step responses of the control systems when follow-up state quantity set points are changed in the control apparatus according to the fifth embodiment of the present invention.
Figure 42B:
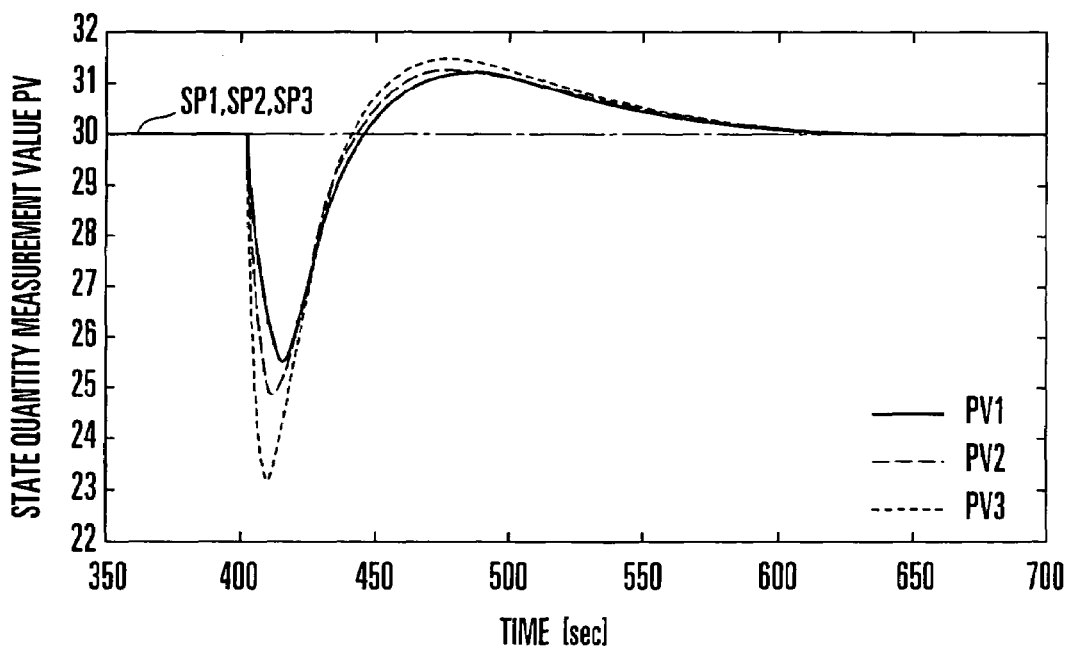
FIG. 42B is a graph showing the disturbance responses of the control systems when disturbances are applied to the control apparatus according to the fifth embodiment of the present invention.

The simulation result shown in FIGS. 42A and 42B is obtained with settings that allow to noticeably obtain the effect of this embodiment (Am=1.0, B1=3.0, B2=3.0, and B3=3.0), and the follow-up state quantity measurement values PV1, PV2, and PV3 noticeably coincide with each other compared with the case shown in FIGS. 40A and 40B because the relative state quantities (state quantity differences) are sufficiently controlled.

Figure 43A:
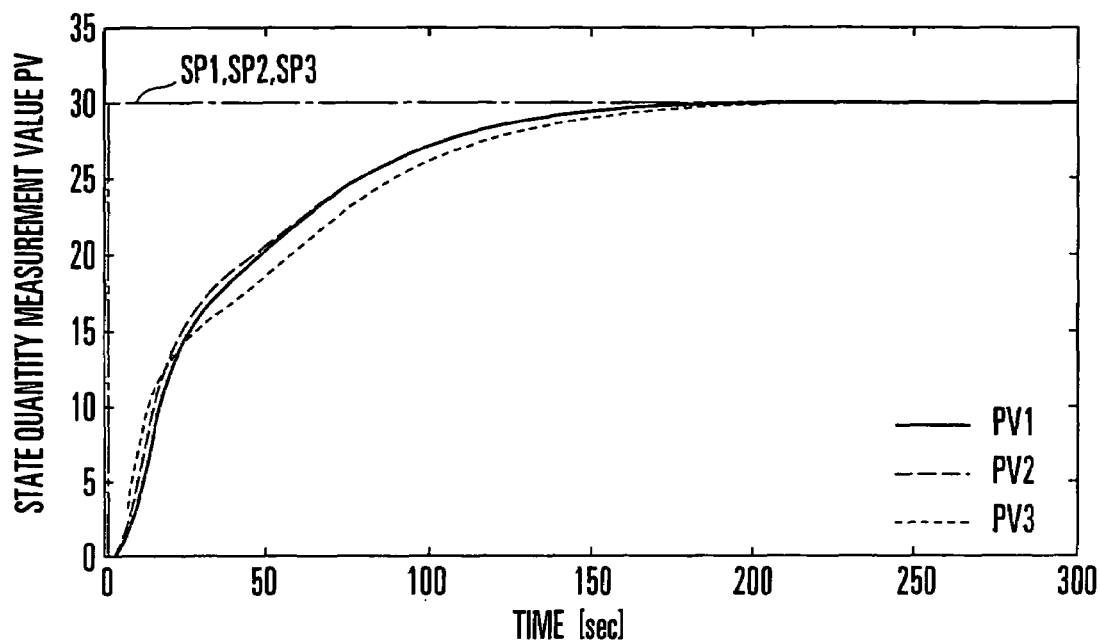
FIG. 43A is a graph showing the step responses of the control systems when follow-up state quantity set points are changed in the control apparatus according to the fifth embodiment of the present invention.
Figure 43B:
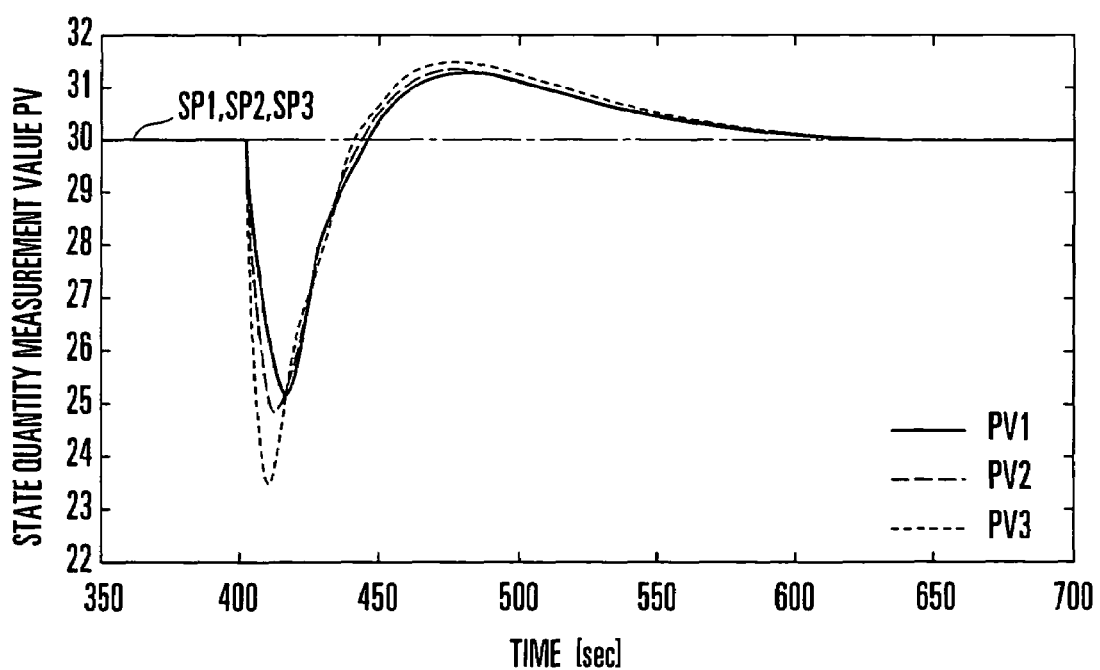
FIG. 43B is a graph showing the disturbance responses of the control systems when disturbances are applied to the control apparatus according to the fifth embodiment of the present invention.

The simulation result shown in FIGS. 43A and 43B is obtained with settings that result in the excessive effect of this embodiment (Am=1.0, B1=4.0, B2=4.0, and B3=4.0), and the follow-up state quantity measurement values PV1, PV2, and PV3 do not coincide with each other compared with the case shown in FIGS. 42A and 42B because control becomes unstable at the time of step response.

Figure 44A:
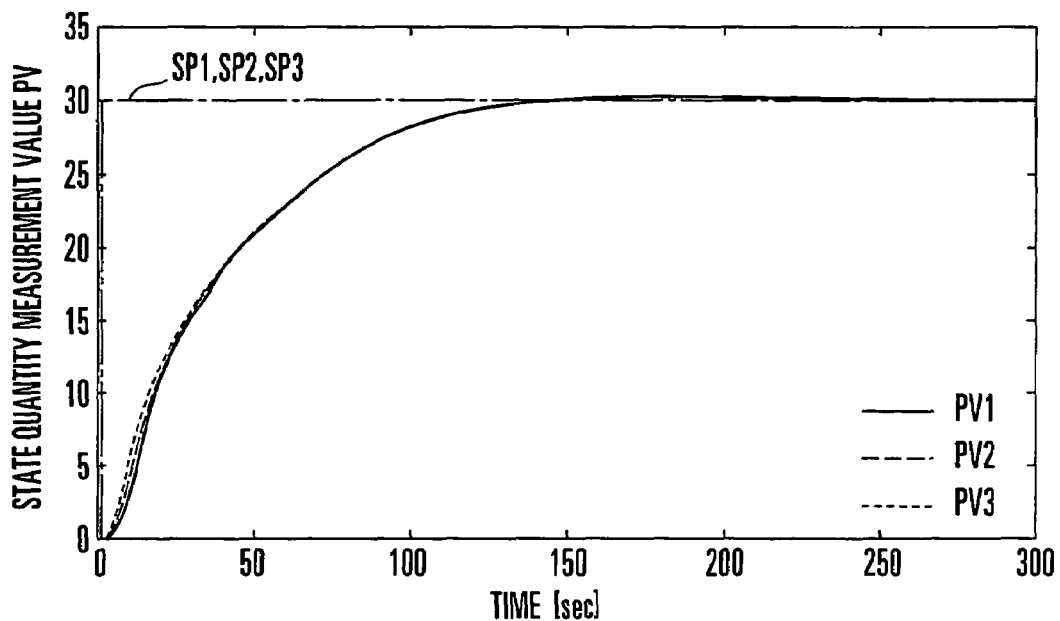
FIG. 44A is a graph showing the step responses of the control systems when follow-up state quantity set points are changed in the control apparatus according to the fifth embodiment of the present invention.
Figure 44B:
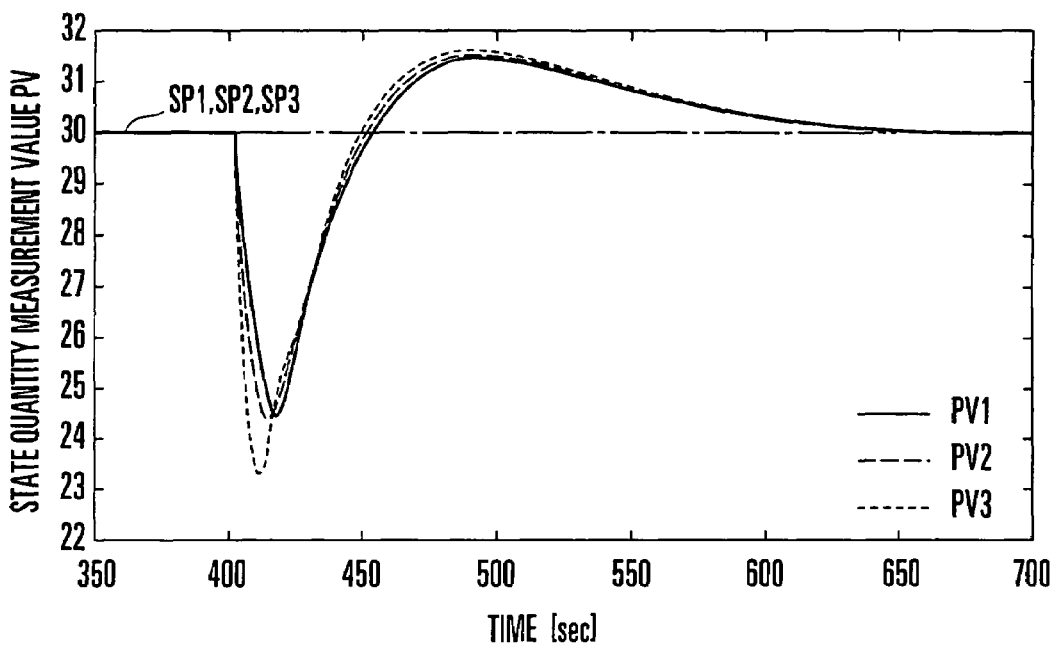
FIG. 44B is a graph showing the disturbance responses of the control systems when disturbances are applied to the control apparatus according to the fifth embodiment of the present invention.

The simulation result shown in FIGS. 44A and 44B is obtained with settings that avoid the excessive effect of this embodiment (Am=0.7, B1=4.0, B2=4.0, and B3=4.0), and the follow-up state quantity measurement values PV1, PV2, and PV3 further coincide with each other compared with the case shown in FIGS. 42A and 42B because the reference state quantity is shifted to the low-sensitivity side.

In the simulation results shown in FIGS. 40A and 40B to FIGS. 44A and 44B, setting SP1=SP2=SP3=30.0 makes all the state quantity differences between the first follow-up state quantity and the second follow-up state quantity, between the second follow-up state quantity and the third follow-up state quantity, and between the third follow-up state quantity and the first follow-up state quantity become 0.

If the follow-up state quantity set points SP1, SP2, and SP3 are set to different values, the state quantity measurement values PV1, PV2, and PV3 change to keep the differences between the state quantity measurement values PV1, PV2, and PV3 constant in accordance with the differences between the state quantity set points SP1, SP2, and SP3. If, for example, SP1=20.0, SP2=30.0, and SP3=40.0 are set, step responses and disturbance suppressing responses are performed to maintain state quantity difference PV3−PV2=10.0, state quantity difference PV2−PV1=10.0, and state quantity difference PV3−PV1=20.0.

According to this embodiment, in a control system having at least two control loops, when a state quantity serving as a specific reference is set as a reference state quantity, and a state quantity which is controlled to maintain a relative quantity with respect to the reference state quantity at a specified value is set as a follow-up state quantity, a calculation sequence is executed, in which a follow-up state quantity deviation Eri calculated on the basis of a plurality of control computation input values input to the controller which controls the follow-up state quantity is transformed into a follow-up state quantity internal deviation Eri' and input to the controller. In this calculation sequence, the follow-up state quantity internal deviation Eri' is calculated as the sum of the first element with respect to the reference state quantity and the second element with respect to the relative quantity. This makes it possible to realize control operation of changing the reference state quantity such as a state quantity mean value to a desired value while maintaining a relative quantity such as the state quantity difference between the reference state quantity and the follow-up state quantity at a desired value. In addition, this embodiment can form a control system in which manipulated variables from the controller correspond to outputs from actual actuators on a one-to-one basis, integration windup can be prevented, and the controller can be adjusted by using a conventionally proposed parameter adjustment method or automatic adjustment function. Furthermore, using the value obtained by multiplying an element for a control computation input value to a relative quantity by the first coefficient as the second element of the follow-up state quantity internal deviation Eri' makes it possible to control the reference state quantity while preferentially controlling the relative quantity.

In addition, using the value obtained by multiplying an element of the control computation input value to the reference state quantity by the second coefficient as the first element of follow-up state quantity internal deviation Eri' makes it possible to avoid control instability due to an increase in the sensitivity of control based on the first coefficient and also avoid the sacrifice of the priority of the relative quantity between the reference state quantity and the follow-up state quantity.

Sixth Embodiment

Figure 45:
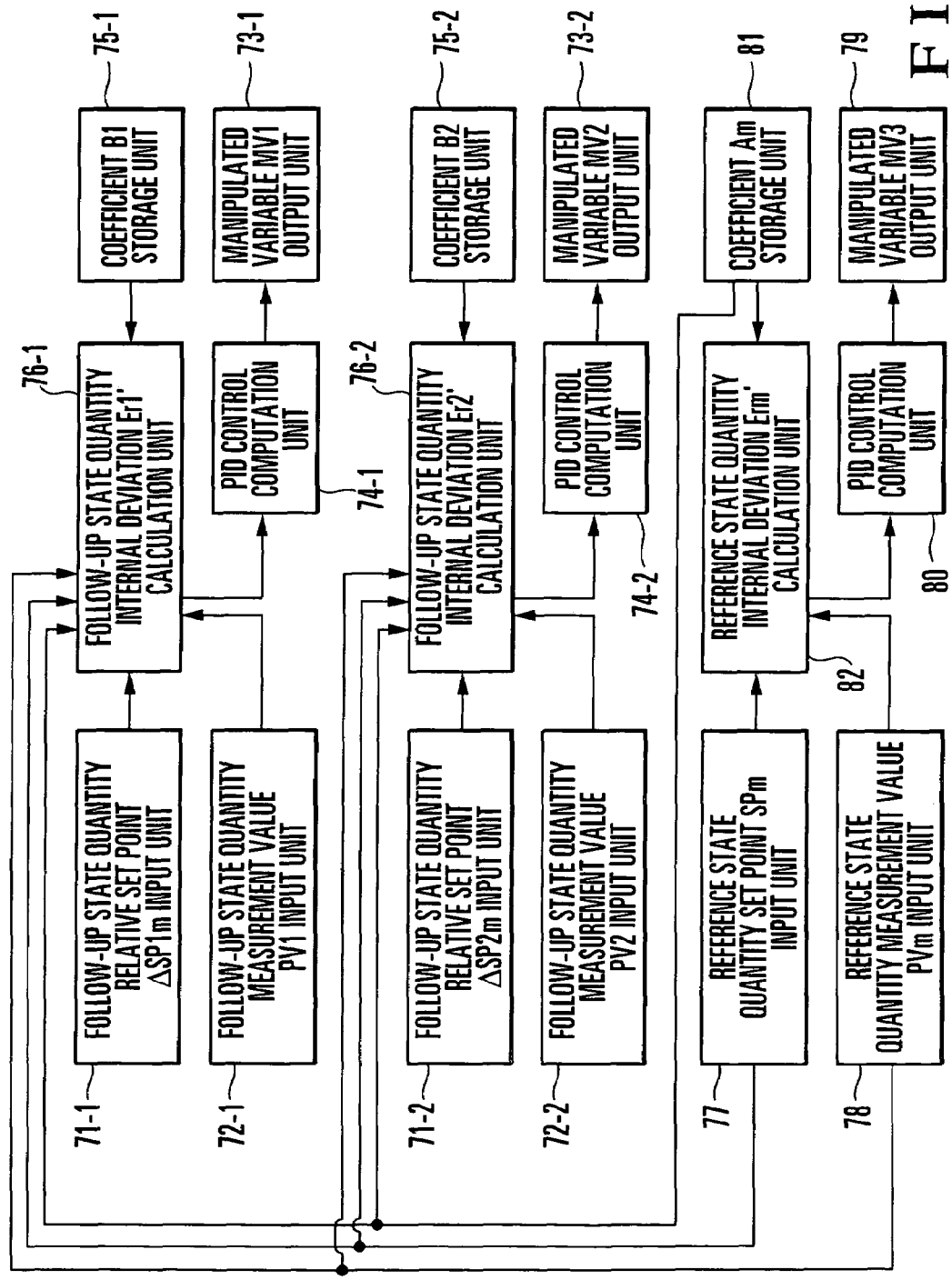
FIG. 45 is a block diagram showing the arrangement of a control apparatus according to the sixth embodiment of the present invention.

The sixth embodiment of the present invention will be described next. FIG. 45 shows the arrangement of a control apparatus according to the sixth embodiment of the present invention. This embodiment will exemplify a case wherein there are three control loops, the state quantity of one typical control loop is used as a reference state quantity, and the state quantities of the remaining two control loops are used as follow-up state quantities. However, a similar control system can be formed on the basis of the same principle as long as there are two or more control loops.

In the control apparatus in FIG. 45, the arrangement of the first control system associated with the first follow-up state quantity comprises a follow-up state quantity relative set point ΔSP1m input unit 71-1, a follow-up state quantity measurement value PV1 input unit 72-1, a manipulated variable MV1 output unit 73-1, a PID control computation unit (PID controller) 74-1, a coefficient B1 storage unit 75-1, and a follow-up state quantity internal deviation Er1' calculation unit 76-1 serving as an internal input value calculation unit. In addition, in the control apparatus in FIG. 45, the arrangement of the second control system associated with the second follow-up state quantity comprises a follow-up state quantity relative set point ΔSP2m input unit 71-2, a follow-up state quantity measurement value PV2 input unit 72-2, manipulated variable MV2 output unit 73-2, a PID control computation unit 74-2, a coefficient B2 storage unit 75-2, and a follow-up state quantity internal deviation Er2' calculation unit 76-2 serving as an internal input value calculation unit.

Furthermore, in the control apparatus in FIG. 45, the arrangement of the third control system associated with a reference state quantity comprises a reference state quantity set point SPm input unit 77, reference state quantity measurement value PVm input unit 78, manipulated variable MV3 output unit 79, PID control computation unit 80, coefficient Am storage unit 81, and reference state quantity internal deviation Erm' calculation unit 82.

Figure 46:
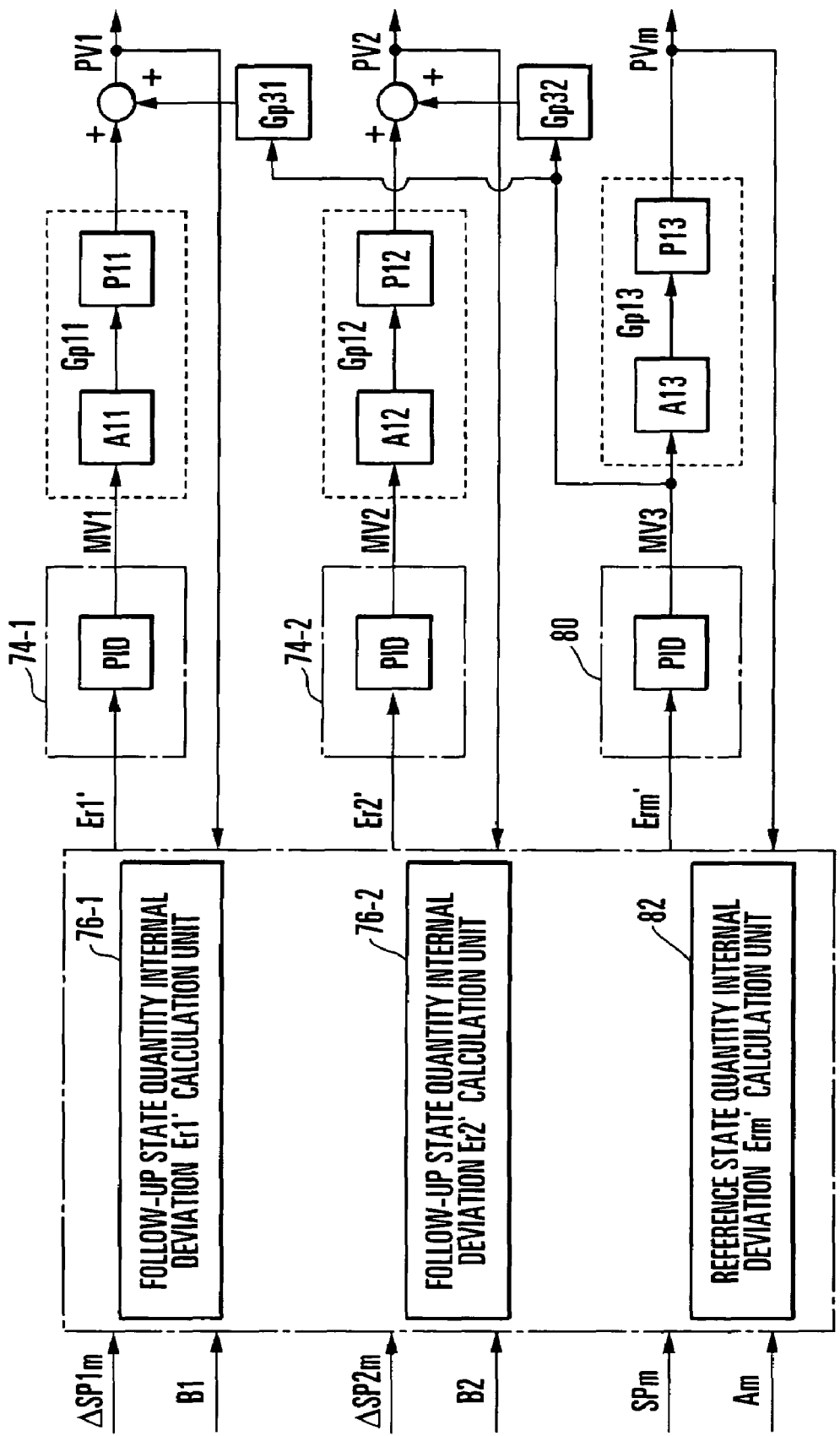
FIG. 46 is a block diagram of control systems in the sixth embodiment of the present invention.

FIG. 46 shows a control system according to this embodiment. Referring to FIG. 46, reference symbol Er1' denotes the first follow-up state quantity internal deviation; Er2', the second follow-up state quantity internal deviation; Erm', a reference state quantity internal deviation; Am, a coefficient associated with the reference state quantity; B1, a coefficient associated with the state quantity difference between the first follow-up state quantity and the reference state quantity; B2, a coefficient associated with the state quantity difference between the second follow-up state quantity and the reference state quantity; A11, an actuator which controls the first follow-up state quantity; A12, an actuator which controls the second follow-up state quantity; A13, an actuator which controls the reference state quantity; P11, a controlled system process associated with the first follow-up state quantity; P12, a controlled system process associated with the second follow-up state quantity; P13, a controlled system process associated with the reference state quantity; Gp11, a transfer function for a block including the actuator A11 and process P11; Gp12, a transfer function for a block including the actuator A12 and process P12; Gp13, a transfer function for a block including the actuator A13 and process P13; Gp31, a transfer function representing the interference between the first control loop and the third control loop; and Gp32, a transfer function representing the interference between the second control loop and the third control loop.

The follow-up state quantity relative set point ΔSP1m input unit 71-1, follow-up state quantity measurement value PV1 input unit 72-1, manipulated variable MV1 output unit 73-1, PID control computation unit 74-1, follow-up state quantity internal deviation Er1' calculation unit 76-1, actuator A11, and process P11 constitute the first control system (first control loop). The follow-up state quantity relative set point ΔSP2m input unit 71-2, follow-up state quantity measurement value PV2 input unit 72-2, manipulated variable MV2 output unit 73-2, PID control computation unit 74-2, follow-up state quantity internal deviation Er2' calculation unit 76-2, actuator A12, and process P12 constitute the second control system (second control loop). The reference state quantity set point SPm input unit 77, reference state quantity measurement value PVm input unit 78, manipulated variable MV3 output unit 79, PID control computation unit 80, reference state quantity internal deviation Erm' calculation unit 82, actuator A13, and process P13 constitute the third control system (third control loop).

Figure 47:
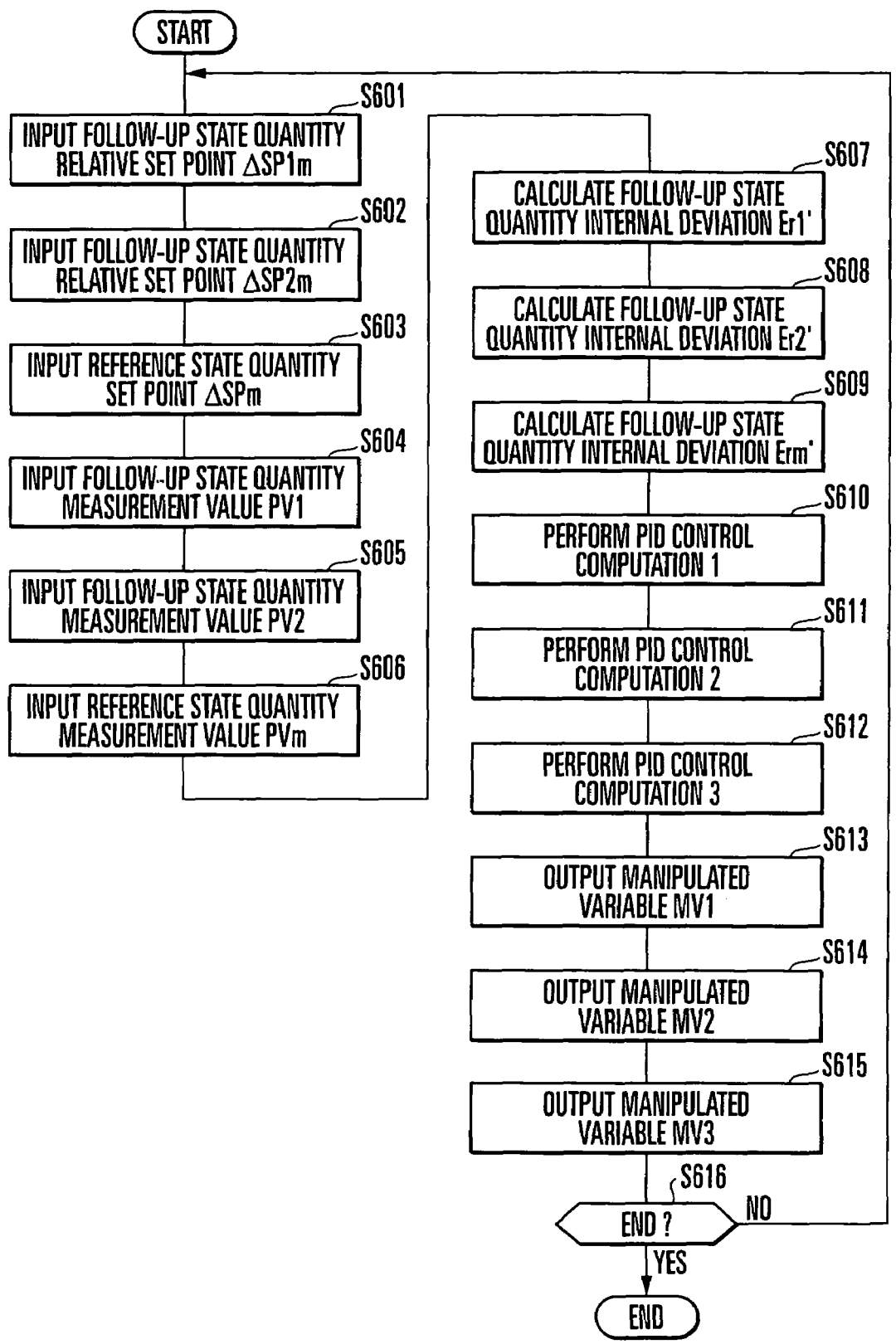
FIG. 47 is a flowchart showing the operation of the control apparatus according to the sixth embodiment of the present invention.

The operation of the control apparatus of this embodiment will be described next with reference to FIG. 47. First of all, a follow-up state quantity relative set point ΔSP1m is set by the operator of the control apparatus and input to the follow-up state quantity internal deviation Er1' calculation unit 76-1 through the follow-up state quantity relative set point ΔSP1m input unit 71-1 (step S 601 in FIG. 47). A follow-up state quantity relative set point ΔSP2m is set by the operator and input to the follow-up state quantity internal deviation Er2' calculation unit 76-2 through the follow-up state quantity relative set point ΔSP2m input unit 71-2 (step S 602). A reference state quantity set point SPm is set by the operator and input to the follow-up state quantity internal deviation Er1' calculation unit 76-1, follow-up state quantity internal deviation Er2' calculation unit 76-2, and reference state quantity internal deviation Erm' calculation unit 82 through the reference state quantity set point SPm input unit 77 (step S603).

The follow-up state quantity measurement value PV1 is detected by the first detection means (not shown) and input to the follow-up state quantity internal deviation Er1' calculation unit 76-1 through the follow-up state quantity measurement value PV1 input unit 72-1 (step S604). The follow-up state quantity measurement value PV2 is detected by the second detection means (not shown) and input to the follow-up state quantity internal deviation Er2' calculation unit 76-2 through the follow-up state quantity measurement value PV2 input unit 72-2 (step S605). The reference state quantity measurement value PVm is detected by the third detection means (not shown) and input to the follow-up state quantity internal deviation Er1' calculation unit 76-1, follow-up state quantity internal deviation Er2' calculation unit 76-2, and reference state quantity internal deviation Erm' calculation unit 82 through the reference state quantity measurement value PVm input unit 78 (step S606).

The coefficient Am storage unit 81 stores the coefficient Am associated with the reference state quantity in advance. The coefficient B1 storage unit 75-1 stores the coefficient B1 associated with the state quantity difference between the first follow-up state quantity and the reference state quantity in advance. The follow-up state quantity internal deviation Er1' calculation unit 76-1 calculates the follow-up state quantity internal deviation Er1' on the basis of the coefficients Am and B1, the reference state quantity set point SPm, the reference state quantity measurement value PVm, the follow-up state quantity relative set point ΔSP1m, and follow-up state quantity measurement value PV1 according to the following equation (step S607).

$$Er1' = Am(SPm - PVm) + B1\{\Delta SP1m - (PV1 - PVm)\} \quad (120)$$

The coefficient B2 storage unit 75-2 stores the coefficient B2 associated with the state quantity difference between the second follow-up state quantity and the reference state quantity in advance. The follow-up state quantity internal deviation Er2' calculation unit 76-2 calculates the follow-up state quantity internal deviation Er2' on the basis of the coefficients Am and B2, the reference state quantity set point SPm, the reference state quantity measurement value PVm, follow-up state quantity relative set point ΔSP2m, and the follow-up state quantity measurement value PV2 according to the following equation (step S608).

$$Er2'=Am(SPm-PVm)+B2\{\Delta SP2m-(PV2-PVm)\} \quad (121)$$

The reference state quantity internal deviation Erm' calculation unit 82 calculates the reference state quantity internal deviation Erm' on the basis of the coefficient Am, reference state quantity set point SPm, and reference state quantity measurement value PVm according to the following equation (step S609).

$$Erm'=Am(SPm-PVm) \quad (122)$$

The PID control computation unit 74-1 then calculates a manipulated variable MV1 by performing PID control computation represented by equation (111), like the PID control computation unit 64-1 (step S610). Note that as a measure against integration windup, the PID control computation unit 74-1 performs manipulated variable upper/lower limit processing as follows. If the calculated manipulated variable MV1 is smaller than a lower limit value OL1 of the output of the actuator A11, the PID control computation unit 74-1 sets manipulated variable MV1=OL1. If the calculated manipulated variable MV1 is larger than an upper limit value OH1 of the output of the actuator A11, the PID control computation unit 74-1 sets manipulated variable MV1=OH1.

The PID control computation unit 74-2 then calculates a manipulated variable MV2 by performing PID control computation represented by equation (112), like the PID control computation unit 64-2 (step S611). Note that as a measure against integration windup, the PID control computation unit 74-2 performs manipulated variable upper/lower limit processing as follows. If the calculated manipulated variable MV2 is smaller than a lower limit value OL2 of the output of the actuator A12, the PID control computation unit 74-2 sets manipulated variable MV2=OL2. If the calculated manipulated variable MV2 is larger than an upper limit value OH2 of the output of the actuator A12, the PID control computation unit 74-2 sets manipulated variable MV2=OH2.

The PID control computation unit 80 calculates a manipulated variable MV3 by performing PID control computation represented by the following transfer function equation (step S612).

$$MV3=(100/Pb3)\{1+(1/Ti3s)+Td3s\}Erm' \quad (123)$$

where Pb3 is a proportional band, Ti3 is a reset time, and Td3 is a rate time. Note that as a measure against integration windup, the PID control computation unit 80 performs manipulated variable upper/lower limit processing as follows. If the calculated manipulated variable MV3 is smaller than a lower limit value OL3 of the output of the actuator A13, the PID control computation unit 80 sets manipulated variable MV3=OL3. If the calculated manipulated variable MV3 is larger than an upper limit value OH3 of the output of the actuator A13, the PID control computation unit 80 sets manipulated variable MV3=OH3.

The manipulated variable MV1 output unit 73-1 outputs the manipulated variable MV1 calculated by the PID control computation unit 74-1 to the actuator A11 (step S613). The actuator A11 operates to control the first follow-up state quantity on the basis of the manipulated variable MV1.

The manipulated variable MV2 output unit 73-2 outputs the manipulated variable MV2 calculated by the PID control computation unit 74-2 to the actuator A12 (step S614). The actuator A12 operates to control the second follow-up state quantity on the basis of the manipulated variable MV2.

The manipulated variable MV3 output unit 79 outputs the manipulated variable MV3 calculated by the PID control computation unit 80 to the actuator A13 (step S615). The actuator A13 operates to control the reference state quantity on the basis of the manipulated variable MV3.

The above processing in steps S601 to S615 is repeatedly executed in control cycles until the end of control is designated by the operator (YES in step S616).

FIGS. 48A, 49A, 50A, 51A, and 52A show the step responses of the control system when the reference state quantity set point SPm is changed to 30.0 while the follow-up state quantity relative set points ΔSP1m and ΔSP2m are 0. FIGS. 48B, 49B, 50B, 51B, and 52B show the disturbance responses of the control system when disturbances are applied to the system while the system is stabilized with ΔSP1m=0, ΔSP2m=0, and SPm=30.0. Simulation conditions are set as follows.

First of all, the transfer function Gp11 for the block including the actuator A11 and process P11, the transfer function Gp12 for the block including the actuator A12 and process P12, and the transfer function Gp13 for the block including the actuator A13 and process P13 are set according to the following equations.

$$Gp11=1.2\ \exp(-2.0s)/\{(1+70.0s)(1+10.0s)\} \quad (124)$$

$$Gp12=1.6\ \exp(-2.0s)/\{(1+60.0s)(1+10.0s)\} \quad (125)$$

$$Gp13=2.0\ \exp(-2.0s)/\{(1+50.0s)(1+10.0s)\} \quad (126)$$

In addition, the transfer function Gp31 representing the interference between the first control loop and the third control loop and the transfer function Gp32 representing the interference between the second control loop and the third control loop are set as follows:

$$Gp31=0.96\ \exp(-2.0s)/\{(1+70.0s)(1+10.0s)\} \quad (127)$$

$$Gp32=1.28\ \exp(-2.0s)/\{(1+60.0s)(1+10.0s)\} \quad (128)$$

In accordance with the manipulated variables MV1, MV2, and MV3, the follow-up state quantity measurement values PV1 and PV2 and the reference state quantity measurement value PVm are determined as follows:

$$PV1=Gp1MV1+Gp31MV3 \quad (129)$$

$$PV2=Gp2MV2+Gp32MV3 \quad (130)$$

$$PVm=Gp3MV3 \quad (131)$$

Assume that the proportional band Pb1, reset time Ti1, and rate time Td1 as PID parameters in the PID control computation unit 74-1 are respectively set to 50.0, 35.0 and 20.0, the proportional band Pb2, reset time Ti2, and rate time Td2 as PID parameters in the PID control computation unit 74-2 are respectively set to 66.7, 35.0, and 20.0, and the proportional band Pb3, reset time Ti3, and rate time Td3 as PID parameters in the PID control computation unit 80 are respectively set to 10.0, 35.0, and 20.0.

Figure 48A:
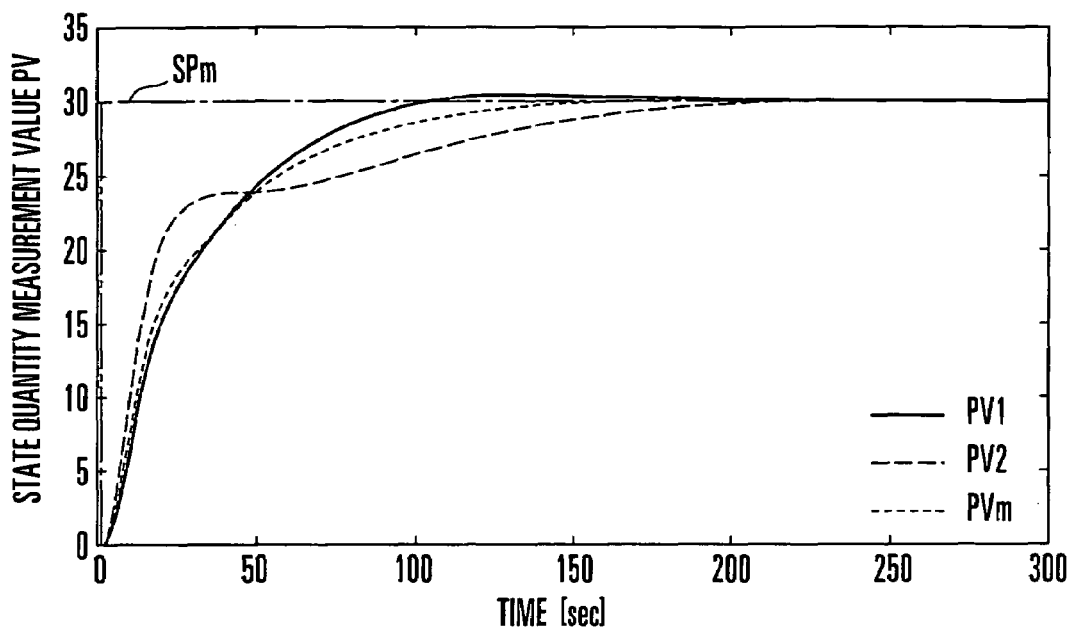
FIG. 48A is a graph showing the step responses of the control systems when reference state quantity set points are changed in the control apparatus according to the sixth embodiment of the present invention.
Figure 48B:
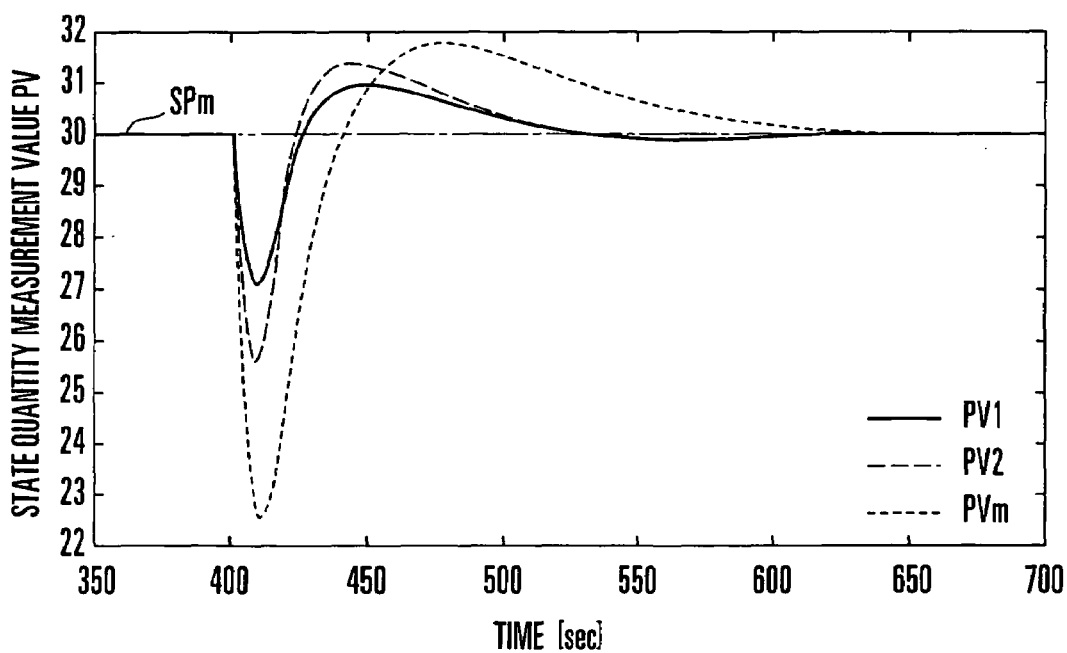
FIG. 48B is a graph showing the disturbance responses of the control systems when disturbances are applied to the control apparatus according to the sixth embodiment of the present invention.

The simulation result shown in FIGS. 48A and 48B is obtained with settings equivalent to general control (Am=1.0, B1=1.0, and B2=1.0), and the follow-up state quantity measurement values PV1 and PV2 and the reference state quantity measurement value PVm do not coincide with each other because the relative state quantities (state quantity differences) are not controlled.

Figure 49A:
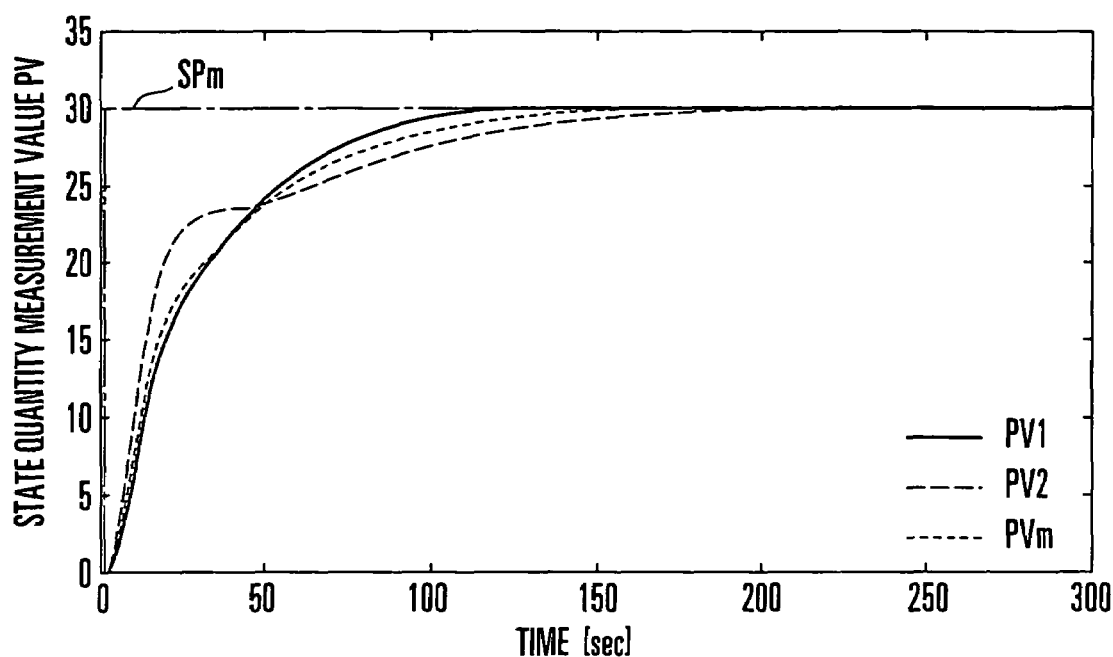
FIG. 49A is a graph showing the step responses of the control systems when reference state quantity set points are changed in the control apparatus according to the sixth embodiment of the present invention.
Figure 49B:
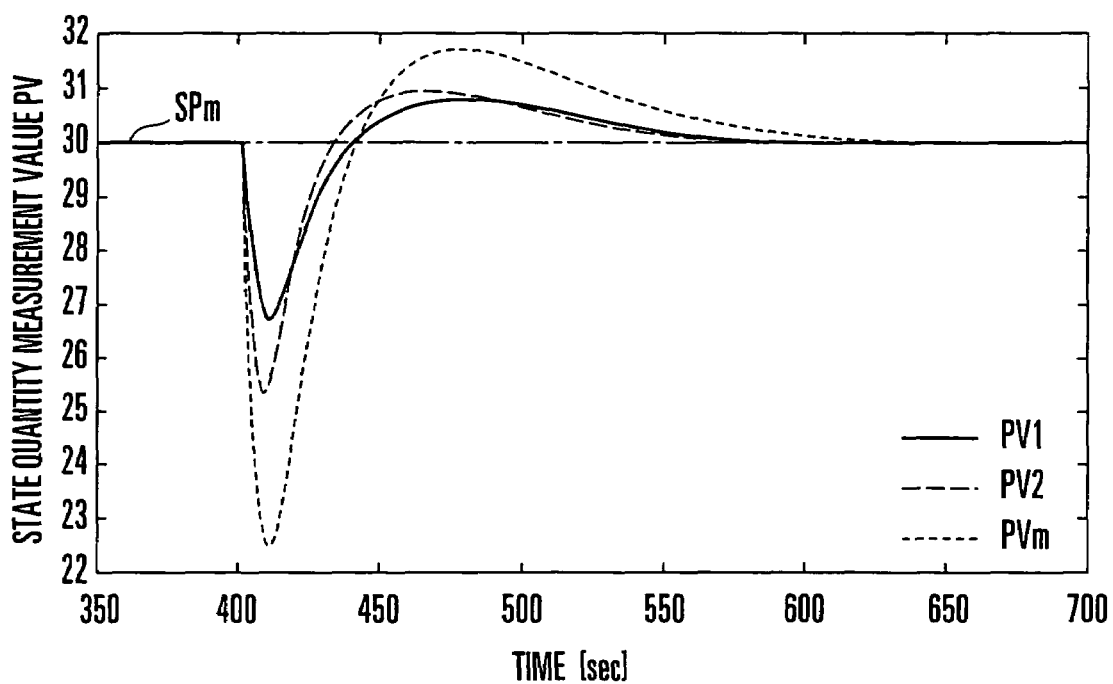
FIG. 49B is a graph showing the disturbance responses of the control systems when disturbances are applied to the control apparatus according to the sixth embodiment of the present invention.

The simulation result shown in FIGS. 49A and 49B is obtained with settings that allow to moderately obtain the effect of this embodiment (Am=1.0, B1=1.5, and B2=1.5), and the follow-up state quantity measurement values PV1 and PV2 and the reference state quantity measurement value PVm coincide with each other compared with the case shown in FIGS. 48A and 48B because the relative state quantities (state quantity differences) are controlled to some extent.

Figure 50A:
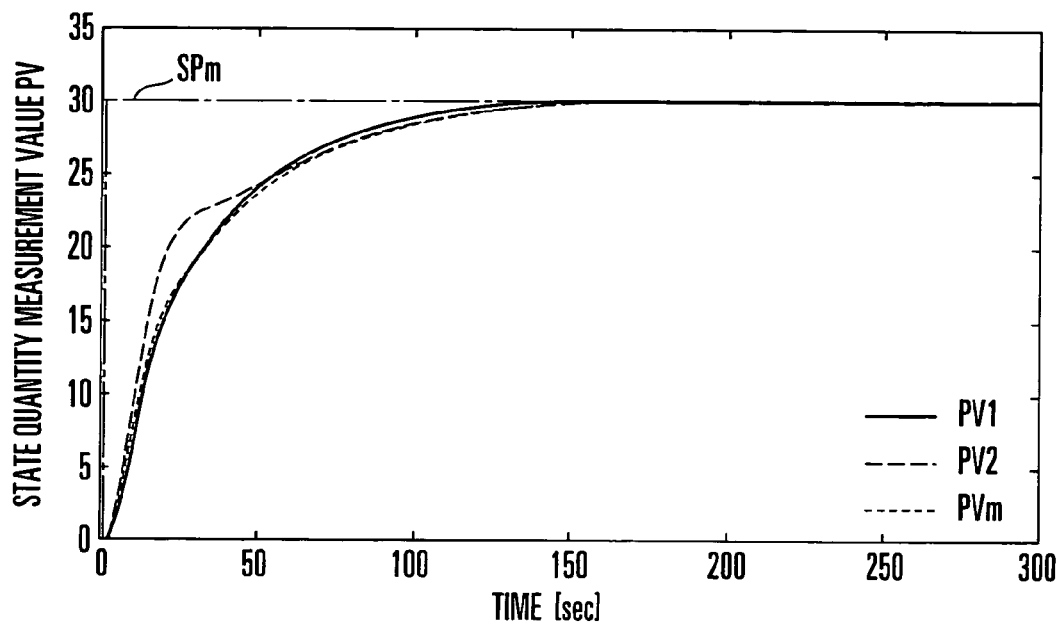
FIG. 50A is a graph showing the step responses of the control systems when reference state quantity set points are changed in the control apparatus according to the sixth embodiment of the present invention.
Figure 50B:
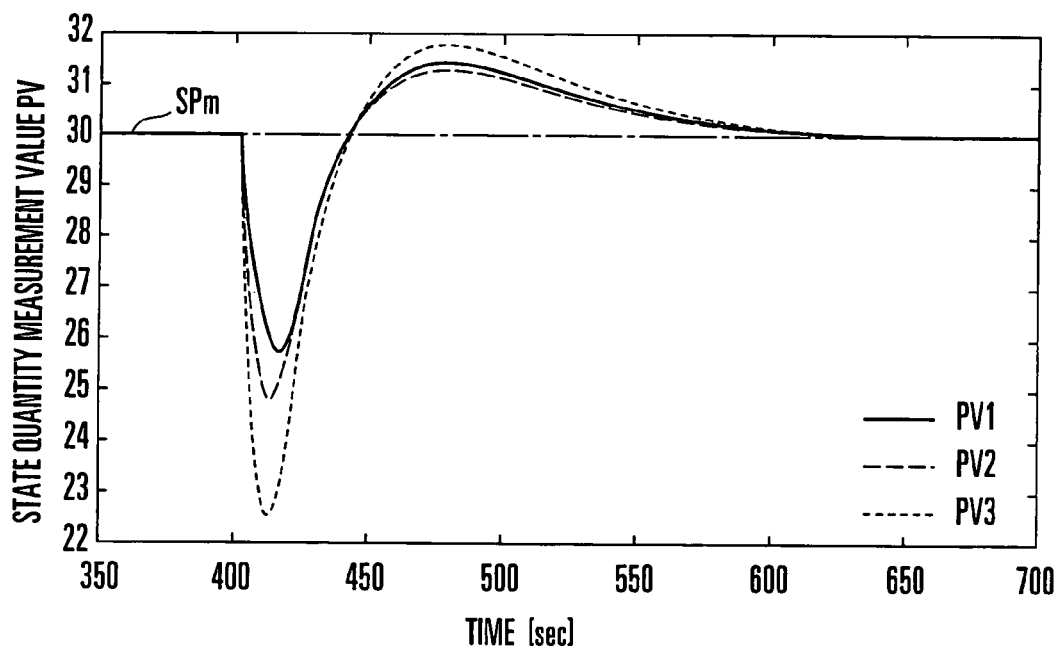
FIG. 50B is a graph showing the disturbance responses of the control systems when disturbances are applied to the control apparatus according to the sixth embodiment of the present invention.

The simulation result shown in FIGS. 50A and 50B is obtained with settings that allow to noticeably obtain the effect of this embodiment (Am=1.0, B1=3.0, B2=3.0, and B3=3.0), and the follow-up state quantity measurement values PV1 and PV2 and the reference state quantity measurement value PVm noticeably coincide with each other compared with the case shown in FIGS. 48A and 48B because the relative state quantities (state quantity differences) are sufficiently controlled.

Figure 51A:
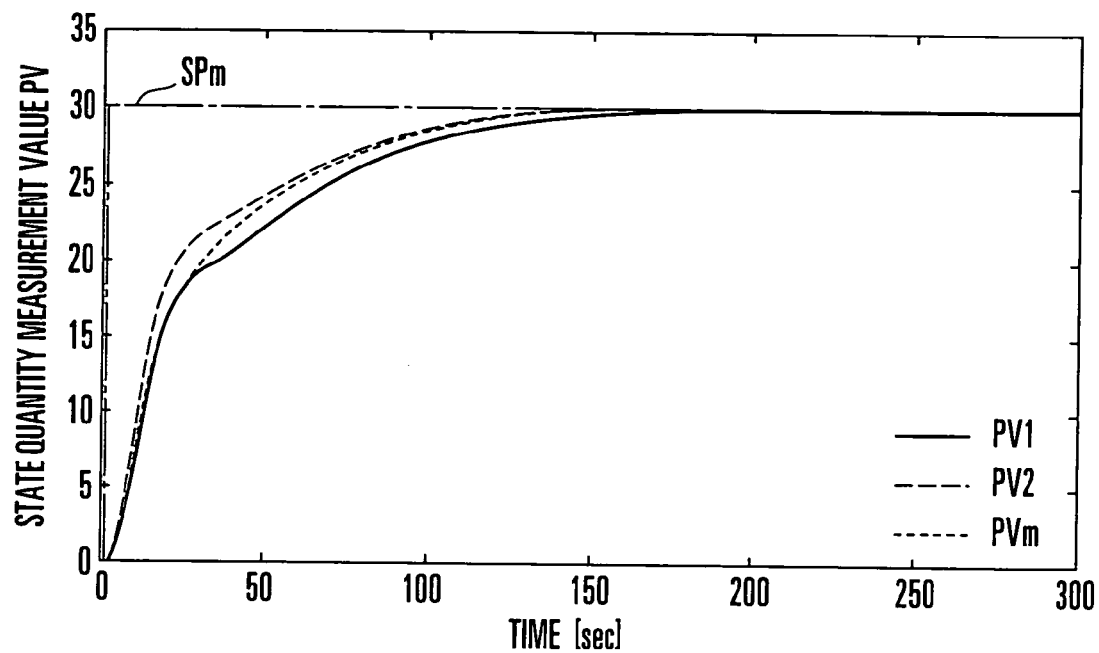
FIG. 51A is a graph showing the step responses of the control systems when reference state quantity set points are changed in the control apparatus according to the sixth embodiment of the present invention.
Figure 51B:
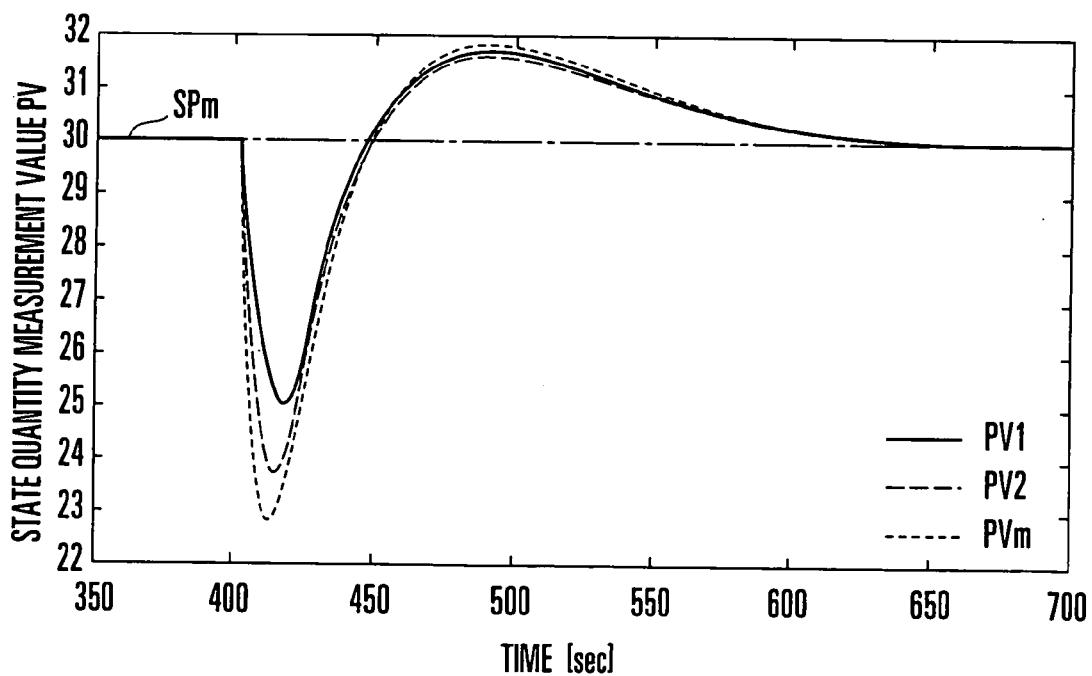
FIG. 51B is a graph showing the disturbance responses of the control systems when disturbances are applied to the control apparatus according to the sixth embodiment of the present invention.

The simulation result shown in FIGS. 51A and 51B is obtained with settings that result in the excessive effect of this embodiment (Am=1.0, B1=4.0, and B2=4.0), and the follow-up state quantity measurement values PV1 and PV2 and the reference state quantity measurement value PVm do not coincide with each other compared with the case shown in FIGS. 50A and 50B because control becomes unstable at the time of step response.

Figure 52A:
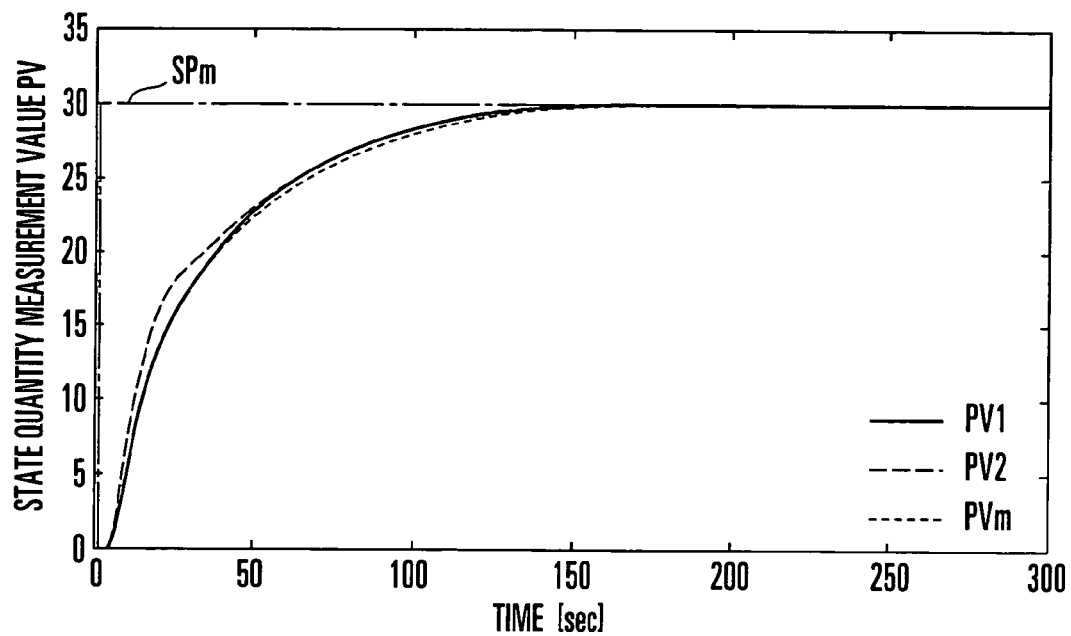
FIG. 52A is a graph showing the step responses of the control systems when reference state quantity set points are changed in the control apparatus according to the sixth embodiment of the present invention.
Figure 52B:
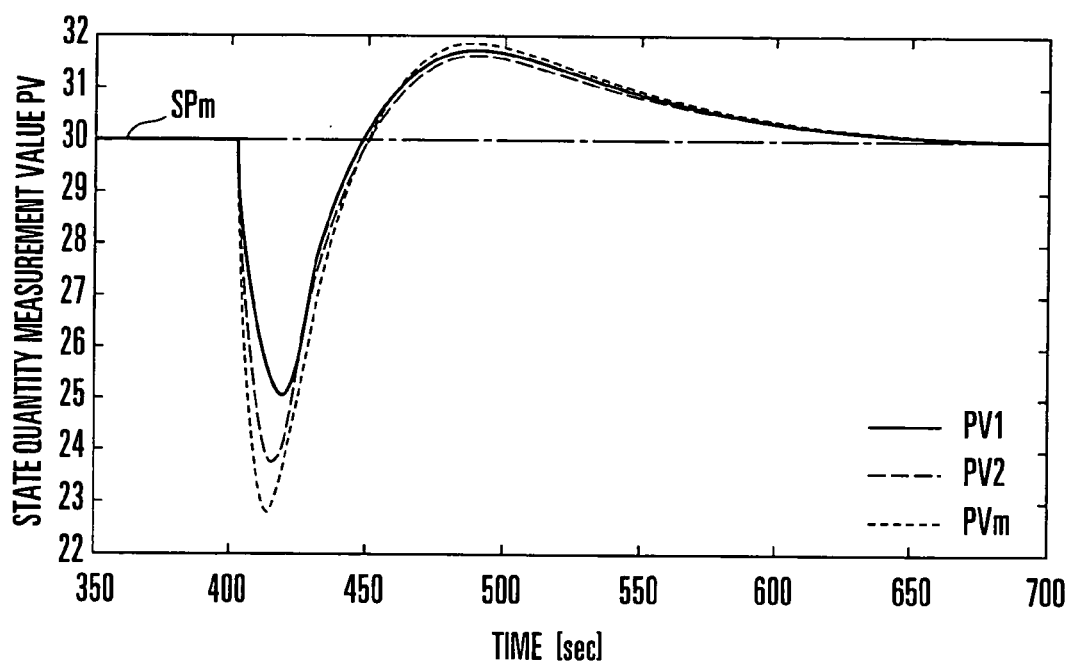
FIG. 52B is a graph showing the disturbance responses of the control systems when disturbances are applied to the control apparatus according to the sixth embodiment of the present invention.
Figure 53A:
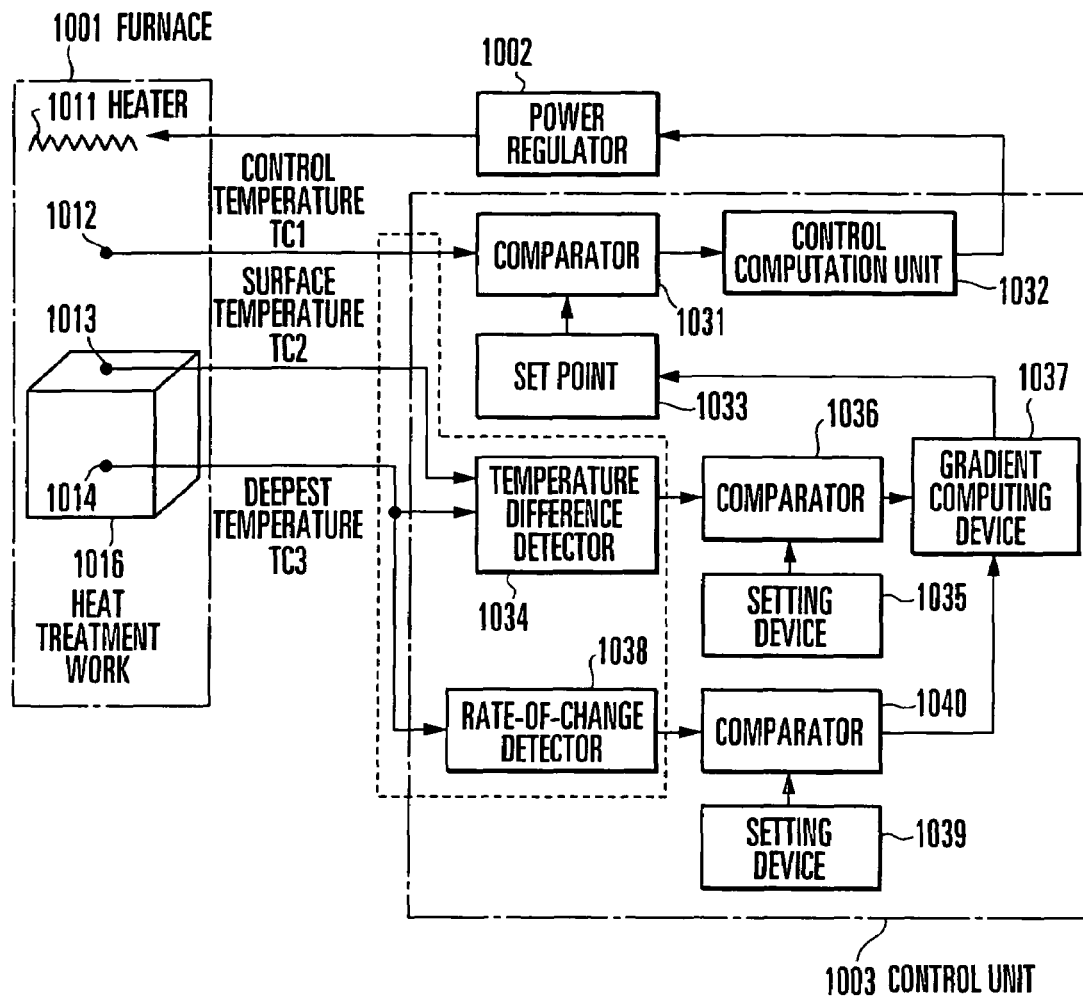
FIG. 53A is a block diagram showing the arrangement of a conventional control apparatus.
Figure 53B:
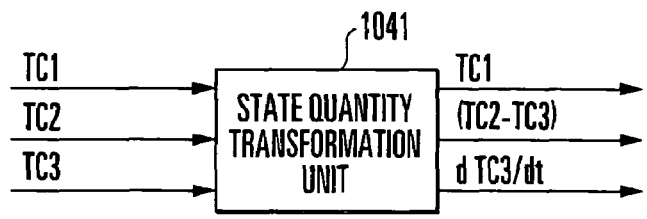
FIG. 53B is a view showing a state quantity transformation unit in the control apparatus in FIG. 53A.
Figure 54A:
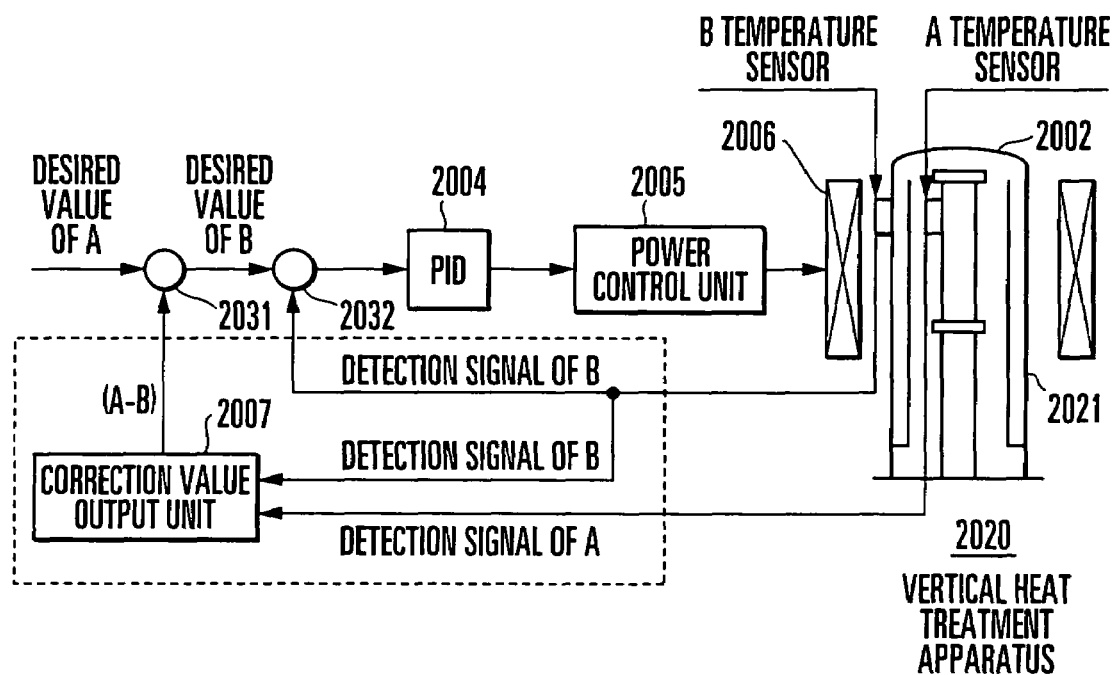
FIG. 54A is a block diagram showing the arrangement of another conventional control apparatus.
Figure 54B:
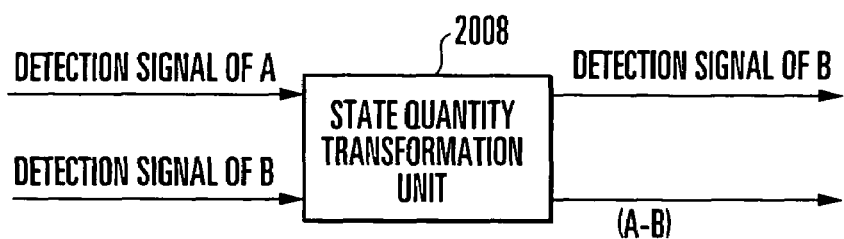
FIG. 54B is a view showing a state quantity transformation unit in the control apparatus in FIG. 54A.
Figure 55:
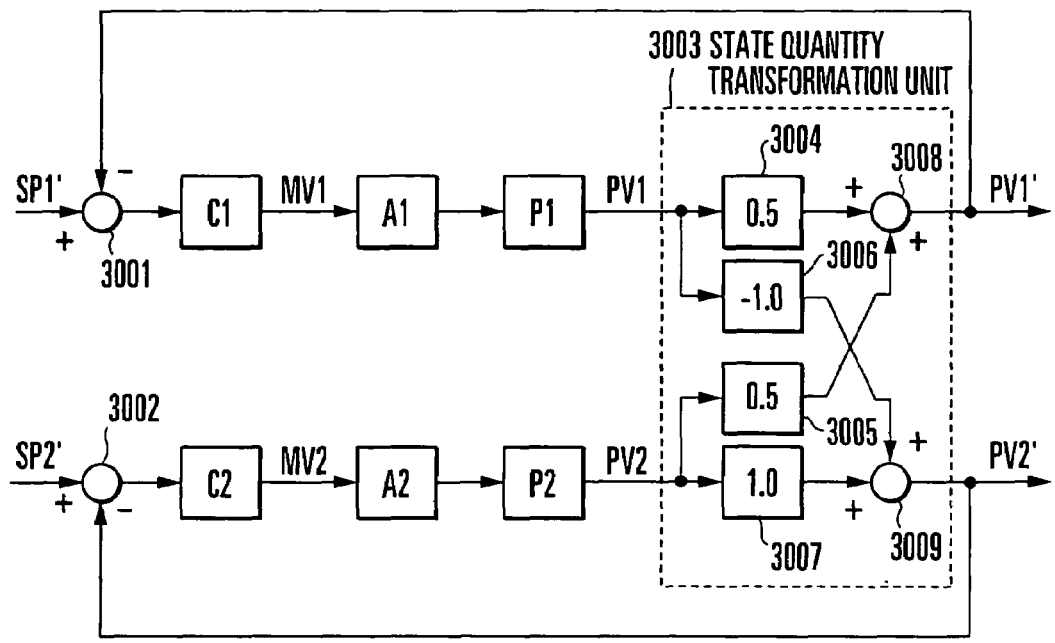
FIG. 55 is a block diagram showing the arrangement of a conventional control apparatus which handles a state quantity mean value and state quantity difference as controlled systems.
Figure 56:
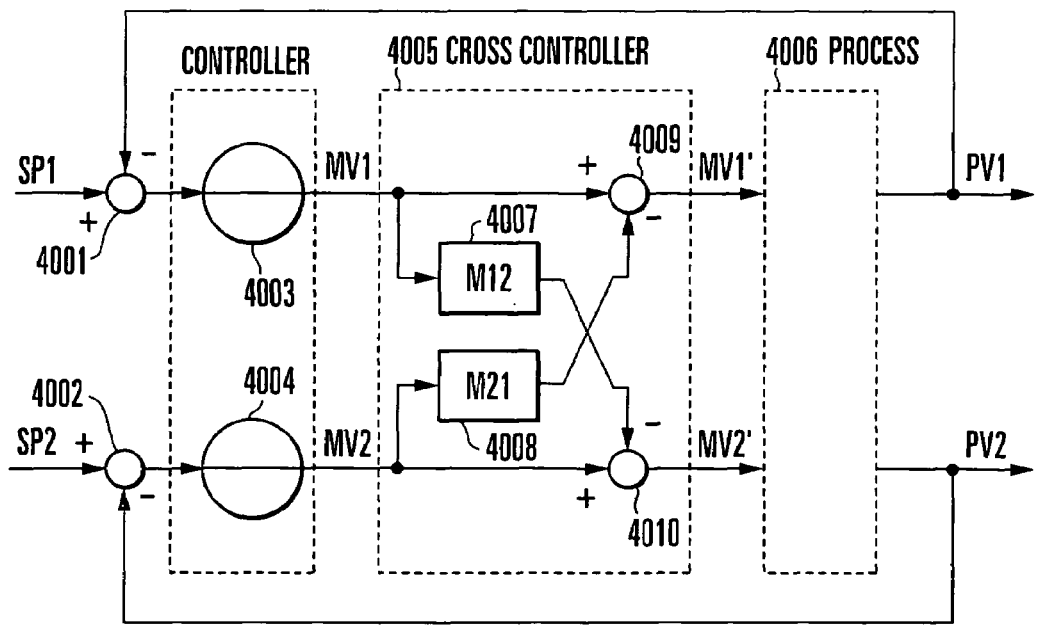
FIG. 56 is a block diagram showing the arrangement of a conventional control apparatus using a cross controller.
Figure 57:
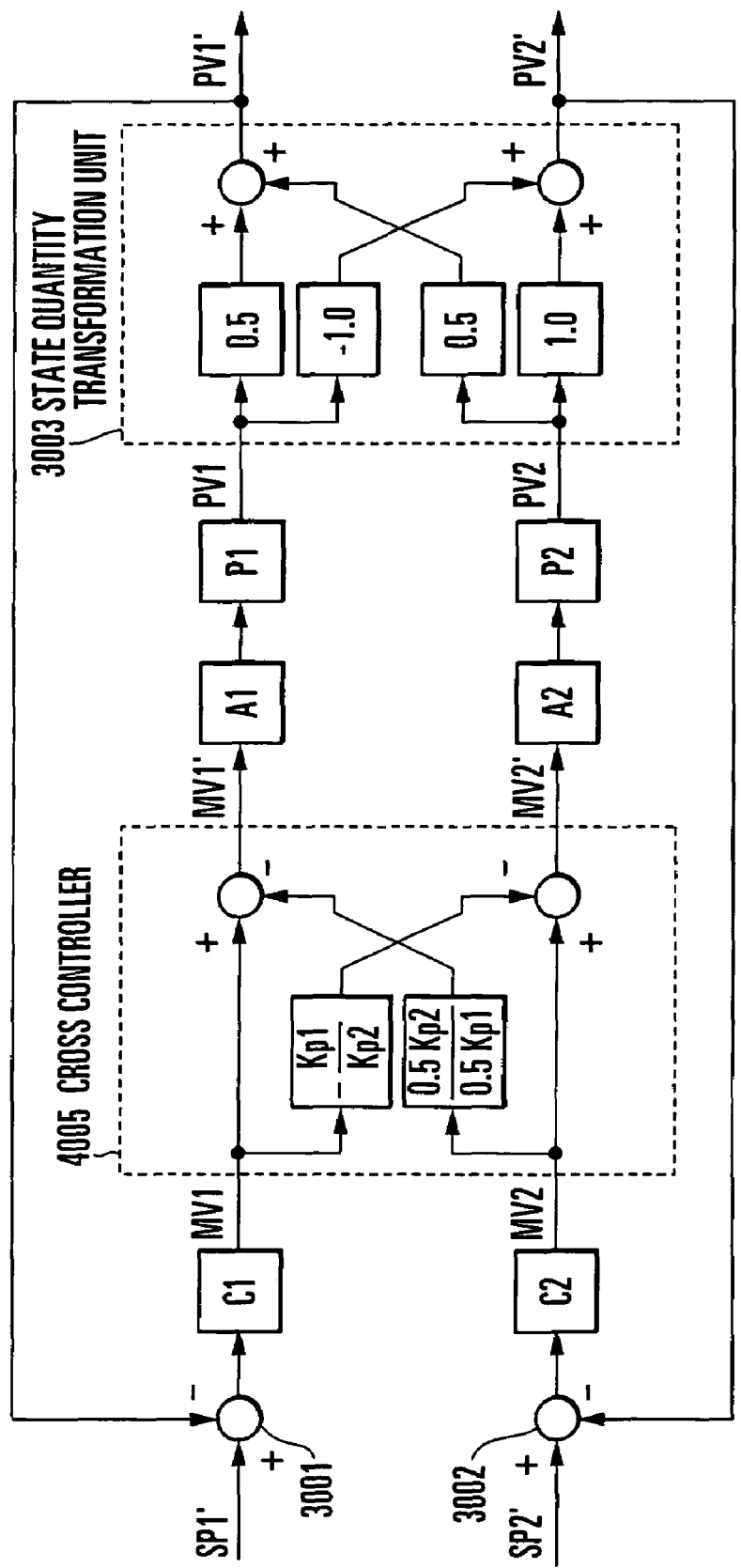
FIG. 57 is a block diagram showing an arrangement in which the cross controller in FIG. 56 is applied to the control apparatus in FIG. 55.
Figure 58:
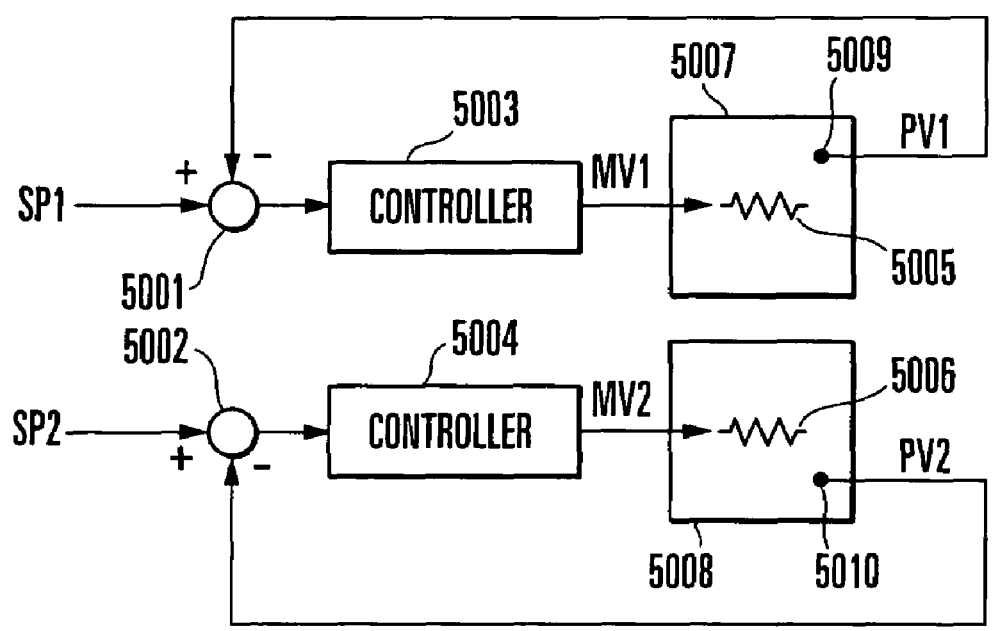
FIG. 58 is a view for explaining conventional parameter adjustment.

The simulation result shown in FIGS. 52A and 52B is obtained with settings that avoid the excessive effect of this embodiment (Am=0.7, B1=4.0, and B2=4.0), and the follow-up state quantity measurement values PV1 and PV2 and the reference state quantity measurement value PVm further coincide with each other compared with the case shown in FIGS. 50A and 50B because the reference state quantity is shifted to the low-sensitivity side.

In the simulation results shown in FIGS. 48A and 48B to FIGS. 52A and 52B, setting ΔSP1m=ΔSP2m=0.0 makes all the state quantity differences between the first follow-up state quantity and the reference state quantity and between the second follow-up state quantity and the reference state quantity become 0.

If ΔSP1m and ΔSP2m are set to values other than 0, the state quantity measurement values PV1, PV2, PVm change to keep the differences between the state quantity measurement values PV1, PV2, and PVm constant in accordance with these settings. If, for example, ΔSP1m=20.0, and ΔSP2m=10.0 are set, step responses and disturbance suppressing responses are performed to maintain state quantity difference PV1−PVm=20.0 and state quantity difference PV2−PVm=10.0.

According to this embodiment, the same effects as those in the fifth embodiment can be obtained. In addition, as is obvious from the simulation results in FIGS. 48A and 48B to FIGS. 52A and 52B, the present invention can be effectively applied to even a control system subjected to inter-loop interference.

Each of the control apparatus described in the first to sixth embodiments can be realized by a computer including a computing unit, storage unit, and interface, and programs for controlling these hardware resources.

What is claimed is:

1. A control method comprising:

the calculation step of, when a state quantity serving as a specific reference is defined as a reference state quantity, and a state quantity which is controlled to maintain a relative quantity with respect to the reference state quantity at a specified value is defined as a follow-up state quantity, transforming one of a plurality of control computation input values input to a controller of at least two controllers respectively forming control loops, which controls the follow-up state quantity, into an internal input value, and then inputting the internal input value to the controller which controls the follow-up state quantity; and the step of causing at least the two controllers to calculate manipulated variables, respectively, and outputting the calculated manipulated variables to controlled systems of corresponding control loops, wherein in the calculation step, the internal input value is calculated by setting the internal input value as the sum of a first element for the reference state quantity and a second element for the relative quantity, an element of the control computation input value which corresponds to the reference state quantity as the first element, and a value obtained by multiplying by a predetermined first coefficient an element of the control computation input value which corresponds to the relative quantity as the second element.

2. A method according to claim 1, wherein the control computation input value which is transformed into the internal input value is a follow-up state quantity set point SPi, and the internal input value is a follow-up state quantity internal set point SPi'.

3. A method according to claim 2, wherein in the calculation step, as the first element of the follow-up state quantity internal set point SPi', a value obtained by multiplying an element of the control computation input value which corresponds to the reference state quantity by a predetermined second coefficient is used instead of an element of the control computation input value which corresponds to the reference state quantity.

4. A method according to claim 2, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, a first difference between the follow-up state quantity set point SPi and the reference state quantity set point SPm and a second difference between the follow-up state quantity measurement value PVi and the reference state quantity measurement value PVm are linearly bound to each other by being multiplied by values based on the first coefficient Bi which defines a degree of follow-up characteristic of the follow-up state quantity measurement value PVi with respect to the reference state quantity measurement value PVm, thereby calculating the second element of the follow-up state quantity internal set point SPi'.

5. A method according to claim 2, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal set point SPi' is calculated by using the first coefficient Bi which defines a degree of follow-up characteristic of the follow-up state quantity measurement value PVi with respect to the reference state quantity measurement value PVm according to SPi'SPm+Bi(SPi−SPm)+(1−Bi)(PVi−PVm).

6. A method according to claim 2, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal set point SPi' is calculated by using the first coefficient Bi which defines a degree of follow-up characteristic of the follow-up state quantity measurement value PVi with respect to the reference state quantity measurement value PVm according to SPi'=PVi+(SPm−PVm)+Bi{(SPi−SPm)−(PVi−PVm)}.

7. A method according to claim 2, wherein in the calculation step, when a preset reference state quantity set point SPm, a measured reference state quantity measurement value PVm, a preset follow-up state quantity relative set point ΔSPim which is a set point for the relative quantity, and a measured follow-up state quantity measurement value PVi are input as the control computation input values, the follow-up state quantity internal set point SPi' is calculated by using the first coefficient Bi which defines a degree of follow-up characteristic of the follow-up state quantity measurement value PVi with respect to the reference state quantity measurement value PVm according to SPi'=SPm+BiΔSPim+(1−Bi)(PVi−PVm).

8. A method according to claim 2, wherein in the calculation step, when a preset reference state quantity set point SPm, a measured reference state quantity measurement value PVm, a preset follow-up state quantity relative set point ΔSPim which is a set point for the relative quantity, and a measured follow-up state quantity measurement value PVi are input as the control computation input values, the follow-up state quantity internal set point SPi' is calculated by using the first coefficient Bi which defines a degree of follow-up characteristic of the follow-up state quantity measurement value PVi with respect to the reference state quantity measurement value PVm according to SPi'=PVi+(SPm−PVm)+Bi{ΔSPim−(PVi−PVm)}.

9. A method according to claim 3, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal set point SPi' is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to SPi'=AmSPm+(1−Am)PVm+Bi(SPi−SPm)+(1−Bi)(PVi−PVm).

10. A method according to claim 3, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity set point SPi is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to SPi'=PVi +Am(SPm−PVm)+Bi{(SPi−SPm)−(PVi−PVm)}.

11. A method according to claim 3, wherein in the calculation step, when a preset reference state quantity set point SPm, a measured reference state quantity measurement value PVm, a preset follow-up state quantity relative set point ΔSPim which is a set point for the relative quantity, and a measured follow-up state quantity measurement value PVi are input as the control computation input values, the follow-up state quantity internal set point SPi' is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to SPi'=AmSPm+(1−Am)PVm+BiΔSPim+(1−Bi)(PVi−PVm).

12. A method according to claim 3, wherein in the calculation step, when a preset reference state quantity set point SPm, a measured reference state quantity measurement value PVm, a preset follow-up state quantity relative set point ΔSPim which is a set point for the relative quantity, and a measured follow-up state quantity measurement value PVi are input as the control computation input values, the follow-up state quantity internal set point SPi' is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to SPi'=PVi+Am(SPm−PVm)+Bi{ΔSPim−(PVi−PVm)}.

13. A method according to claim 5, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

14. A method according to claim 7, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

15. A method according to claim 9, wherein
the reference state quantity is a mean value of not less than two follow-up state quantities,
the reference state quantity set point SPm is a mean value of set points for the not less than two follow-up state quantities, and the reference state quantity measurement value PVm is a mean value of measurement values of the not less than two follow-up state quantities.

16. A method according to claim 11, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

17. A method according to claim 5, wherein
the reference state quantity is one state quantity specified in advance,
the reference state quantity set point SPm is a set point for the one state quantity, and
the reference state quantity measurement value PVm is a measurement value of the one state quantity.

18. A method according to claim 7, wherein
the reference state quantity is one state quantity specified in advance,
the reference state quantity set point SPm is a set point for the one state quantity, and
the reference state quantity measurement value PVm is a measurement value of the one state quantity.

19. A method according to claim 9, wherein
the reference state quantity is one state quantity specified in advance,
the reference state quantity set point SPm is a set point for the one state quantity, and
the reference state quantity measurement value PVm is a measurement value of the one state quantity.

20. A method according to claim 11, wherein
the reference state quantity is one state quantity specified in advance,
the reference state quantity set point SPm is a set point for the one state quantity, and
the reference state quantity measurement value PVm is a measurement value of the one state quantity.

21. A method according to claim 5, wherein the first coefficient is set to improve a follow-up characteristic of the follow-up state quantity measurement value PVi with respect to the reference state quantity measurement value PVm.

22. A method according to claim 7, wherein the first coefficient is set to improve a follow-up characteristic of the follow-up state quantity measurement value PVi with respect to the reference state quantity measurement value PVm.

23. A method according to claim 9, wherein the first coefficient is set to improve a follow-up characteristic of the follow-up state quantity measurement value PVi with respect to the reference state quantity measurement value PVm.

24. A method according to claim 11, wherein the first coefficient is set to improve a follow-up characteristic of the follow-up state quantity measurement value PVi with respect to the reference state quantity measurement value PVm.

25. A method according to claim 1, wherein
the control computation input value transformed into the internal input value is the follow-up state quantity measurement value PVi, and
the internal input value is the follow-up state quantity internal measurement value PVi'.

26. A method according to claim 25, wherein in the calculation step, as the first element of the follow-up state quantity internal measurement value PVi', a value obtained by multiplying the element of the control computation input value which corresponds to the reference state quantity by a predetermined second coefficient is used instead of the element of the control computation input value which corresponds to the reference state quantity.

27. A method according to claim 25, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, a first difference between the follow-up state quantity set point SPi and the reference state quantity set point SPm and a second difference between the follow-up state quantity measurement value PVi and the reference state quantity measurement value PVm are linearly bound to each other by being multiplied by values based on the first coefficient Bi which defines a degree of follow-up characteristic of the follow-up state quantity measurement value PVi with respect to the reference state quantity measurement value PVm, thereby calculating the second element of the follow-up state quantity internal measurement value PVi'.

28. A method according to claim 25, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal measurement value PVi' is calculated by using the first coefficient Bi which defines a degree of follow-up characteristic of the follow-up state quantity measurement value PVi with respect to the reference state quantity measurement value PVm according to $PVi'=PVm+(1-Bi)(SPi-SPm)+Bi(PVi-PVm)$.

29. A method according to claim 25, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal measurement value PVi' is calculated by using the first coefficient Bi which defines a degree of follow-up characteristic of the follow-up state quantity measurement value PVi with respect to the reference state quantity measurement value PVm according to $PVi'=SPi-(SPm-PVm)-Bi\{SPi-SPm)-(PVi-PVm)\}$.

30. A method according to claim 25, wherein in the calculation step, when a preset reference state quantity set point SPm, a measured reference state quantity measurement value PVm, a preset follow-up state quantity relative set point $\Delta SPim$ which is a set point for the relative quantity, and a measured follow-up state quantity measurement value PVi are input as the control computation input values, the follow-up state quantity internal measurement value PVi' is calculated by using the first coefficient Bi which defines a degree of follow-up characteristic of the follow-up state quantity measurement value PVi with respect to the reference state quantity measurement value PVm according to $PVi'=PVm+(1-Bi)\Delta SPim+Bi(PVi-PVm)$.

31. A method according to claim 26, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal measurement value PVi' is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to PVi'=(1−Am)SPm+AmPVm+(1−Bi)(SPi−SPm)+Bi(PVi−PVm).

32. A method according to claim 26, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal measurement value PVi' is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to PVi'=SPi−Am(SPm−PVm)−Bi{(SPi−SPm)−(PVi−PVm)}.

33. A method according to claim 26, wherein in the calculation step, when a preset reference state quantity set point SPm, a measured reference state quantity measurement value PVm, a preset follow-up state quantity relative set point ΔSPim which is a set point for the relative quantity, and a measured follow-up state quantity measurement value PVi are input as the control computation input values, the follow-up state quantity internal measurement value PVi' is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to PVi=(1−Am)SPm +AmPVm+(1−Bi)ΔSPim+Bi(PVi−PVm).

34. A method according to claim 28, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

35. A method according to claim 30, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

36. A method according to claim 31, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

37. A method according to claim 33, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

38. A method according to claim 28, wherein
the reference state quantity is one state quantity specified in advance,
the reference state quantity set point SPm is a set point for the one state quantity, and
the reference state quantity measurement value PVm is a measurement value of the one state quantity.

39. A method according to claim 30, wherein
the reference state quantity is one state quantity specified in advance,
the reference state quantity set point SPm is a set point for the one state quantity, and
the reference state quantity measurement value PVm is a measurement value of the one state quantity.

40. A method according to claim 31, wherein
the reference state quantity is one state quantity specified in advance,
the reference state quantity set point SPm is a set point for the one state quantity, and
the reference state quantity measurement value PVm is a measurement value of the one state quantity.

41. A method according to claim 33, wherein
the reference state quantity is one state quantity specified in advance,
the reference state quantity set point SPm is a set point for the one state quantity, and
the reference state quantity measurement value PVm is a measurement value of the one state quantity.

42. A method according to claim 28, wherein the first coefficient is set to improve a follow-up characteristic of the follow-up state quantity measurement value PVi with respect to the reference state quantity measurement value PVm.

43. A method according to claim 30, wherein the first coefficient is set to improve a follow-up characteristic of the follow-up state quantity measurement value PVi with respect to the reference state quantity measurement value PVm.

44. A method according to claim 31, wherein the first coefficient is set to improve a follow-up characteristic of the follow-up state quantity measurement value PVi with respect to the reference state quantity measurement value PVm.

45. A method according to claim 33, wherein the first coefficient is set to improve a follow-up characteristic of the follow-up state quantity measurement value PVi with respect to the reference state quantity measurement value PVm.

46. A method according to claim 1, wherein
the control computation input value transformed into the internal input value is a follow-up state quantity deviation Eri, and the internal input value is a follow-up state quantity internal deviation Eri'.

47. A method according to claim 46, wherein in the calculation step, as the first element of the follow-up state quantity internal deviation Eri', a value corresponds to the reference state quantity by a predetermined second coefficient is used instead of the element of the control computation input value which corresponds to the reference state quantity.

48. A method according to claim 46, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, a first difference between the follow-up state quantity set point SPi and the reference state quantity set point SPm and a second difference between the follow-up state quantity measurement value PVi and the reference state quantity measurement value PVm are linearly bound to each other by being multiplied by values based on the first coefficient Bi which defines a degree of follow-up characteristic of the follow-up state quantity measurement value PVi with respect to the reference state quantity measurement value PVm, thereby calculating the second element of the follow-up state quantity internal deviation Eri'.

49. A method according to claim 46, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal deviation Eri' is calculated by using the first coefficient Bi which defines a degree of follow-up characteristic of the follow-up state quantity measurement value PVi with respect to the reference state quantity measurement value PVm according to Eri'=SPm−PVm+Bi {(SPi−SPm)−(PVi−PVm)}.

50. A method according to claim 46, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal deviation Eri' is calculated by using the first coefficient Bi which defines a degree of follow-up characteristic of the follow-up state quantity measurement value PVi with respect to the reference state quantity measurement value PVm according to Eri'=(1−Bi)(SPm−PVm)+Bi(SPi−PVi).

51. A method according to claim 46, wherein in the calculation step, when a preset reference state quantity set point SPm, a measured reference state quantity measurement value PVm, a preset follow-up state quantity relative set point ΔSPim which is a set point for the relative quantity, and a measured follow-up state quantity measurement value PVi are input as the control computation input values, the follow-up state quantity internal deviation Eri' is calculated by using the first coefficient Bi which defines a degree of follow-up characteristic of the follow-up state quantity measurement value PVi with respect to the reference state quantity measurement value PVm according to Eri'=SPm−PVm+Bi {ΔSPim−(PVi−PVm)}.

52. A method according to claim 47, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal deviation Eri' is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to Eri'=Am(SPm−PVm)+Bi{(SPi−SPm)−(PVi−PVm)}.

53. A method according to claim 47, wherein in the calculation step, when a preset reference state quantity set point SPm, a measured reference state quantity measurement value PVm, a preset follow-up state quantity set point SPi, and a measured follow-up state quantity measurement value PVi are input as the control computation input values, the follow-up state quantity internal deviation Eri' is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to Eri'=(Am−Bi)(SPm−PVm)=Bi(SPi−PVi).

54. A method according to claim 47, wherein in the calculation step, when a preset reference state quantity set point SPm, a measured reference state quantity measurement value PVm, a preset follow-up state quantity relative set point ΔSPim which is a set point for the relative quantity, and a measured follow-up state quantity measurement value PVi are input as the control computation input values, the follow-up state quantity internal deviation Eri' is calculated by using the first coefficient Bi which defines a degree of follow-up characteristic of the follow-up state quantity measurement value PVi with respect to the reference state quantity measurement value PVm and the second coefficient Am which defines a degree of response characteristic of the reference state quantity measurement value PVm with respect to the reference state quantity set point SPm according to Eri'=Am(SPm−PVm)+Bi{ΔSPim−(PVi−PVm)}.

55. A method according to claim 49, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

56. A method according to claim 51, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

57. A method according to claim 52, wherein
the reference state quantity is a mean value of not less than two follow-up state quantities,
the reference state quantity set point SPm is a mean value of set points for the not less than two follow-up state quantities, and the reference state quantity measurement value PVm is a mean value of measurement values of the not less than two follow-up state quantities.

58. A method according to claim 54, wherein
the reference state quantity is a mean value of not less than two follow-up state quantities,
the reference state quantity set point SPm is a mean value of set points for the not less than two follow-up state quantities, and
the reference state quantity measurement value PVm is a mean value of measurement values of the not less than two follow-up state quantities.

59. A method according to claim 49, wherein
the reference state quantity is one state quantity specified in advance,
the reference state quantity set point SPm is a set point for the one state quantity, and
the reference state quantity measurement value PVm is a measurement value of the one state quantity.

60. A method according to claim 51, wherein
the reference state quantity is one state quantity specified in advance,
the reference state quantity set point SPm is a set point for the one state quantity, and
the reference state quantity measurement value PVm is a measurement value of the one state quantity.

61. A method according to claim 52, wherein
the reference state quantity is one state quantity specified in advance,
the reference state quantity set point SPm is a set point for the one state quantity, and
the reference state quantity measurement value PVm is a measurement value of the one state quantity.

62. A method according to claim 54, wherein
the reference state quantity is one state quantity specified in advance,
the reference state quantity set point SPm is a set point for the one state quantity, and
the reference state quantity measurement value PVm is a measurement value of the one state quantity.

63. A method according to claim 49, wherein the first coefficient is set to improve a follow-up characteristic of the follow-up state quantity measurement value PVi with respect to the reference state quantity measurement value PVm.

64. A method according to claim 51, wherein the first coefficient is set to improve a follow-up characteristic of the follow-up state quantity measurement value PVi with respect to the reference state quantity measurement value PVm.

65. A method according to claim 52, wherein the first coefficient is set to improve a follow-up characteristic of the follow-up state quantity measurement value PVi with respect to the reference state quantity measurement value PVm.

66. A method according to claim 54, wherein the first coefficient is set to improve a follow-up characteristic of the follow-up state quantity measurement value PVi with respect to the reference state quantity measurement value PVm.

67. A control apparatus comprising:
a controller which, when a state quantity serving as a specific reference is defined as a reference state quantity, and a state quantity which is controlled to maintain a relative quantity with respect to the reference state quantity at a specified value is defined as a follow-up state quantity, is provided for each follow-up state quantity, calculates a manipulated variable for controlling a follow-up state quantity, and outputs the calculated manipulated variable to a controlled system of a corresponding control loop; and
an internal input value output unit which is provided for each follow-up state quantity, transforms one of a plurality of control computation input values input to said controllers into one internal input value, and then inputs the internal input value to a corresponding one of said controllers,
wherein said internal input value calculation unit calculates the internal input value by setting the internal input value as the sum of a first element for the reference state quantity and a second element for the relative quantity, an element of the control computation input value which corresponds to the reference state quantity as the first element, and a value obtained by multiplying an element of the control computation input value which corresponds to the relative quantity as the second element.

* * * * *

UNITED STATES PATENT AND TRADEMARK OFFICE
CERTIFICATE OF CORRECTION

PATENT NO.         : 7,376,470 B2
APPLICATION NO. : 11/113442
DATED              : May 20, 2008
INVENTOR(S)        : Tanaka It is certified that error appears in the above-identified patent and that said Letters Patent is hereby corrected as shown below:

In Claim 5, line 11, please delete "SPi'SPm+" and insert -- SPi' = SPm + --.

Signed and Sealed this

Ninth Day of December, 2008

JON W. DUDAS
*Director of the United States Patent and Trademark Office*

UNITED STATES PATENT AND TRADEMARK OFFICE
CERTIFICATE OF CORRECTION

PATENT NO.         : 7,376,470 B2                                               Page 1 of 1
APPLICATION NO.    : 11/113442
DATED              : May 20, 2008
INVENTOR(S)        : Tanaka It is certified that error appears in the above-identified patent and that said Letters Patent is hereby corrected as shown below:

Column 63, In Claim 5, line 3, please delete "SPi'SPm+" and insert -- SPi' = SPm + --.

This certificate supersedes the Certificate of Correction issued December 9, 2008.

Signed and Sealed this

Thirtieth Day of December, 2008

JON W. DUDAS
*Director of the United States Patent and Trademark Office*